US010596463B2

(12) United States Patent
Ohmori et al.

(10) Patent No.: US 10,596,463 B2
(45) Date of Patent: Mar. 24, 2020

(54) INFORMATION PROCESSING SYSTEM INCLUDING DEVICE HAVING MOTION SENSING FUNCTION, STORAGE MEDIUM STORING PROGRAM DIRECTED THERETO, AND INFORMATION PROCESSING DEVICE

(75) Inventors: Shigeru Ohmori, Setagaya-ku (JP); Shigeki Morimoto, Setagaya-ku (JP); Mikihiro Ishikawa, Kyoto (JP); Hiroki Sotoike, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 496 days.

(21) Appl. No.: 12/560,603

(22) Filed: Sep. 16, 2009

(65) Prior Publication Data

US 2010/0256949 A1 Oct. 7, 2010

(30) Foreign Application Priority Data

Apr. 2, 2009 (JP) ................................ 2009-090248

(51) Int. Cl.
*A63F 13/428* (2014.01)
*A63F 13/55* (2014.01)
*A63F 13/211* (2014.01)

(52) U.S. Cl.
CPC .......... *A63F 13/428* (2014.09); *A63F 13/211* (2014.09); *A63F 13/55* (2014.09); *A63F 2300/105* (2013.01); *A63F 2300/1012* (2013.01)

(58) Field of Classification Search
CPC .................................................... A63F 13/428
USPC ......................................................... 702/160
See application file for complete search history.

(56) References Cited

U.S. PATENT DOCUMENTS

| | | | | |
|---|---|---|---|---|
| 6,042,476 | A * | 3/2000 | Ohashi et al. | 463/40 |
| 6,213,872 | B1 | 4/2001 | Harada et al. | |
| 6,347,993 | B1 * | 2/2002 | Kondo | A63F 13/10 463/1 |
| 6,371,854 | B1 * | 4/2002 | Ikeda et al. | 463/42 |
| 6,621,423 | B1 * | 9/2003 | Cooper et al. | 340/995.24 |

(Continued)

FOREIGN PATENT DOCUMENTS

| | | |
|---|---|---|
| EP | 0 997 172 | 5/2000 |
| JP | 8-103568 | 4/1996 |

(Continued)

OTHER PUBLICATIONS

U.S. Appl. No. 12/560,632, filed Sep. 2009, Morimoto et al.

(Continued)

*Primary Examiner* — Hyun D Park
(74) *Attorney, Agent, or Firm* — Nixon & Vanderhye, P.C.

(57) ABSTRACT

An information processing system including a device capable of transmitting sensing information in accordance with a result of sensing of motion and receiving data for performing various types of processing in accordance with the sensing information is provided. In a character selection screen, in addition to a "course 1" and a "course 2", additionally obtained "course 3" and "course 4" are displayed in a selectable manner. Namely, the number of steps or the like sensed as a user walks while wearing a pedometer in advance is returned from the pedometer to a game device, so that a new course in addition to a course determined depending on a stage in a get and growth game in the game device can be selected.

22 Claims, 28 Drawing Sheets

(56) References Cited

U.S. PATENT DOCUMENTS

| | | | | |
|---|---|---|---|---|
| 6,923,722 | B2 * | 8/2005 | Yamada et al. | 463/30 |
| 6,993,157 | B1 | 1/2006 | Oue et al. | |
| 7,056,265 | B1 * | 6/2006 | Shea | G06Q 40/08 482/8 |
| 7,110,961 | B1 | 9/2006 | Goino | |
| 2001/0007825 | A1 | 7/2001 | Harada et al. | |
| 2002/0188359 | A1 * | 12/2002 | Morse | A63B 24/0021 700/91 |
| 2003/0064860 | A1 * | 4/2003 | Yamashita | A63B 21/005 482/8 |
| 2003/0109298 | A1 * | 6/2003 | Oishi | A63F 13/08 463/8 |
| 2004/0087364 | A1 | 5/2004 | Ishikawa | |
| 2004/0162136 | A1 * | 8/2004 | Yamato | A63F 13/10 463/29 |
| 2005/0130728 | A1 | 6/2005 | Nguyen et al. | |
| 2006/0230108 | A1 * | 10/2006 | Tatsuta et al. | 709/204 |
| 2007/0083324 | A1 * | 4/2007 | Suzuki | G01C 21/3629 701/420 |
| 2007/0255825 | A1 | 11/2007 | Hasegawa | |
| 2008/0027673 | A1 | 1/2008 | Trumm | |
| 2008/0139307 | A1 | 6/2008 | Ueshima et al. | |
| 2008/0293498 | A1 | 11/2008 | Konishi | |

FOREIGN PATENT DOCUMENTS

| | | |
|---|---|---|
| JP | 11-110514 | 4/1999 |
| JP | 2001-330467 | 11/2001 |
| JP | 2003-304411 | 10/2003 |
| JP | 2005-63288 | 3/2005 |

OTHER PUBLICATIONS

Feb. 8, 2012 Office Action from U.S. Appl. No. 12/560,632.

Office Action issued for corresponding U.S. Appl. No. 12/560,632, dated Oct. 10, 2012.

Office Action issued for U.S. Appl. No. 12/560,632, dated Jan. 31, 2013.

Office Action for U.S. Appl. No. 12/560,632 dated Jan. 31, 2014.

Office Action in U.S. Appl. No. 12/560,632 dated Jun. 4, 2014.

Office Action in related U.S. Appl. No. 12/560,632 dated May 3, 2016.

Office Action in U.S. Appl. No. 12/560,632 dated Aug. 25, 2017.

* cited by examiner

FIG.6A
FIG.6B
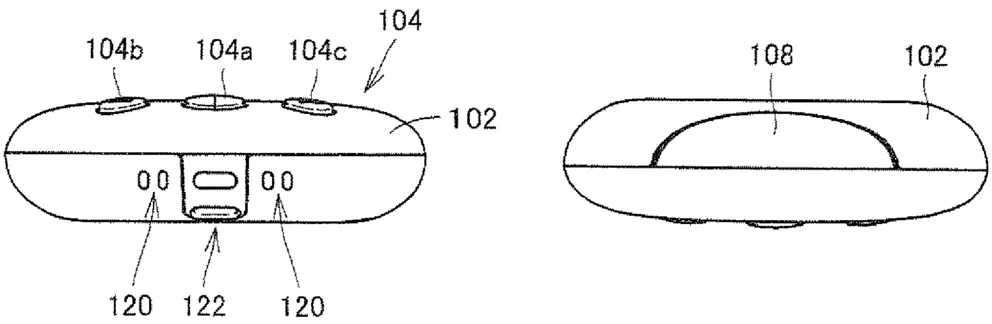
FIG.7
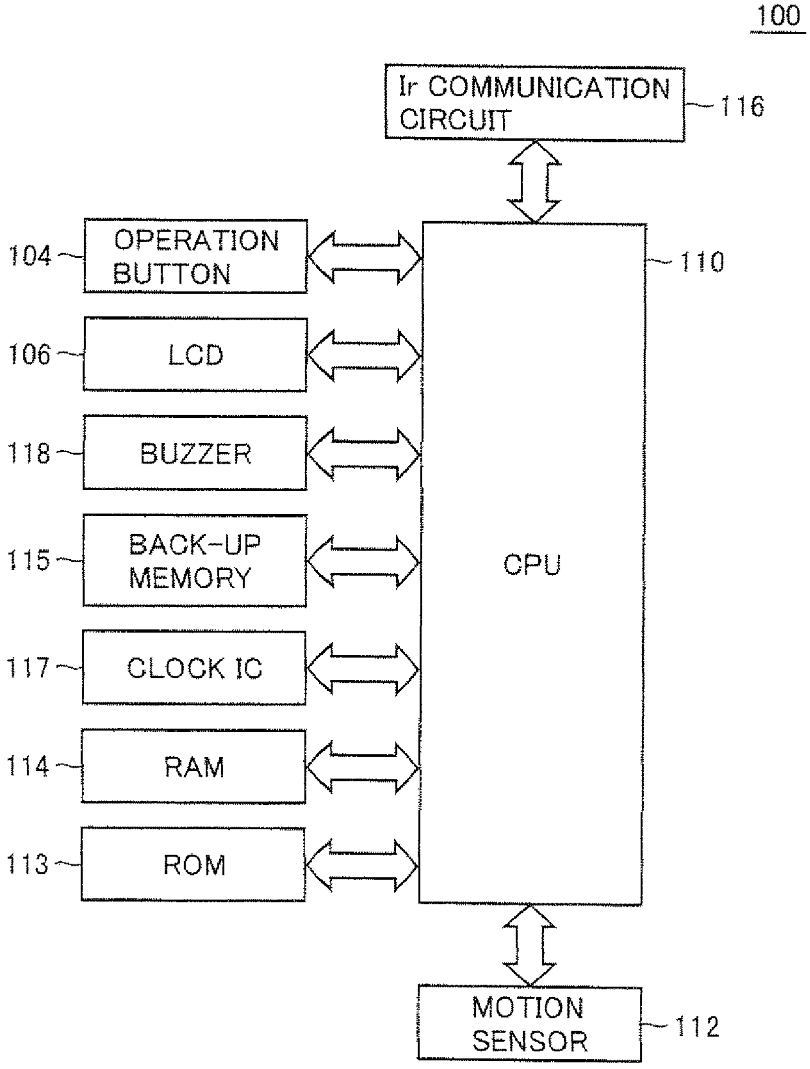

INFORMATION PROCESSING SYSTEM INCLUDING DEVICE HAVING MOTION SENSING FUNCTION, STORAGE MEDIUM STORING PROGRAM DIRECTED THERETO, AND INFORMATION PROCESSING DEVICE

This nonprovisional application is based on Japanese Patent Application No. 2009-090248 filed with the Japan Patent Office on Apr. 2, 2009, the entire contents of which are hereby incorporated by reference.

FIELD OF THE INVENTION

The present invention relates to an information processing system including a device having a motion sensing function, a storage medium storing a program directed thereto, and an information processing device.

DESCRIPTION OF THE BACKGROUND ART

A game system in which a game device and a pedometer are used in coordination has conventionally been known. For example, Japanese Patent Laying-Open No. 08-103568 discloses a game console with an exercise amount input function including an exercise amount meter for calculating and displaying a walked distance, a walking speed or the like, transmission and reception means, and a game console. Receiving data of the amount of exercise measured by the exercise amount meter, this game console controls a level of a game character in accordance with the received data. For example, the game character is upgraded in accordance with the data of the amount of exercise received from the exercise amount meter.

In addition, according to a game system disclosed in Japanese Patent Laying-Open No. 2005-63288, when a game device receives information on a step count counted by a pedometer, the information on the step count is reflected in game contents. For example, the game device can increase a time parameter in accordance with the received information on the step count and permit an operation of a character in correspondence with that increased time parameter. The game device can also transmit various types of information to the pedometer. For example, as the game device transmits display permission information to the pedometer, target image data stored in the pedometer is displayed. Alternatively, as the game device transmits time information to the pedometer, time in the pedometer is set.

According to the configuration disclosed in Japanese Patent Laying-Open No. 08-103568, however, a game executed in the game console is merely affected by transmission of data of the amount of exercise measured by the exercise amount meter to the game console, and no data is transmitted from the game console to the exercise amount meter.

In addition, according to the configuration disclosed in Japanese Patent Laying-Open No. 2005-63288, as image data or the like displayed on a display of the pedometer is stored in advance in a ROM contained in the pedometer, it is not necessary to transmit image data or the like from the game device to the pedometer and such a configuration is not disclosed either.

Neither of these prior alts was directed to a system pleasing a user while exchanging data between the game device and the pedometer. Namely, these prior arts produced no chance in the exercise amount meter or the pedometer in accordance with a result or the like obtained by the exercise amount meter or the pedometer through user's exercise, which lacks fun.

SUMMARY OF THE INVENTION

The present invention was made to solve the above-described problems. An object of the present invention is to provide an information processing system including a device capable of transmitting sensing information in accordance with a result of sensing of motion and receiving data for performing various types of processing in accordance with the sensing information. In addition, another object of the present invention is to provide a storage medium storing a program directed to the device included in such an information processing system and an information processing device included in the system.

According to a first aspect of the present invention, an information processing system including a first device (10: reference numeral used in an embodiment shown below, to be understood similarly hereinafter) and a second device (100) is provided. The first device includes a first communication unit (34, 70) capable of transmitting and receiving data to and from the second device, and a selection unit (34; S506 to S516) for selecting data to be transmitted to the second device from among a plurality of pieces of data stored in advance. The second device includes a second communication unit (110, 116) capable of transmitting and receiving data to and from the first device and a motion sensing unit (112) for sensing motion. The second communication unit is adapted to transmit sensing information in accordance with a result of sensing by the motion sensing unit to the first device (S668). The selection unit is adapted to receive the sensing information in accordance with the result of sensing by the motion sensing unit from the second device and selecting the data to be transmitted based on the received sensing information.

According to the first aspect, the second device transmits the sensing information in accordance with the result of sensing by the motion sensing unit to the first device. In contrast, the first device selects data to be transmitted to the second device from among the plurality of pieces of data, based on the received sensing information. Thus, various types of processing in the second device can dynamically be varied, in accordance with the result of sensing in the second device. Namely, by providing feedback of the result of sensing by the motion sensing unit to the first device, the second device can receive data in accordance with the sensing information from the first device.

Therefore, for example, as the user does exercise or the like while wearing the second device, various types of data are provided to the second device and a variety of types of processing based on these various types of data are performed in the second device. Therefore, the user can be more interested.

In addition, it is just enough for the second device to include hardware and/or software for subjecting the data received from the first device to processing, manufacturing cost can be suppressed and flexible adaptation to various applications that will subsequently be developed can be made.

According to a second aspect of the present invention, the first device further includes a display unit (34, 12, 14) and an input unit (22, 24) for accepting a user's operation. The selection unit includes a unit (34, S512, S514) for extracting data candidates for transmission to the second device from the plurality of pieces of data, based on the received sensing information, a unit (34; S514) for causing the display unit to display information indicating the extracted data candidates, and a unit (34; S516) for selecting the data to be transmitted from among the data candidates, in accordance with the user's operation accepted by the input unit.

According to the second aspect, the user can see on the first device, data candidates transmittable to the second device based on the sensing information transmitted from the second device to the first device and can select which data is to be transmitted to the second device. Therefore, the user can select data to be subjected to desired processing in the second device. User's willingness to use the second device can thus be enhanced.

According to a third aspect of the present invention, the first device further includes a first processing unit (34) for performing first information processing. The second device further includes a second processing unit for performing second information processing (110) based on the data received from the first device. The second information processing includes processing (S801) for changing the data received from the first device to data having different information. The second communication unit is adapted to transmit the data changed in the second information processing to the first device, and the first information processing includes processing (S746, S750) based on the changed data received from the second device.

According to the third aspect, as the first device performs processing based on the data changed by the second device, performance in the second device is readily reflected in the first device. Therefore, user's willingness to play, with positive use of a communication function between the first device and the second device, can be enhanced.

According to a fourth aspect of the present invention, the data transmitted from the first device to the second device includes image data, and the second information processing includes processing for varying a manner of display of the image data based on at least one of the number of times of occurrence of motion sensed by the motion sensing unit and presence/absence of motion sensing by the motion sensing unit.

According to the fourth aspect, as image display of which manner of display has been varied depending on the number of times of occurrence of motion and/or presence/absence of motion sensing is provided to the user, the user can visually grasp contents of processing in accordance with the result of sensing by the motion sensing unit. Thus, user's willingness to use the second device can further be enhanced.

According to a fifth aspect of the present invention, the selection unit is adapted to select course data to be transmitted to the second device, from among a plurality of pieces of course data, based on the sensing information. The data transmitted from the first device to the second device includes the selected course data (210*b*). The second information processing further includes a unit (110, S806) for generating a game course image in accordance with the course data, and a unit (110, S806, S810) for outputting the game course image and the image data.

According to the fifth aspect, as the new stage can be selected depending on a result of detection of motion, the user can be motivated into motion (exercise).

According to a sixth aspect of the present invention, the second device further includes a time counting unit (117) for counting lapse of time since reception of the data from the first device, and the second information processing includes processing (S822 to S828) based on lapse of time counted by the time counting unit.

According to the sixth aspect, in a typical embodiment, when absence of sensing of motion by the motion sensing unit of the second device continues for a prescribed period of time, a message urging the user to use the second device is provided to the user. Thus, user's willingness to more positively use the second device can be enhanced.

According to a seventh aspect of the present invention, the result of sensing includes the number of times of occurrence of motion sensed by the motion sensing unit per unit time, and the second information processing includes processing (S830 to S836) based on the number of times of occurrence per unit time.

According to the seventh aspect, as the processing is performed based not on a cumulative value of the number of times of occurrence of motion but on the number of times of occurrence of motion sensed per unit time, the user can be motivated to continue exercise.

According to an eighth aspect of the present invention, the first device further includes a first processing unit (34) for performing first information processing and a first storage unit (64, 68). The first processing unit is adapted to store first processing result information indicating a result of processing in the first information processing in the first storage unit. The selection unit includes a unit (34, S506) for evaluating the first processing result information stored in the first storage unit, and a unit (34, S508) for selecting the data to be transmitted, based on a result of evaluation of the first processing result information in addition to the received sensing information.

According to the eighth aspect, a result of processing in the first information processing performed in the first device is reflected on selection of data to be transmitted from the first device to the second device. Accordingly, processing in coordination between the first device and the second device is performed, and user's willingness to play, with positive use of a communication function between the first device and the second device, can be enhanced.

According to a ninth aspect of the present invention, the second device further includes a second processing unit (110) for performing second information processing based on the data received from the first device. The second information processing includes processing (S801) for changing the data received from the first device to data having different information. The second communication unit is adapted to transmit the data changed in the second information processing to the first device, and the first information processing includes processing (S746, S750) based on the changed data received from the second device.

According to the ninth aspect, as the first device performs processing based on the data changed by the second device, performance in the second device is readily reflected in the first device. Therefore, user's willingness to play, with positive use of a communication function between the first device and the second device, can be enhanced.

According to a tenth aspect of the present invention, the first information processing includes game processing in which a character object reaches a different stage in a stepwise fashion in accordance with a user's operation. The first processing unit is adapted to store, when the character object reaches a new stage, identification information indicating the reached stage in the first storage unit (S122, S124). The selection unit is adapted to select data corresponding to the identification information stored in the first storage unit.

According to the tenth aspect, as the data to be transmitted from the first device to the second device is selected in accordance with the stage reached in the first device, user's willingness to play, with positive use of a communication function between the first device and the second device, can be enhanced.

According to an eleventh aspect of the present invention, the first storage unit is adapted to further store a plurality of pieces of acquirable character data (210*c*) and a plurality of pieces of possessed character data (207*c*). The first device further includes a unit (34, S304) for selecting possessed character data to be transmitted to the second device, from among the plurality of pieces of possessed character data, in accordance with a user's operation. The selection unit is adapted to select acquirable character data to be transmitted to the second device from among the plurality of pieces of acquirable character data based on the sensing information (S312). The data transmitted from the first device to the second device further includes the selected acquirable character data and the selected possessed character data. The second information processing includes processing (S916) for changing the acquirable character data to already-acquired character data based on the result of sensing. The data transmitted from the second device to the first device includes the already-acquired character data. The first information processing includes change of the possessed character data based on the received already-acquired character data (S746).

According to the eleventh aspect, an acquirable character is varied based on motion, the character can be acquired based on the motion, and the acquired character can be turned to a possessed character. Therefore, the user can be motivated into motion (exercise).

According to a twelfth aspect of the present invention, the result of sensing includes at least one of the number of times of occurrence of motion sensed by the motion sensing unit and presence/absence of motion sensing by the motion sensing unit.

According to a thirteenth aspect of the present invention, the selection unit is adapted to select the data to be transmitted based on at least one of the number of times of occurrence of motion sensed by the motion sensing unit and presence/absence of motion sensing by the motion sensing unit.

According to the twelfth and thirteenth aspects, as the number of times of occurrence of motion sensed by the motion sensing unit and/or presence/absence of motion sensing are/is reflected on the data to be transmitted, the user can set up a specific goal for the number of times of motion (the number of steps) sensed, for example, as a result of walking. Thus, user's willingness to use the second device can further be enhanced.

According to a fourteenth aspect of the present invention, the motion sensing unit is adapted to sense the number of steps of a user when the user wears the second device.

According to the fourteenth aspect, as the user walks while wearing the second device, various types of processing in accordance with a result thereof are performed in the first device and the second device. Therefore, user's willingness to positively perform exercise such as walking can be enhanced and contribution to promotion of health of the user can be made.

According to a fifteenth aspect of the present invention, a storage medium storing a program executed by a computer (100) interacting with a communication unit (116), a storage unit (114, 115), and a motion sensing unit (112) is provided. The present program includes reception instructions (S620) for receiving data from an information processing device (10) connected through the communication unit, storage instructions (S630) for storing the data received from the information processing device in the storage unit, obtaining instructions (S802, S803, S804) for obtaining a result of sensing by the motion sensing unit, and transmission instructions (S668) for transmitting the result of sensing to the information processing device (10). The information processing device is adapted to transmit data selected from among a plurality of pieces of data stored in advance based on the result of sensing to a reception unit (S506 to S516).

An information processing device (100) according to a sixteenth aspect of the present invention includes: a reception unit (110, 116; S620) for receiving data from another information processing device (10), a storage unit (110, 114, 115; S630) for storing the data received from another information processing device; a motion sensing unit (110, 112; S802) for sensing motion; and a transmission unit (110, 116; S668) for transmitting a result of sensing by the motion sensing unit to another information processing device. Another information processing device is adapted to transmit data selected from among a plurality of pieces of data stored in advance based on the result of sensing to the reception unit (S506 to S516).

In the description above, for better understanding of the present invention, reference numerals, supplemental explanation and the like for showing correspondence with embodiments which will be described below are provided, however, they are not intended to limit the present invention in any manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B are side views of the pedometer according to the embodiment of the present invention.

FIG. 7 is a block diagram showing an internal configuration of the pedometer according to the embodiment of the present invention.

DESCRIPTION OF THE PREFERRED EMBODIMENTS

Figure 1:
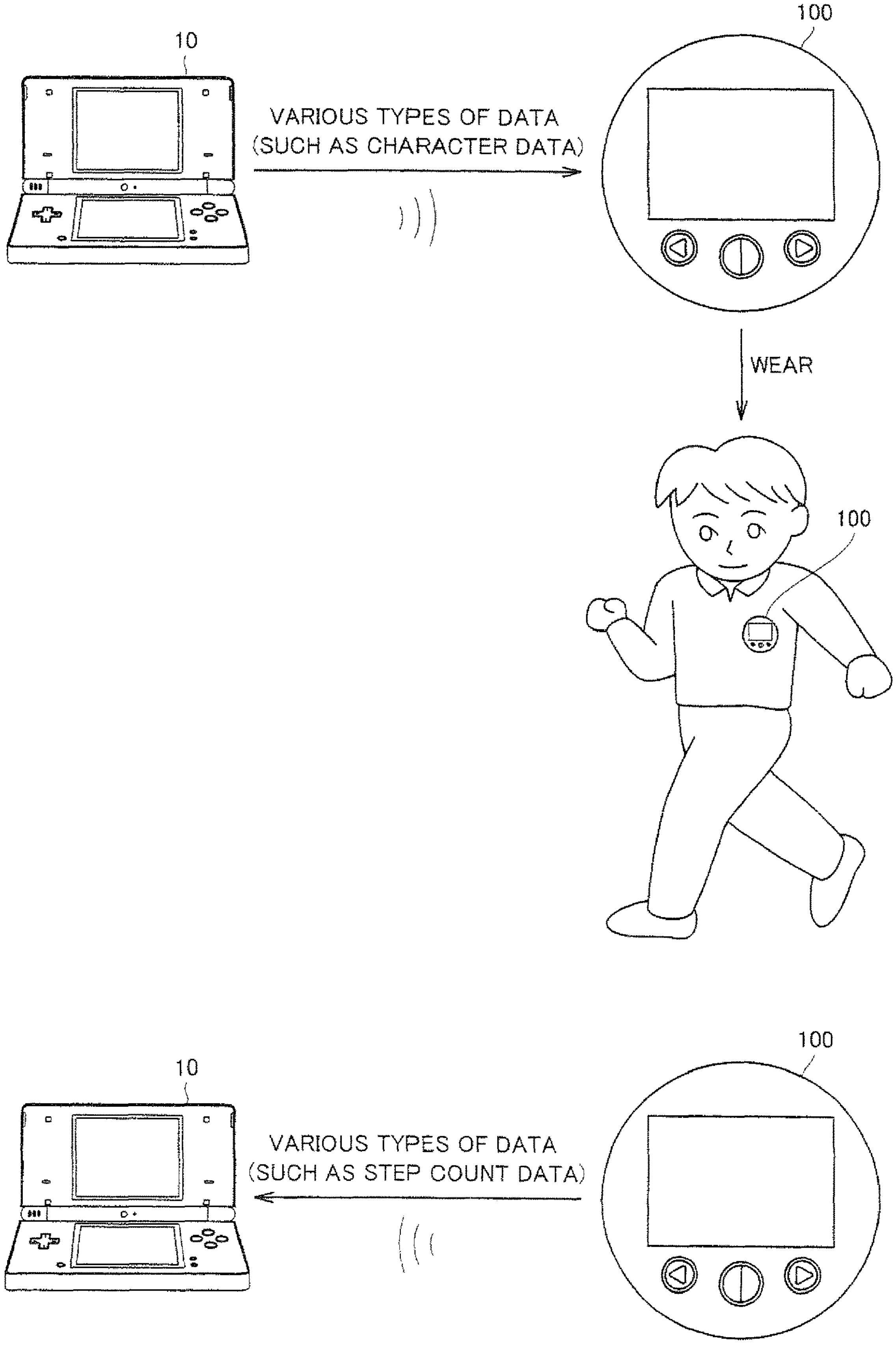
FIG. 1 is a diagram showing a manner of use of an information processing system according to an embodiment of the present invention.

An embodiment of the present invention will be described in detail with reference to the drawings. The same or corresponding elements in the drawings have the same reference characters allotted, and description thereof wilt not be repeated.

An information processing system including a portable game device 10 representing a typical example of a first device and a pedometer 100 representing a typical example of a second device (or a computer) will be illustrated as a representative of the information processing system according to the present invention. It is noted that the first device according to the present invention is not limited to the portable game device and a stationary game device may be applicable. In addition, an information processing device of any type adapted to processing by a processor may be employed as the first device, and for example, a personal computer, a work station, a PDA (Personal Digital Assistant), a portable telephone, and the like may be applicable.

In addition, a device of any type having a configuration for sensing motion may be applicable as the second device according to the present invention, and for example, a portable telephone having a motion sensing function, an accessory or shoes incorporating the motion sensing function, and the like may be applicable.

Moreover, a program according to the present invention may be incorporated as a partial function of various applications executed on a personal computer.

<Manner of Use>

A manner of use of the information processing system according to the present embodiment will initially be described.

Referring to FIG. 1, the information processing system according to the present embodiment includes game device 10 and pedometer 100. Game device 10 and pedometer 100 can communicate data with each other. A data communication scheme between game device 10 and pedometer 100 may be implemented by wireless communication using radio waves (typically, wireless LAN) or infrared (typically, IrDA (Infrared Data Association)), or wired communication using a USB (Universal Serial Bus) or Ethernet. As will be described later, a configuration using infrared communication (Ir communication) will be exemplified herein.

Game device 10 provides a game in which a character object such as a monster (hereinafter also simply referred to as a "character") is gotten, grown and exchanged (hereinafter also simply referred to as a "get and growth game") by executing a program as will be described later. As the user plays the get and growth game, data relating, to the character(s) acquired by the user is generated and accumulated in game device 10.

Game device 10 can transmit to pedometer 100, all or a part of various types of data relating to the character(s) acquired by the user through playing. Pedometer 100 provides various screen displays or audio outputs based on the data received from game device 10. In addition, pedometer 100 can also provide a game relating to the character received from game device 10 based on a result of sensing of motion provided to pedometer 100 (hereinafter also simply referred to as a "step count game"). Moreover, as this game proceeds, pedometer 100 generates result information in accordance with the result of sensing of motion and updates (processes) the data received from game device 10. Pedometer 100 can return various types of data including these generated data and updated data to game device 10. Game device 10 can update corresponding data that has been held, based on the various types of data returned from pedometer 100, and can resume the get and growth game based on the updated data.

A more specific manner of use is such that the user can transfer a character acquired by playing the get and growth game in game device 10 from game device 10 to pedometer 100. Then, as the user walks while wearing pedometer 100 (including various exercises such as running), the user can grow the character transferred to pedometer 100, get a new character, and obtain a new item. In addition, the user can return the character grown in pedometer 100, or a character, an item or the like newly acquired (in pedometer 100) to game device 10.

Thus, the user can get and grow a character by operating game device 10, and can transfer the gotten character to pedometer 100, to thereby obtain feeling as if the user "walked together with" the character. In addition, as the user himself/herself does exercise, the user can also obtain feeling as if the user "himself/herself grew" the gotten character. Moreover, a degree of growth of the character, the number of new characters and/or items that can be acquired, or the like in pedometer 100 depends on the number of times of sensed motion or the like, so that the user can enjoy exercise such as walking, aiming to grow the character or to acquire a new character and/or an item.

<External Configuration of Game Device>

Figure 2:
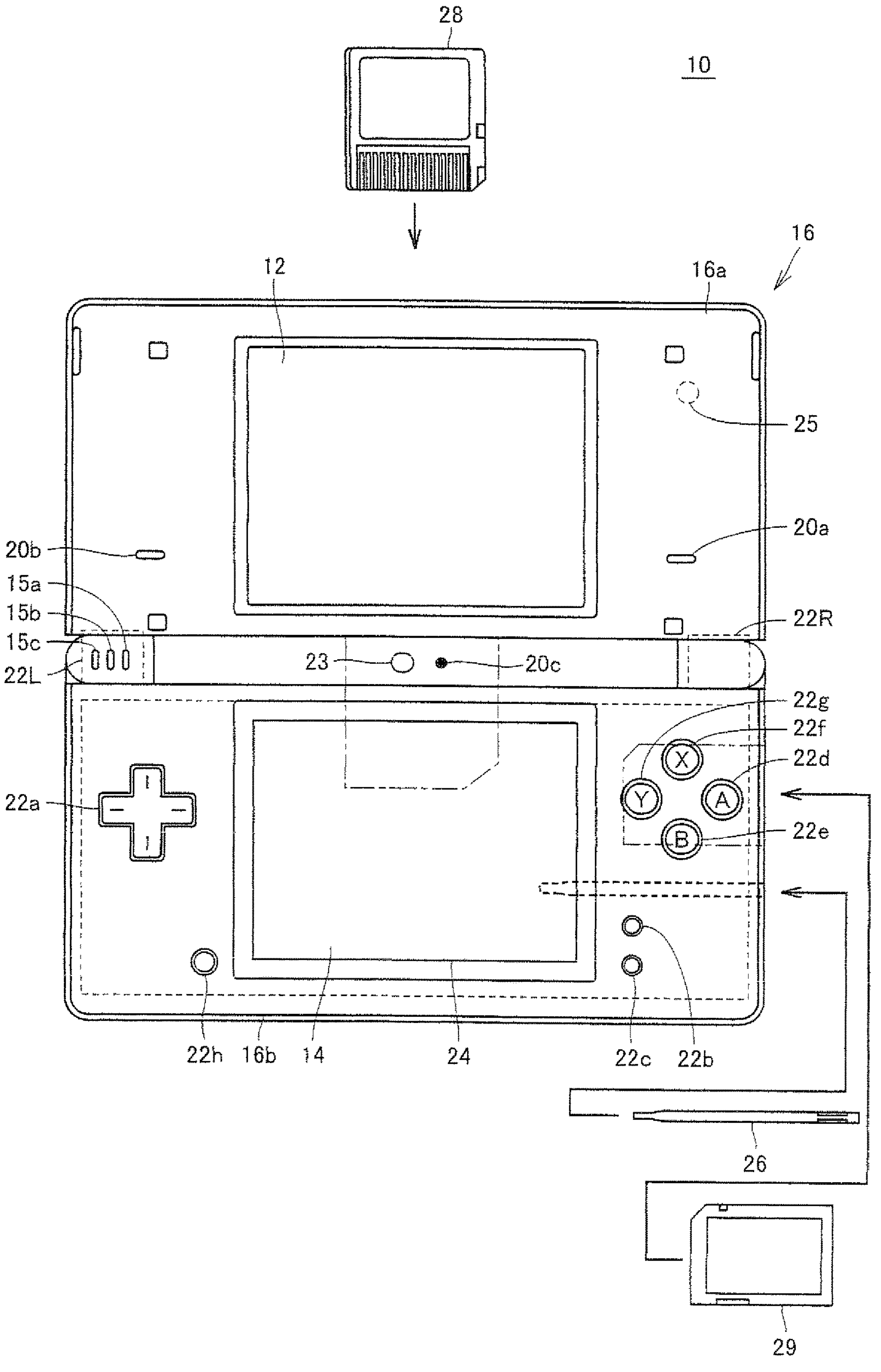
FIG. 2 is a schematic diagram showing appearance of a game device according to the embodiment of the present invention.

Referring to FIG. 2, game device 10 according to the embodiment of the present invention includes a first liquid crystal display (LCD; hereinafter also simply referred to as an "LCD") 12 and a second liquid crystal display (LCD) 14 serving as a display portion. LCD 12 and LCD 14 are accommodated in a housing 16 so as to satisfy prescribed positional relation. In the example shown in FIG. 2, housing 16 is constituted of an upper housing 16*a* and a lower housing 16*b*. LCD 12 is accommodated in upper housing 16*a*, while LCD 14 is accommodated in lower housing 16*b*. Therefore, LCD 12 and LCD 14 are arranged in proximity to each other, in a manner aligned in a vertical (up-down) direction.

Though an LCD is employed as the display portion in the present embodiment, an EL (Electronic Luminescence) display, a plasma display or the like may be employed instead of the LCD.

As shown in FIG. 2, upper housing 16*a* is slightly larger in a two-dimensional shape than LCD 12, and an opening is provided in one main surface so as to expose a display surface of LCD 12. On the other hand, a two-dimensional shape and a size of lower housing 16*b* are also designed similarly to upper housing 16*a*, and an opening is provided in a central portion in terms of a horizontal direction so as to expose a display surface of LCD 14.

Sound emission holes 20*a* and 20*b* corresponding to a right speaker 36*a* and a left speaker 36*b* (see FIG. 3) respectively are arranged in one main surface of upper housing 16*a*, on respective opposing sides of LCD 12. In addition, an outer camera 25 for picking up an image of a person, a landscape or the like viewed from the user is provided on the other main surface of upper housing 16*a*.

Upper housing 16*a* and lower housing 16*b* are pivotably coupled to each other, through a part of a lower side (lower end) of upper housing 16*a* and a part of an upper side (upper end) of lower housing 16*b*. For example, when game device 10 is not in use, upper housing 16*a* is folded by relatively pivoting the same such that the display surface of LCD 12 and the display surface of LCD 14 face each other. Then, damage such as flaw in the display surface of LCD 12 and the display surface of LCD 14 can be prevented. Instead of such a structure as pivotably coupling upper housing 16*a* and lower housing 16*b* to each other, housing 16 in which both of these are integrally arranged (in a fixed manner) may be employed.

A microphone hole 20*c* communicating with a microphone (not shown) and an inner camera 23 for picking up an image of the user or the like are provided in the center of the coupling portion of upper housing 16*a* and lower housing 16*b*. A game can proceed based on audio data in accordance with voice and sound collected by this microphone. In addition, progress of a game based on data of an image picked up by inner camera 23, storage of the image data, or the like is also possible.

An operation switch 22 (22*a*, 22*b*, 22*c*, 22*d*, 22*e*, 22*f*, 22*g*, 22*h*, 22L, 22R) is provided in lower housing 16*b*.

Operation switch 22 includes a direction indication switch (cross-shaped switch) 22*a*, a start switch 22*b*, a select switch 22*c*, an operation switch (A button) 22*d*, an operation switch (B button) 22*e*, an operation switch (X button) 22*f*, an operation switch (Y button) 22*g*, a power switch 22*h*, an operation switch (L button) 22L, and an operation switch (R button) 22R.

Direction indication switch 22*a* and power switch 22*h* are arranged on one main surface of lower housing 16*b*, on the left of LCD 14. Other switches 22*b* to 22*g* are arranged on that main surface of lower housing 16*b*, on the right of LCD 14. Operation switches 22L and 22R are arranged at a left corner portion and a right corner portion of an upper end surface of lower housing 16*b*, respectively. It is noted that, as operation switches 22L and 22R are arranged on a back surface of lower housing 16*b* and they are hidden behind the coupling portion when viewed from the front as shown in FIG. 2, they are shown with a dashed line.

Direction indication switch 22*a* functions as a digital joy stick. When one of four pressing portions is operated, an instruction as to a direction of travel (or a direction of movement) of a player object (or a character object) operable in a game in progress is accepted. Alternatively, direction indication switch 22*a* accepts an instruction as to a direction of movement or the like of a cursor. Alternatively, a specific role can also be assigned to each of the four pressing portions, and in this case, when any of the pressing portions is operated, the role corresponding to the operated pressing portion is indicated (designated).

Start switch 22*b* is implemented by a push button and accepts an instruction for start (resume) or pause of the game. Select switch 22*c* is implemented by a push button and accepts an instruction as to selection of a game mode or the like.

Operation switch 22*d* (A button) is implemented by a push button and it accepts an instruction as to any action on a player object including hitting (punching), throwing, grasping (obtaining), riding, jumping, or the like. For example, in an action game, jumping, punching, actuating a weapon, or the like can be indicated by operating operation switch 22*d*. Alternatively, in a role-playing game (RPG) or simulation RPG, obtaining of an item, selection and determination of a weapon/a command, or the like can be indicated by operating operation switch 22*d*. In addition, operation switch 22*e* (B button) is implemented by a push button and accepts an instruction as to change of a game mode selected with select switch 22*c*, an operation for canceling a previously determined action, or the like.

Operation switch 22*f* (X button) and operation switch 22*g* (Y button) are both implemented by a push button, and they are used for an auxiliary operation when operation switch 22*d* (A button) and operation switch 22*e* (B button) alone are not sufficient for proceeding with the game. It is noted that operation switch 22*f* (X button) and operation switch 22*g* (Y button) may be used for performing an operation the same as that with operation switch 22*d* (A button) and operation switch 22*e* (B button), or they may not be used at all.

Power switch 22*h* accepts an instruction for turning ON/OFF power of game device 10. In addition, power switch 22*h* may be used for performing an operation to stop a program being executed in game device 10 and to return to a main menu.

Operation switch 22L (left push button) and operation switch 22R (right push button) are both implemented by a push button, and they accept an instruction as to an operation the same as the operation assigned to operation switch 22*d* (A button) and operation switch 22*e* (B button) respectively. Alternatively, operation switch 22L (left push button) and operation switch 22R (right push button) may be used for an auxiliary operation independent of operation switch 22*d* (A button) and operation switch 22*e* (B button).

A touch panel 24 is provided on an upper surface of LCD 14. Touch panel 24 may be of any type such as a resistive film type, an optical type (infrared type), and a capacitive coupling type. Touch panel 24 is a pointing device for accepting an instruction on any position (coordinate) on an LCD 14 screen from the user. When the user uses a stick (stylus pen) 26 or a finger (hereinafter also referred to as "stick 26 etc.") to press, pat or touch the upper surface of touch panel 24 (hereinafter also referred to as "touch operation"), touch panel 24 detects a coordinate of a position where a touch operation with stick 26 etc. was performed and outputs coordinate data corresponding to the detected coordinate.

In the present embodiment, it is assumed that the display surface of LCD 14 (and also LCD 12) has a resolution of 256 dots×192 dots. Therefore, detection accuracy of touch panel 24 is also set to 256 dots×192 dots in conformity with the display screen, however, detection accuracy of touch panel 24 may not necessarily be the same as that of a display screen.

Thus, game device 10 has LCD 12 and LCD 14 serving as a display portion of two screens and touch panel 24 is provided on an upper surface of any one of them (in the present embodiment, on LCD 14). Therefore, game device 10 is configured to have two display screens and two series of operation portions.

Though LCD 12 and LCD 14 are vertically aligned in the present embodiment, arrangement of two LCDs may be modified as appropriate. In another embodiment, LCD 12 and LCD 14 may be aligned in a horizontal direction, Though two LCDs are provided in the present embodiment, the number of LCDs serving as the display portion may be varied as appropriate. In another embodiment, two display areas may be defined in an up-down direction in a single, vertically long LCD so that two game screens are handled as independent display areas. Alternatively, two display areas are defined in a left-right direction in a single, horizontally long LCD so that two game screens are handled as independent display areas.

Stick 26 can be accommodated, for example, in an accommodation portion (shown with a dashed line in FIG. 2) provided in lower housing **16*b*** and it is taken out as necessary.

An insertion opening (shown with a chain dotted fine in FIG. 2) for attaching a cartridge 28 is provided in the upper end surface of lower housing **16*b*. A connector 32 (see FIG. 3) for electrically connecting game device 10 and cartridge 28 to each other is provided within this insertion opening. A CPU (Central Processing Unit) 34 (see FIG. 3) of game device 10 can access cartridge 28 through connector 32**.

In addition, an insertion opening (shown with a chain double dotted line in FIG. 2) for attaching a memory card 29 is provided in a right end surface of lower housing **16*b*. A connector 33 (see FIG. 3) for electrically connecting game device 10 and memory card 29 to each other is provided within this insertion opening. CPU 34 (see FIG. 3) of game device 10 can access memory card 29 through connector 33**.

Cartridge 28 and memory card 29 are common in storing data in a non-volatile manner. In principle, however, cartridge 28 is a device specialized for game device 10, while memory card 29 is a general-purpose device. Typically, memory card 29 is implemented by an SD (Secure Digital) card or the like.

Though not shown in FIG. 2, a box for accommodating a battery for driving game device 10 is provided in a back surface of lower housing **16*b*. In addition, a jack for attaching a headphone or the like is provided in a lower end surface of lower housing 16*b*** and a volume switch is provided in a left side surface thereof.

<Internal Configuration of Game Device>

Figure 3:
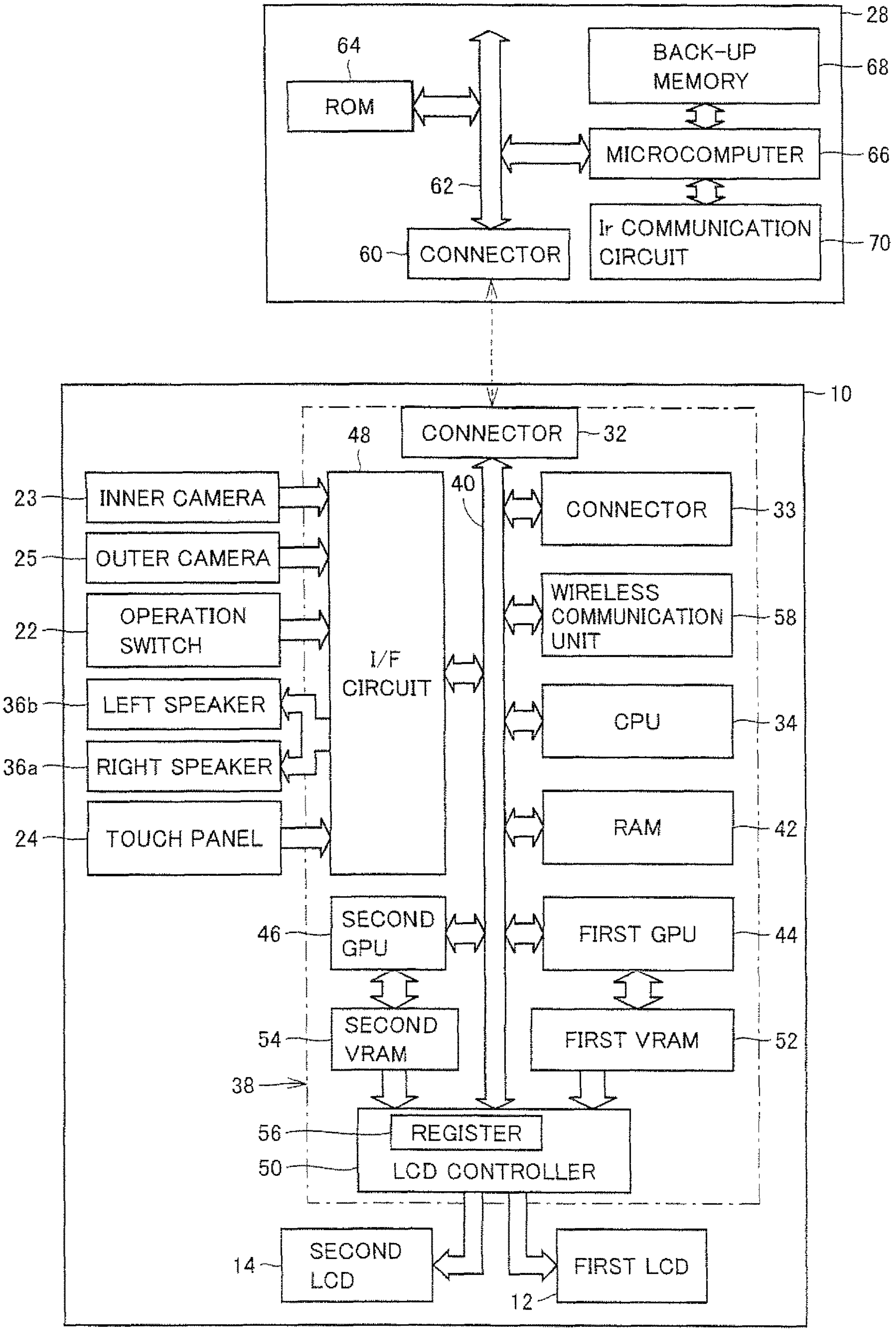
FIG. 3 is a block diagram showing an internal configuration of the game device according to the embodiment of the present invention.

FIG. 3 is a block diagram showing an internal configuration of game device 10 according to the embodiment of the present invention.

Referring to FIG. 3, game device 10 includes an electronic circuit board 38 on which circuit components are mounted. More specifically, electronic circuit board 38 includes connectors 32 and 33, CPU 34, a RAM (Random Access Memory) 42, a first graphic processing unit (GPU; hereinafter also simply referred to as "GPU") 44, a second graphic processing unit (GPU) 46, an input and output interface circuit (hereinafter also simply referred to as an "I/F circuit") 48, an LCD controller 50, and a wireless communication unit 58. Each of these units is configured to be able to transmit data through a bus 40. In addition, electronic circuit board 38 includes a first video RAM (hereinafter also simply referred to as "VRAM") 52 and a second video RAM (VRAM) 54.

As described above, cartridge 28 is removably attached to connector 32. A configuration of cartridge 28 will be described later. In addition, as shown in FIG. 2, memory card 29 is removably attached to connector 33.

CPU 34 reads a program, image data, audio data, and the like from cartridge 28 connected to connector 32, memory card 29 connected to connector 33, a not-shown non-volatile memory embedded in game device 10, or the like, and loads it to RAM 42 Namely, RAM 42 is used as a buffer memory and/or a working memory. By executing the program loaded to RAM 42, CPU 34 provides the get and growth game or the like according to the present embodiment representing a typical example of information processing. In addition, CPU 34 causes RAM 42 to temporarily store generated data (such as a character object, various types of data relating to the character object, flag data, or the like), as the game proceeds.

Each of GPU 44 and GPU 46 functions as a part of a rendering unit, and it is typically configured with a single chip ASIC (Application Specific Integrated Circuit). More specifically, each of GPU 44 and GPU 46 generates image data representing contents to be displayed on LCD 12 and LCD 14, in accordance with a graphics command (an image creation command) provided from CPU 34. It is noted that CPU 34 may provide an image generation program (included in a game program) necessary for generating image data to GPU 44 and GPU 46, in addition to the graphics command.

VRAM 52 is connected between GPU 44 and LCD controller 50, and VRAM 54 is connected between GPU 46 and LCD controller 50. Each of VRAM 52 and VRAM 54 is provided with an area for storing image data written by CPU 34 and an area for storing rendering data provided to LCD 12 or LCD 14 (rendering buffer). A frame buffer storing rendering data for one screen or a fine buffer storing rendering data for one line may be adopted as the rendering buffer.

CPU 34 writes the image data necessary for rendering in prescribed areas of VRAM 52 and VRAM 54 through GPU 44 and GPU 46, respectively. GPU 44 accesses VRAM 52 to read the image data written by CPU 34, generates rendering data in accordance with the contents to be displayed on a corresponding LCD, and writes the rendering data in the rendering buffer of VRAM 52, Similarly, CPU 46 accesses VRAM 54 to read the image data written by CPU 34, generates rendering data in accordance with the contents to be displayed on a corresponding LCD, and writes the rendering data in the rendering buffer of VRAM 54.

LCD controller 50 selectively outputs the rendering data stored in the respective rendering buffers of VRAM 52 and VRAM 54 to LCD 12 and LCD 14. More specifically, LCD controller 50 includes a register 56 for storing data indicating connection relation between VRAM 52, VRAM 54 and LCD 12, LCD 14. Register 56 is configured, for example, to store a flag of 1 bit, and it is set to any of "0" and "1" in response to an instruction from CPU 34. When a flag value of register 56 is set to "0", LCD controller 50 outputs the rendering data stored in VRAM 52 to LCD 12 and outputs the rendering data stored in VRAM 54 to LCD 14. On the other hand, when the flag value of register 56 is set to "1", LCD controller 50 outputs the rendering data stored in CRAM 52 to LCD 14 and outputs the rendering data stored in VRAM 54 to LCD 12. By thus changing the flag value of register 56 as appropriate, the contents displayed on LCD 12 and LCD 14 can be interchanged.

Though a configuration in which VRAM 52 and VRAM 54 are provided independently of RAM 42 has been illustrated in the present embodiment, a partial area of RAM 42 may be used as an area corresponding to VRAM 52 and VRAM 54.

Operation switch 22, touch panel 24, inner camera 23, outer camera 25, right speaker 36*a*, and left speaker 36*b* are connected to I/F circuit 48.

As described above, operation switch 22 includes switches 22*a*, 22*b*, 22*c*, 22*d*, 22*e*, 22*f*, 22*g*, 22L, and 22R. When any switch is operated, a corresponding operation signal (operation data) is provided to CPU 34 through I/F circuit 48. Similarly, touch panel 24 provides coordinate data detected in accordance with a user's touch operation to CPU 34 through I/F circuit 48. Inner camera 23 and outer camera 25 provide image data obtained as a result of image pick-up to CPU 34 through I/F circuit 48. Namely, operation switch 22 and touch panel 24 function as input means for accepting a user's operation.

In addition, CPU 34 provides audio data necessary for a game, such as a game music (BGM), sound effect, and utterance (onomatopoeia) of a character object to right speaker 36*a* and left speaker 36*b* through I/F circuit 48, as the game proceeds. Then, sound in accordance with the provided audio data is output from right speaker 36*a* and left speaker 36*b*. It is noted that right speaker 36*a* and left speaker 36*h* are hereinafter also simply referred to as "speaker 36".

Wireless communication unit 58 transmits and receives data to and from another game device 10 or communication equipment by radio. Game device 10 can be connected to a not-shown network through wireless communication unit 58, so that downloading of a program or data from a server on the network, uploading of the data to the server, communication with another game device 10 through the network, and the like can be carried out.

<Internal Configuration of Memory Card>

Still referring to FIG. 3, cartridge 28 includes a connector 60 joined to connector 32. A ROM 64 and a microcomputer 66 are connected to connector 60 through a bus 62. A back-up memory 68 and an Ir communication circuit 70 are connected to microcomputer 66.

Microcomputer 66 controls writing into back-up memory 68 and reading (from back-up memory 68) and infrared communication (Ir communication) using Ir communication circuit 70, under the control of CPU 34. Namely, CPU 34 writes data into back-up memory 68 and reads data from back-up memory 68 through microcomputer 66. In addition, CPU 34 transmits and receives data to and from pedometer 100 through microcomputer 66 and Ir communication circuit 70. Thus, Ir communication circuit 70 functions as communication means for communicating data with pedometer 100. Though not specified in FIG. 2, a communication port of Ir communication circuit 70 is provided in a portion exposed when cartridge 28 is attached to the insertion portion (such as the upper end surface).

ROM 64 stores in advance, a program for a game executed on game device 10, image data (such as a text image, a character object image, a background image, an item image, an icon (button) image, a message image, and the like), data of voice and sound (music) (audio data) necessary for the game, and the like. Back-up memory 68 stores (saves) in-progress game data, data of a result of the game, or the like in a non-volatile manner. A non-volatile memory such as a flash memory, an SCAM supplied with power from a battery, or the like is used as the back-up memory.

<External Configuration of Pedometer>

Figure 4:
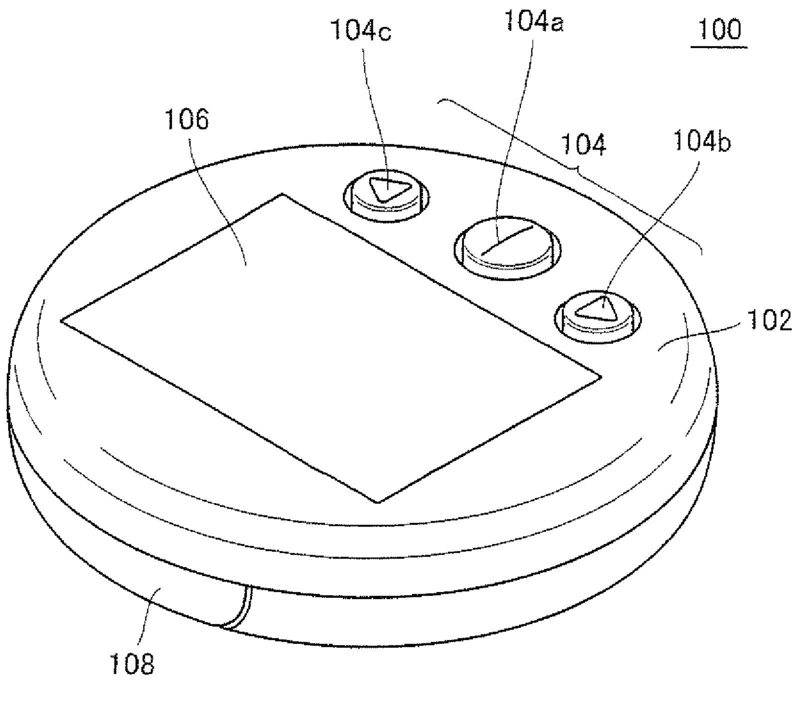
FIG. 4 is a perspective view showing a pedometer according to the embodiment of the present invention.
Figure 5D:
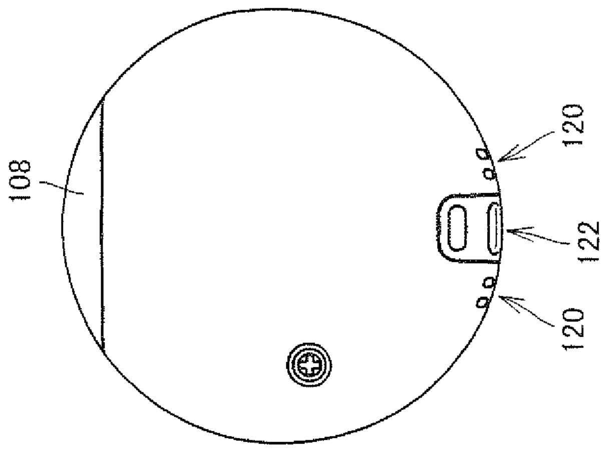
FIGS. 5A to 5D are four orthogonal views of the pedometer according to the embodiment of the present invention.
Figure 5C:
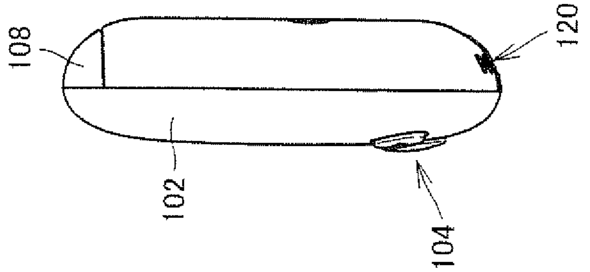
Figure 5B:
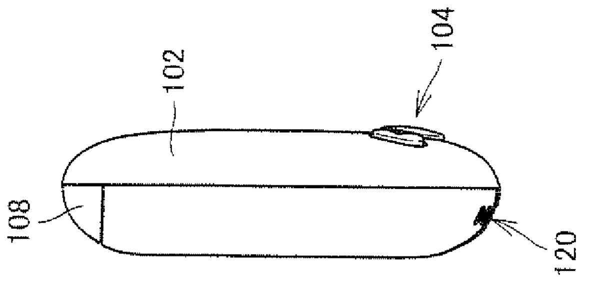
Figure 5A:
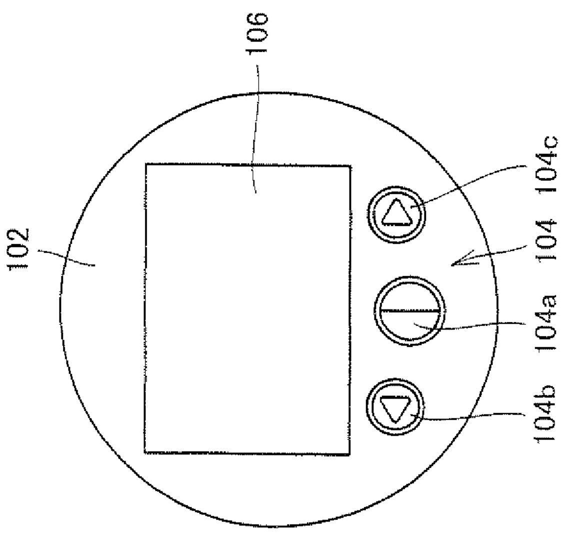

FIG. 4 is a perspective view showing pedometer 100 according to the embodiment of the present invention. FIGS. 5A to 5D are four orthogonal views of pedometer 100 according to the embodiment of the present invention. FIG. 5A shows a front view of pedometer 100, FIG. 5B shows a left side view of pedometer 100, FIG. 5C shows a right side view of pedometer 100, and FIG. 5*n* shows a rear view of pedometer 100. FIGS. 6A and 6B are side views of pedometer 100 according to the embodiment of the present invention. FIG. 6A shows a bottom view of pedometer 100 and FIG. SIB shows a top view of pedometer 100.

Referring to FIGS. 4 and 5A, pedometer 100 has a disc-shaped housing 102. Housing 102 is adapted to a size readily accommodated in a pocket or the like of the user. An operation switch 104 and an LCD 106 are provided on one main surface (upper surface) of housing 102.

Operation switch 104 includes a communication start switch 104*a* and operation switches 104*b* and 104*c*. Communication start switch 104*a* accepts an indication to start data communication between pedometer 100 and cartridge 28 (that is, game device 10). Typically, when the user presses communication start switch 104*a* while Ir communication circuit 70 (see FIG. 3) of cartridge 28 is in a communication stand-by state, data communication is started between pedometer 100 and game device 10. in addition, operation switches 104*b* and 104*c* accept a user's indication regarding various types of information processing provided by pedometer 100.

LCD 106 is an output device for displaying various types of image data. As will be described later, an image displayed on LCD 106 is mainly provided from game device 10. Namely, LCD 106 is a display capable of display based on the image data. Though a dot-matrix type liquid crystal display is basically employed as LCD 106, a segment-type Liquid crystal display or a liquid crystal display implemented as combination thereof may be employed. In addition, an EL display or the like may be employed as the display portion.

Referring to FIGS. 4, 5B to 5D, and 6B, an infrared communication port 108 optically communicating with Ir communication circuit 70 is provided in an upper side surface (tip end surface) of housing 102.

Referring to FIGS. 5C, 5D and 6A, a sound emission hole 120 communicating with a buzzer 118 (see FIG. 7) which will be described later is provided in a lower side surface of housing 102. In addition, for example, a coin-shaped lithium battery is used as an operation power supply of pedometer 100. The coin-type lithium battery is attached through an insertion port provided at a position proximate to sound emission hole 120 of housing 102 and a battery lid 122 is detachably provided to the insertion port.

<Internal Configuration of Pedometer>

FIG. 7 is a block diagram showing an internal configuration of pedometer 100 according to the embodiment of the present invention. Referring to FIG. 7, pedometer 100 includes, in addition to operation switch 104 and LCD 106 described above, a CPU 110, a motion sensor 112, a ROM 113, a RAM 114, a back-up memory 115, an Ir communication circuit 116, a clock IC 117, and buzzer 118.

CPU 110 reads a program stored in advance in ROM 113 and loads the program to RAM 114. By executing the loaded program, CPU 110 controls an overall operation of pedometer 100, such as infrared communication with game device 10 through Ir communication circuit 136, progress of the game based on data received from game device 10, information processing based on a result of sensing of motion by motion sensor 112 (typically, the number of steps of the user who wears pedometer 100), image display on LCD 106 and/or audio output from buzzer 118. Namely, CPU 110 of pedometer 100 performs various types of information processing based on the data received from game device 10.

Motion sensor 112 corresponds to motion sensing means for sensing motion provided to pedometer 100. Motion sensor 112 is typically implemented by a single acceleration sensor or a plurality of acceleration sensors. More specifically, motion sensor 112 has two acceleration sensors arranged along two different axes, so that the number of steps of the user who wears pedometer 100 is sensed based on detection signals from respective acceleration sensors. By adopting such a configuration, even when the user carries pedometer 100 while he/she places pedometer 100 in a pocket, a bag or the like, the number of steps of the user can be counted or detected. Thus, motion sensor 112 is adapted to sense the number of steps of the user while the user wears pedometer 100. By arranging acceleration sensors along more axes, error in measurement can be decreased. In addition, a technique for physically sensing motion by using a spring and a pendulum may be adopted as an alternative implementation of motion sensor 112.

CPU 110 varies a manner of display of an image displayed on LCD 106 or outputs various voices and sounds from buzzer 118 by performing various types of information processing based on the result of sensing of motion by motion sensor 112 (the number of times of motion). In addition, CPU 110 causes back-up memory 115 to successively store a cumulative value of the number of times of motion sensed by motion sensor 112 and/or the number of times of motion per unit time (typically, per one hour), or the like. Moreover, CPU 110 generates result information in accordance with the result of sensing of motion by motion sensor 112 and causes back-up memory 115 to successively store the generated result information.

Ir communication circuit 116 transmits and receives data through infrared to and from Ir communication circuit 70 of game device 10. Namely, Ir communication circuit 116 functions as communication means for communicating data with game device 10. Ir communication circuit 70 and Ir communication circuit 116 establish infrared communication under a common communication protocol. Such a communication protocol may be specialized for the present information processing system, or it may be of a general-purpose type such as IrDA.

Back-up memory 115 stores a character object received from game device 10, various types of data relating to the character object, or the like. In addition, back-up memory 115 also stores the result of sensing by motion sensor 112, various types of data generated based on the result of sensing, or the like. Moreover, back-up memory 115 also stores data or the like obtained by modifying various types of data received from game device 10 in accordance with the result of sensing by motion sensor 112. A non-volatile memory such as a flash memory, an SRAM supplied with power from a battery, or the like is used as back-up memory 115.

Clock IC 117 is a circuit for counting time. More specifically, clock IC 117 generates an event every unit time in order to calculate the number of times of motion per predetermined unit time (typically, one hour). In addition, clock IC 117 can also count lapse of time since reception of a time-counting start command from CPU 110.

Buzzer 118 is an output device for outputting voice and sound in response to a command from CPU 110. Namely, buzzer 118 serves as an audio generation unit capable of audio output based on audio data, A speaker may be employed as a device for outputting voice and sound, instead of buzzer 118.

It is noted that any one of image display based on image data transmitted from game device 10 and audio output based on audio data transmitted from game device 10 may be realized.

<Data Structure>

A structure of data held in each of game device 10 and pedometer 100 will now be described.

Figure 8:
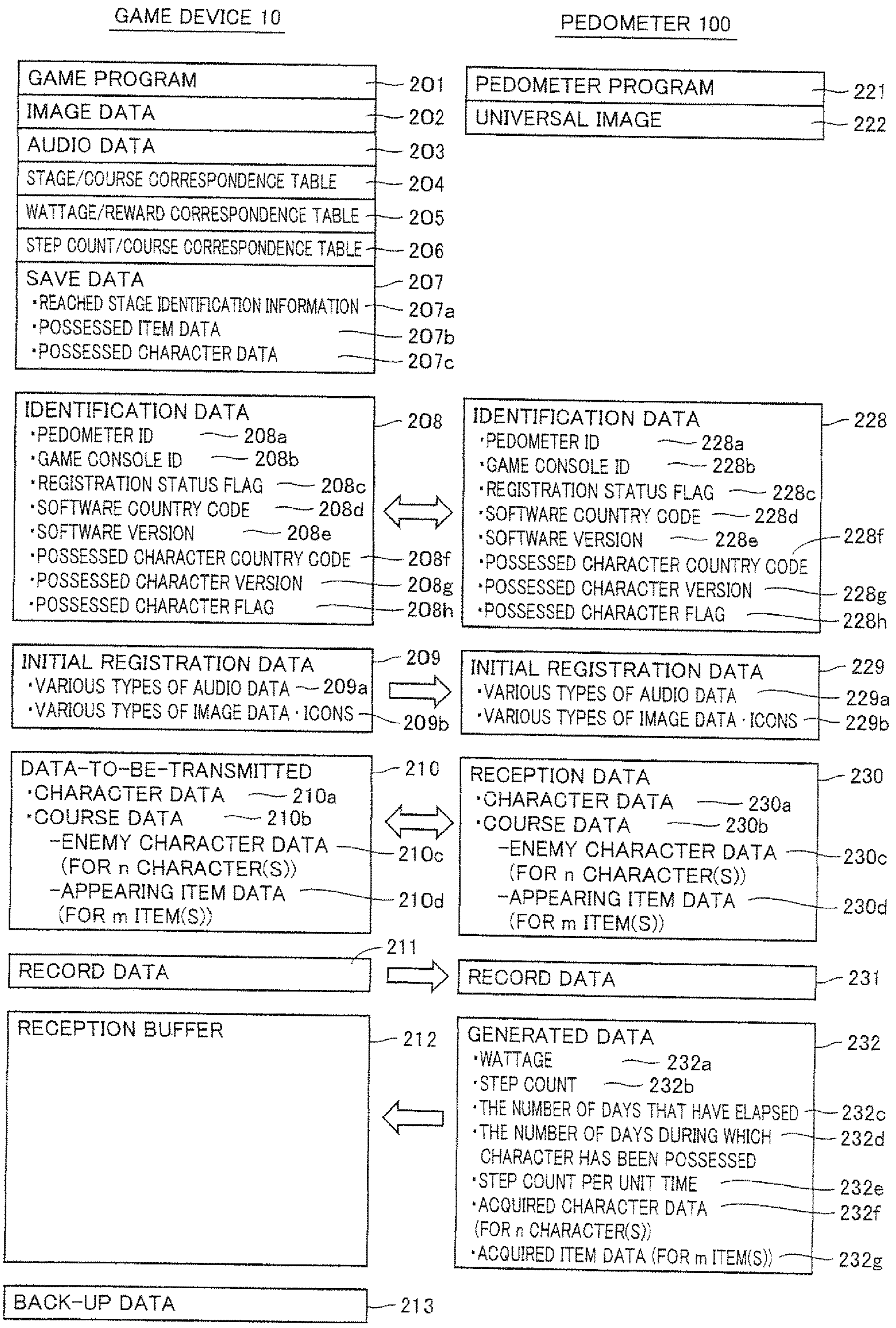
FIG. 8 is a diagram for illustrating a structure of data handled in the information processing system according to the embodiment of the present invention.

Referring to FIG. 8, game device 10 holds, as data read from ROM 64 (FIG. 3) in cartridge 28, a game program 201, image data 202, audio data 203, a stage/course correspondence table 204, a wattage/reward correspondence table 205, and a step count/course correspondence table 206.

Game program 201 is a program itself executed by CPU 34 of game device 10. Image data 202 is data for displaying an image on LCD 12 and/or LCD 14, and it is read as necessary as game program 201 is executed. Similarly, audio data 203 is data for outputting voice and sound from speaker 36, and it is read as necessary as game program 201 is executed.

Stage/course correspondence table 204 is data defining correspondence between a stage determined in accordance with progress of the get and growth game executed on game device 10 and a course of which transmission to pedometer 100 is permitted. Namely, stage/course correspondence table 204 defines which course can be transferred based on to which stage the get and growth game executed on game device 10 has progressed Wattage/reward correspondence table 205 is data defining correspondence between wattage (which will be described later) determined by the number of steps sensed by pedometer 100 and a type of an item given when the wattage is returned to game device 10. Namely, wattage/reward correspondence table 205 defines which item can be given in the get and growth game executed on game device 10 based on how much wattage is stored in pedometer 100. Step count/course correspondence table 206 is data defining correspondence between the number of steps (which will be described later) sensed by pedometer 100 and a type of a course of which selection is permitted when the number of steps is returned to game device 10. Namely, step count/course correspondence table 206 defines which course can be selected in the get and growth game executed on game device 10, based on how much step count acquired in pedometer 100 is stored.

In addition, game device 10 causes back-up memory 68 (see FIG. 3) of cartridge 28 to store save data 207. Save data 207 includes reached stage identification information 207*a*, possessed item data 207*b*, and possessed character data 207*c*. Reached stage identification information 207*a* is data indicating to which stage the get and growth game executed on game device 10 has progressed. Possessed item data 207*b* is data indicating an item acquired by the user in the get and growth game. It is noted that an item given is added to possessed item data 207*b* in accordance with the wattage received from pedometer 100. Possessed character data 207*c* is data indicating a character acquired by the user in the get and growth game.

Moreover, game device 10 holds identification data 208 used for initial registration processing (which will be described later). A part of identification data 208 is read from ROM 64 of cartridge 28. Entire identification data 208 is stored in embedded RAM 42 (FIG. 3). More specifically, identification data 208 includes a pedometer ID 208*a*, a game console ID 208*b*, a registration status flag 208*c*, a software country code 208*d*, a software version 208*e*, a possessed character country code 208*f*, a possessed character version 208*g*, and a possessed character flag 208*h*.

Pedometer ID 208*a* is data indicating identification information for identifying communication target pedometer 100. A unique value enabling identification of specific pedometer 100 among a plurality of pedometers 100 is allocated as a value of pedometer ID 208*a*. Game console ID 208*b* is data indicating identification information for identifying game device 10. A unique value enabling identification of specific game device 10 among a plurality of game devices 10 is also allocated as a value of game console ID 208*b*. Registration status flag 208*c* is data indicating whether the initial registration processing with regard to specific pedometer 100 has been completed or not. When the initial registration processing is incomplete, registration status flag 208*c* is set to "OFF". Software country code 208*d* is data indicating which country version game program 201 is in. Software country code 208*d* is used for preventing defective character display or the like. Software version 208*e* is data indicating which version game program 201 is in. Software version 208*e* is used in order to be able to adapt also to a get and growth game of a new version developed after manufacturing of pedometer 100 when a get and growth game is marketed in a plurality of versions. Possessed character country code 208*f* is data indicating which country version a character transmitted from game device 10 to pedometer 100 is in. Similarly, possessed character version 208*g* is data indicating which version a character transmitted from game device 10 to pedometer 100 is in. Software country code 208*d*, software version 208*e*, possessed character country code 208*f*, and possessed character version 208*g* are registered in advance in a program or the like executed in game device 10. Possessed character flag 208*h* is data indicating whether a character has been transmitted from game device 10 to pedometer 100 or not If the character has not been transmitted to pedometer 100, possessed character flag 208*h* is set to "OFF". If a character has been transmitted to pedometer 100, possessed character flag 208*h* is set to "ON".

In addition, game device 10 holds initial registration data 209 as data to be transmitted at the time of the initial registration processing (at the time of communication for the first time) to communication target pedometer 100. Initial registration data 209 is stored in embedded RAM 42 (see FIG. 3). More specifically, initial registration data 209 includes various types of audio data 209*a* and various types of image data•icons 209*b*.

Various types of audio data 209*a* are sound data for outputting voice and sound in pedometer 100. Various types of image data•icons 209*b* are data for displaying an image on LCD 106 of pedometer 100. Typically, various types of image data•icons 209*b* include general-purpose image data such as a menu image used in any course and commonly used image data such as an error message.

Further, game device 10 holds data-to-be-transmitted 210 as data to be transmitted to communication target pedometer 100, during normal communication. Data-to-be-transmitted 210 is stored in embedded RAM 42 (FIG. 3). More specifically, data-to-be-transmitted 210 includes character data 210*a* and course data 210*b*. Character data 210*a* is data indicating an attribute (such as a name and an image) of a character transmitted (entrusted) from game device 10 to pedometer 100. Course data 210*b* is data indicating an attribute (such as a name and an image) of a course transmitted from game device 10 to pedometer 100. Course data 210*b* further includes enemy character data (for n character(s)) 210*c* and appearing item data (for m item(s)) 210*d*. Enemy character data (for n character(s)) 210*c* is data indicating an attribute (such as a name and an image) of a character that appears as an enemy in a corresponding course, and appearing item data (for m item(s)) 210*d* is data indicating an attribute (such as a name, an image, or frequency of appearance) of an item that appears in a corresponding course. In addition, enemy character data (for n character(s)) 210*c* corresponds to acquirable character data that can be gotten in a character getting mode (see FIG. 34) in pedometer 100 which will be described later. It is noted that n and m for enemy character data 210*c* and appearing item data 210*d* may be determined as appropriate in accordance with a storage capacity or the like, however, typically, n is set to "3" and m is set to "10".

In addition, game device 10 holds record data 211 storing history of play contents in the get and growth game. Record data 211 is stored in back-up memory 68 (FIG. 3) or the like of cartridge 28 and updated in accordance with the user's operation.

Moreover, game device 10 uses a part of embedded RAM 42 or the like as a reception buffer 212. As will be described later, reception buffer 212 temporarily stores generated data transmitted from pedometer 100 to game device 10. CPU 34 performs processing involved with the get and growth game based on the generated data stored in reception buffer 212. More specifically, based on that generated data, a new item is added to possessed item data 207*b* or a new character is added to possessed character data 207*c*.

Back-lip memory 68 of cartridge 28 is provided with an area for storing back-up data 213. As will be described later, data or the like of a character transferred from game device 10 to pedometer 100 is stored as back-up data 213.

On the other hand, pedometer 100 holds a pedometer program 221 and a universal image 222 as data read from ROM 113 (FIG. 7).

Pedometer program 221 is a program itself executed by CPU 110 of pedometer 100. Execution of pedometer program 221, however, is prohibited, unless initial registration data 229 and reception data 230 have already been stored. Universal image 222 is image data for notifying the user that necessary data has not yet been received from game device 1T, for example, when initial registration data 229 and/or reception data 230 are/is not stored. More specifically, universal image 222 is such an image that a user using any language would understand the image as an error indication.

In addition, pedometer 100 holds identification data 229 in synchronization with communication target game device 10, by performing the initial registration processing (which will be described later). Accordingly, it is not necessary to initially hold identification data 228 in pedometer 100. Identification data 228 is stored in embedded back-up memory 115 (see FIG. 7). Identification data 228 includes a pedometer ID 228*a*, a game console ID 228*b*, a registration status flag 228*c*, a software country code 228*d*, a software version 228*e*, a possessed character country code 228*f*, a possessed character version 228*g*, and a possessed character flag 228*h*. As these data are similar to identification data 208 held by game device 10 described above, detailed description will not be repeated.

Moreover, pedometer 100 holds initial registration data 229 and reception data 230 received from game device 10. These data are stored in embedded back-up memory 115 (see FIG. 7). Initial registration data 229 includes various types of audio data 229*a* and various types of image data•icons 229*b*. As these data are similar to initial registration data 209 held by game device 10 described above, detailed description will not be repeated. In addition, reception data 230 includes character data 230*a* and course data 230*b*. Course data 230*b* further includes enemy character data (for n character(s)) 230*c* and appearing item data (for m item(s)) 230*d*. As these data are also similar to data-to-be-transmitted 210 held by game device 10 described above, detailed description will not be repeated.

Further, pedometer 100 holds record data 231 received from game device 10. This data is stored in embedded back-up memory 115 (FIG. 7). As record data 231 is similar to record data 211 held by game device 10 described above, detailed description will not be repeated.

In addition, pedometer 100 outputs generated data 232, based on the result of sensing by motion sensor 112. Namely, CPU 110 executes the pedometer game based on various types of data from game device 10 and causes back-up memory 115 to store generated data 232 indicating a result of processing of the step count game.

Generated data 232 includes wattage 232*a*, step count 232*b*, the number of days that have elapsed 232*c*, the number of days during which the character has been possessed 232*d*, step count per unit time 232*e*, acquired character data (for n character(s)) 232*f*, and acquired item data (for m item(s)) 232*g*. These data are stored in embedded back-up memory 115 (FIG. 7).

Wattage 232*a* refers to a value calculated based on the step count sensed during a period from the time point of immediately preceding transmission of generated data 232 to game device 10 until the current time point. Typically, wattage 232*a* is calculated by multiplying the sensed step count by a prescribed coefficient. In addition, the wattage may be increased under a prescribed condition, for example as a bonus, without increase in the step count. Step count 232*b* represents a cumulative value of the step count sensed by motion sensor 112 since reception of data-to-be-transmitted 210 from game device 10. The number of days that have elapsed 232*c* represents a time elapsed since reception of data-to-be-transmitted 210 from game device 10. The number of days during which the character has been possessed 232*d* represents a time elapsed since reception of character data from game device 10. Step count per unit time 232*e* represents the number of times of sensing (step count) sensed by motion sensor 112 per unit time (typically, per one hour). It is noted that wattage 232*a*, the number of days during which the character has been possessed 232*d* and step count per unit time 232*e* are reset (cleared to zero) when generated data 232 is transmitted to game device 10. On the other hand, step count 232*b* and the number of days that have elapsed 232*c* are not reset even though generated data 232 is transmitted to game device 10.

Acquired character data (for n character(s)) 232*f* stores an attribute of an acquired character when any character is acquired based on the step count sensed by motion sensor 112 or the wattage in the executed pedometer program. More specifically, when the step count or the wattage satisfies a prescribed value at the timing of pressing of operation switch 104, transition to a screen for searching for an enemy character can be made. In that screen, one of enemy character data (for n character(s)) 210*c* received from game device 10 is allowed to appear, based on the user's operation such as user's pressing of operation switch 104 and/or on a random number. Then, the enemy character that appeared can be acquired based on the user's operation such as user's pressing of operation switch 104 and/or on a random number, and information on the acquired enemy character is added to acquired character data 232*f*. Namely, acquired character data (for n character(s)) 232*f* includes all or a part of enemy character data (for n character(s)) 230*c* (210*c*) received from game device 10. In other words, CPU 110 of pedometer 110 changes the data received from game device 10 to data having different information.

Similarly, acquired item data (for m item(s)) 232*g* stores an attribute of the acquired item when any item is acquired based on the step count sensed by motion sensor 112, Namely, acquired item data (for m item(s)) 232*g* includes all or a part of appearing item data (for m item(s)) 230*d* (210*d*) received from game device 10. In other words, CPU 110 of pedometer 110 changes the data received from game device 10 to data having different information.

<Overall Processing>

A processing procedure in the information processing system according to the present embodiment will now be described.

(Game Device)

Figure 9:
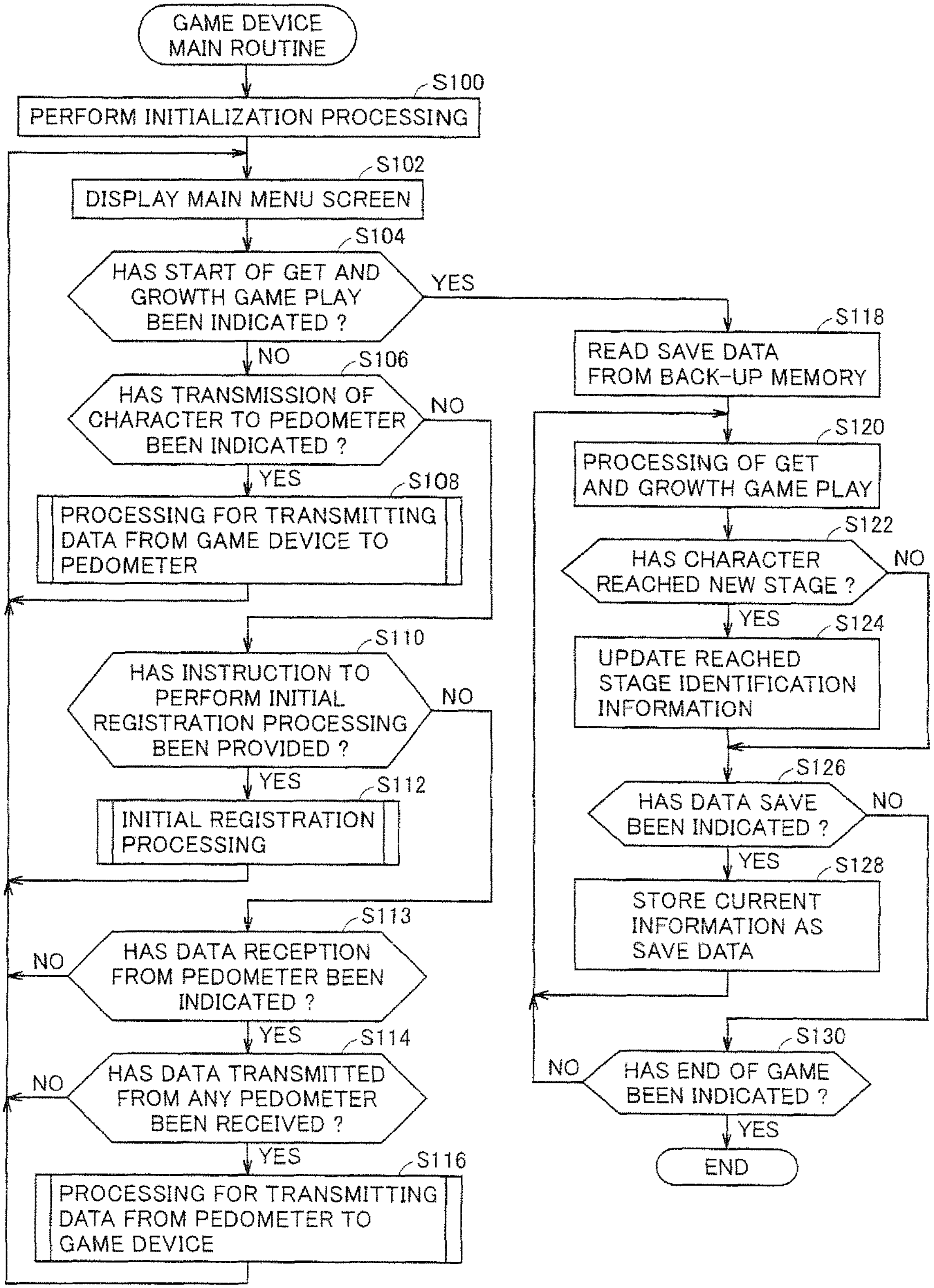
FIG. 9 is a flowchart showing an overall processing procedure in the game device according to the embodiment of the present invention.
Figure 10:
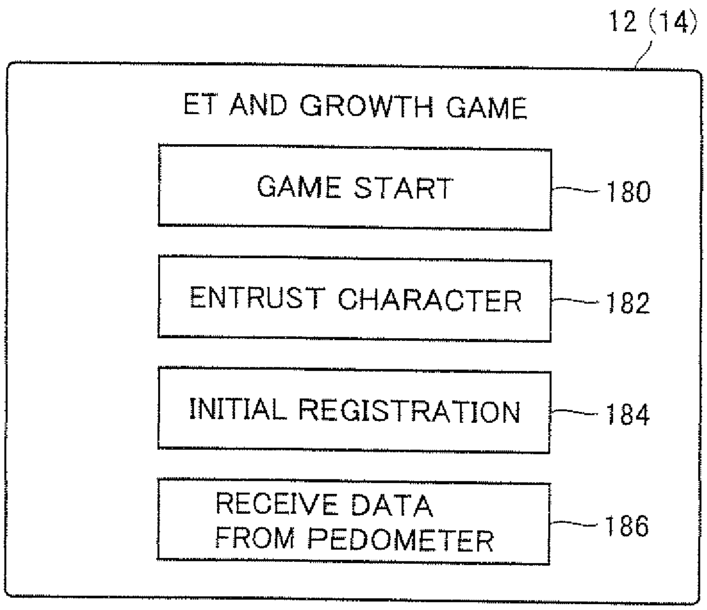
FIG. 10 is a diagram showing an exemplary main menu screen of the game device displayed in step S102 in FIG. 9.

FIG. 9 is a flowchart showing an overall processing procedure in game device 10 according to the embodiment of the present invention. It is noted that each step shown in FIG. 9 is provided by execution of a program by CPU 34 of game device 10. FIG. 10 is a diagram showing an exemplary main menu screen of game device 10 displayed in step S102 in FIG. 9, Referring to FIG. 9, the get and growth game according to the present embodiment is started by a user's prescribed operation of game device 10. Initially, CPU 34 performs initialization processing (step S100). In this initialization processing, data within RAM 42 (see FIG. 3) is reset, or an initial parameter of Ir communication circuit 70 (FIG. 3) is set.

In succession, CPU 34 causes LCD 12 and/or LCD 14 to display a main menu screen of the get and growth game (step S102). In the main menu screen, typically, three types of processing of start of a get and growth game play, transmission of a character to pedometer 100, and execution of the initial registration processing are displayed in a selectable manner. Namely, as shown in FIG. 10, in the main menu screen of the get and growth game in game device 10, a game start button 180, a character transmission button 182, an initial registration processing start button 184, and a reception button 186 for receiving data from pedometer 100 are displayed. The user selects desired processing by performing a touch operation on the main menu screen by using stick 26 etc.

Referring back to FIG. 9, in step S104, CPU 34 determines whether start of the get and growth game play has been indicated or not. When start of the get and growth game play has not been indicated (NO in step S1104), the process proceeds to step S106. When start of the get and growth game play has been indicated (YES in step S104), the process proceeds to step S118.

In step S106, CPU 34 determines whether transmission of a character to pedometer 100 has been indicated or not. Namely, CPU 34 determines whether the user has selected character transmission button 182 (see FIG. 10) or not. When transmission of the character to pedometer 100 has been indicated (YES in step S106), the process proceeds to step S108. When transmission of the character to pedometer 100 has not been indicated (NO in step S106), the process proceeds to step S110.

In step S108, CPU 34 performs processing for transmitting data from game device 10 to pedometer 100. The data transmission processing will be described in detail later. After the processing for transmitting data from game device 10 to pedometer 100 is performed, the processing in step S102 and subsequent steps is repeated.

In contrast, in step S110, CPU 34 determines whether an instruction to perform the initial registration processing has been provided or not. Namely, CPU 34 determines whether the user has selected character initial registration processing start button 184 (see FIG. 10) or not. When the instruction to perform the initial registration processing has been provided (YES in step S110), the process proceeds to step S112. When the instruction to perform the initial registration processing has not been provided (NO in step S110), the process proceeds to step S113.

In step S112, CPU 34 performs the initial registration processing. The initial registration processing will be described in detail later. After the initial registration processing is performed, the processing in step S102 and subsequent steps is repeated.

In contrast, in step S113, CPU 34 determines whether the user has selected reception button 186 (see FIG. 10) for receiving data from pedometer 100 or not. When data reception from pedometer 100 has been indicated (YES in step S113), the process proceeds to step S114. When data reception from pedometer 100 has not been indicated (NO in step S113), the processing in step S102 and subsequent steps is repeated.

In step S114, CPU 34 determines whether data transmitted from any pedometer 100 has been received or not. When data transmitted from any pedometer 100 has been received (YES in step S114), the process proceeds to step S116. When data has been received from no pedometer 100 (NO in step S114), the processing in step S102 and subsequent steps is repeated.

In step S116, CPU 34 performs processing for transmitting data from pedometer 100 to game device 10. The data transmission processing will be described in detail later. After the processing for transmitting data from pedometer 100 to game device 10 is performed, the processing in step S102 and subsequent steps is repeated.

On the other hand, in step S118, CPU 34 reads save data 207 (see FIG. 8) from back-up memory 68 (see FIG. 3) of cartridge 28, Then, CPU 34 performs processing of the get and growth game play based on read save data 207 (step S120). More specifically, CPU 34 reads image data, audio data or the like of a corresponding stage from ROM 64 (see FIG. 3) of cartridge 28, based on reached stage identification information 207*a* included in read save data 207. Then, CPU 34 causes LCD 12 and/or LCD 14 to display contents of the get and growth game play and allows the get and growth game play to proceed in accordance with the user's operation. As described above, in the get and growth game play according to the present embodiment, the character successively reaches a different stage in a stepwise fashion, by acquiring an experience point or acquiring an item based on the user's operation.

In successive step S122, CPU 34 determines whether the character operated by the user has reached a new stage in the get and growth game play or not. When the character operated by the user has reached the new stage (YES in step S122), the process proceeds to step S124. When the character operated by the user has not reached the new stage (NO in step S122), the process proceeds to step S126.

In step S124, CPU 34 updates reached stage identification information 207*a* included in back-up memory 68 (FIG. 3) of cartridge 28 to a value indicating the reached stage. Namely, when the character reaches the new stage, CPU 34 has the identification information indicating the reached stage stored. The process then proceeds to step S126.

In step S126, CPU 34 determines whether data save has been indicated by the user's operation or not. When data save has been indicated (YES in step S126), the process proceeds to step S128. When data save has not been indicated (NO in step 8126), the process proceeds to step S130.

In step S128, CPU 34 causes back-up memory 68 (FIG. 3) of cartridge 28 to store, as save data 207, current information including information indicating the stage that the character has already reached. Then, the processing in step S120 and subsequent steps is repeated.

In contrast, in step S130, CPU 34 determines whether end of the game has been indicated or not. When end of the game has been indicated (YES in step S130), the process ends. When end of the game has not been indicated (NO in step S130), the processing in step S120 and subsequent steps is repeated.

(Pedometer)

Figure 11:
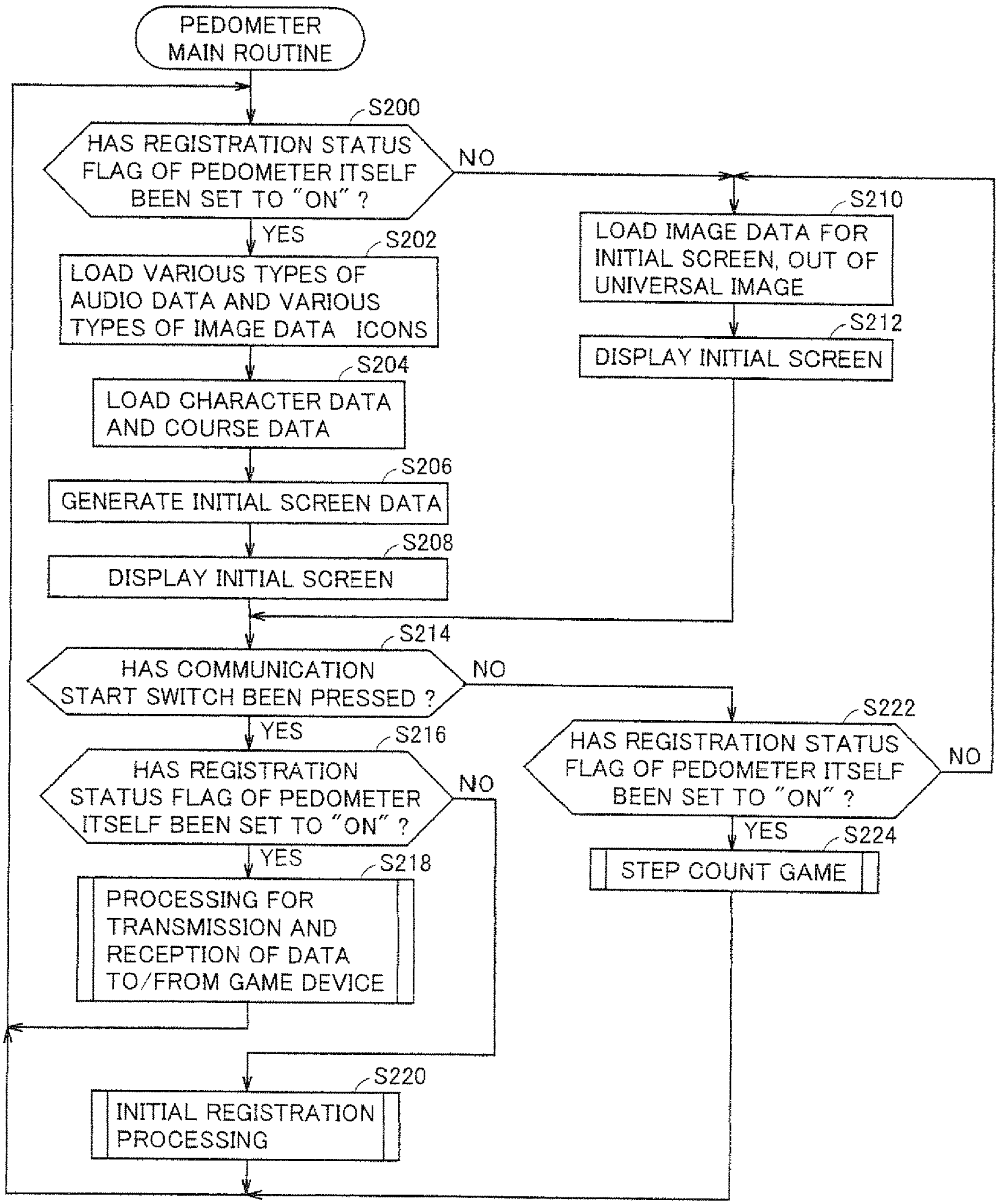
FIG. 11 is a flowchart showing an overall processing procedure in the pedometer according to the embodiment of the present invention.
Figure 12:
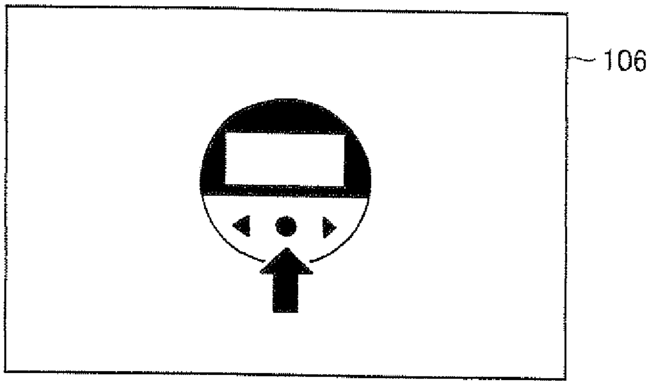
FIG. 12 is a diagram showing an exemplary initial screen of the pedometer displayed in step S212 in FIG. 11.

FIG. 11 is a flowchart showing an overall processing procedure in pedometer 100 according to the embodiment of the present invention. It is noted that each step shown in FIG. 11 is provided by execution of a program by CPU 110 of pedometer 100. FIG. 12 is a diagram showing an exemplary initial screen of pedometer 100 displayed in step S212 in FIG. 11.

Referring to FIG. 11, as the user performs such an operation as turn-on of power of pedometer 100, the step count game in pedometer 100 according to the present embodiment is started. Initially, CPU 110 determines whether registration status flag 228*c* (FIG. 8) has been set to "ON" or not (step S200). Namely, CPU 110 determines whether the initial registration processing has been completed between game device 10 and pedometer 100 or not. When registration status flag 228*c* has been set to "ON" (YES in step S200), the process proceeds to step S202. When registration status flag 228*c* has not been set to "ON" (NO in step S200), the process proceeds to step S210.

In step S202, CPU 110 reads various types of audio data 229*a* and various types of image data•icons 229*b* stored as initial registration data 229 and loads the data to RAM 114. In successive step S204, CPU 110 reads character data 230*a* and course data 230*b* stored as reception data 230 and loads the data to RAM 114.

After such data is loaded, CPU 110 generates initial screen data by using necessary image data and audio data (step S206). In successive step S208, CPU 110 causes LCD 106 to display an initial screen. Then, the process proceeds to step S214.

On the other hand, in step S210, CPU 110 reads image data for the initial screen out of image data stored as universal image 222 (FIG. 8) and loads the data to RAM 114. In successive step S212, CPU 110 causes LCD 106 to display the initial screen based on the loaded image data. Namely, when the data received from game device 10 is not stored in back-up memory 115, CPU 110 notifies the user of the fact that the data from game device 10 has not yet been received. Here, the initial screen based on the universal image as shown in FIG. 12 is displayed such that the user can know that the data has not yet been received, without reception of any image data or font data from corresponding game device 10. In the initial screen shown in FIG. 12, appearance of pedometer 100 according to the present embodiment is schematically expressed and such an image as urging the user to press communication start switch 104*a*

(see FIG. 4) arranged in the central portion is expressed. Namely, regardless of which language a target user can understand, such screen display as allowing the user to understand the operation at a glance is provided. Then, the process proceeds to step S214.

Referring back to FIG. 11, in step S214, CPU 110 determines whether communication start switch 104*a* (see FIGS. 4 and 5A) has been pressed or not. Namely, CPU 110 determines whether the user has indicated start of communication with game device 10 or not. When communication start switch 104*a* has been pressed (YES in step S214), the process proceeds to step S216. When communication start switch 104*a* has not been pressed (NO in step S214), the process proceeds to step S222.

In step S216, CPU 110 determines whether registration status flag 228*c* (see FIG. 8) has been set to "ON" or not. When registration status flag 228*c* has been set to "ON" (YES in step S216), the process proceeds to step S218. When registration status flag 228*c* has not been set to "ON" (NO in step S216), the process proceeds to step S220.

In step S218, CPU 110 performs processing for transmission and reception of data to and from game device 10 (which will be described later). The data transmission and reception processing includes processing for transmitting data from game device 10 to pedometer 100 and processing for transmitting data from pedometer 100 to game device 10. On the other hand, in step S220, CPU 110 performs the initial registration processing (which will be described later). Namely, when the initial registration processing has already been completed between game device 10 and pedometer 100, various types of data are transmitted and received between pedometer 100 and game device 10 in step S218. Otherwise, in step S220, the initial registration processing between pedometer 100 and game device 10 is performed.

On the other hand, in step S222, CPU 110 determines whether registration status flag 228*c* (see FIG. 8) has been set to "ON" or not. When registration status flag 228*c* has been set to "ON" (YES in step S222), the process proceeds to step S224. When registration status flag 228*c* has not been set to "ON" (NO in step S222), the process returns to step S210. Namely, unless the initial registration processing is completed, the step count game is not started in pedometer 100 and the initial screen based on the universal image is continuously displayed. Thus, in response to the user's operation of communication start switch 104*a*, CPU 110 determines whether or not the data received from game device 10 (such as initial registration data 229) is stored in back-up memory 115 or the like of pedometer 100, and when it is determined that such data is not stored, CPU 110 notifies the user that the data from game device 10 has not yet been received.

In step S224, CPU 110 executes the step count game (which will be described later). Namely, as will be described later, CPU 110 starts proceeding with the game based on the result of sensing by motion sensor 112 (the number of times of motion).

<Initial Registration Processing>

A detailed processing procedure of the initial registration processing (step S112 in FIG. 9 and step S220 in FIG. 11) above will now be described. FIGS. 13 to 16 are flowcharts showing a procedure of the initial registration processing in the information processing system according to the embodiment of the present invention. As the initial registration processing according to the present embodiment is performed by exchanging data between game device 10 and pedometer 100, FIGS. 13 to 16 show the initial registration processing in game device 10 and the initial registration processing in pedometer 100 in parallel, however, a program itself for performing the processing in each device will be different.

Figure 13:
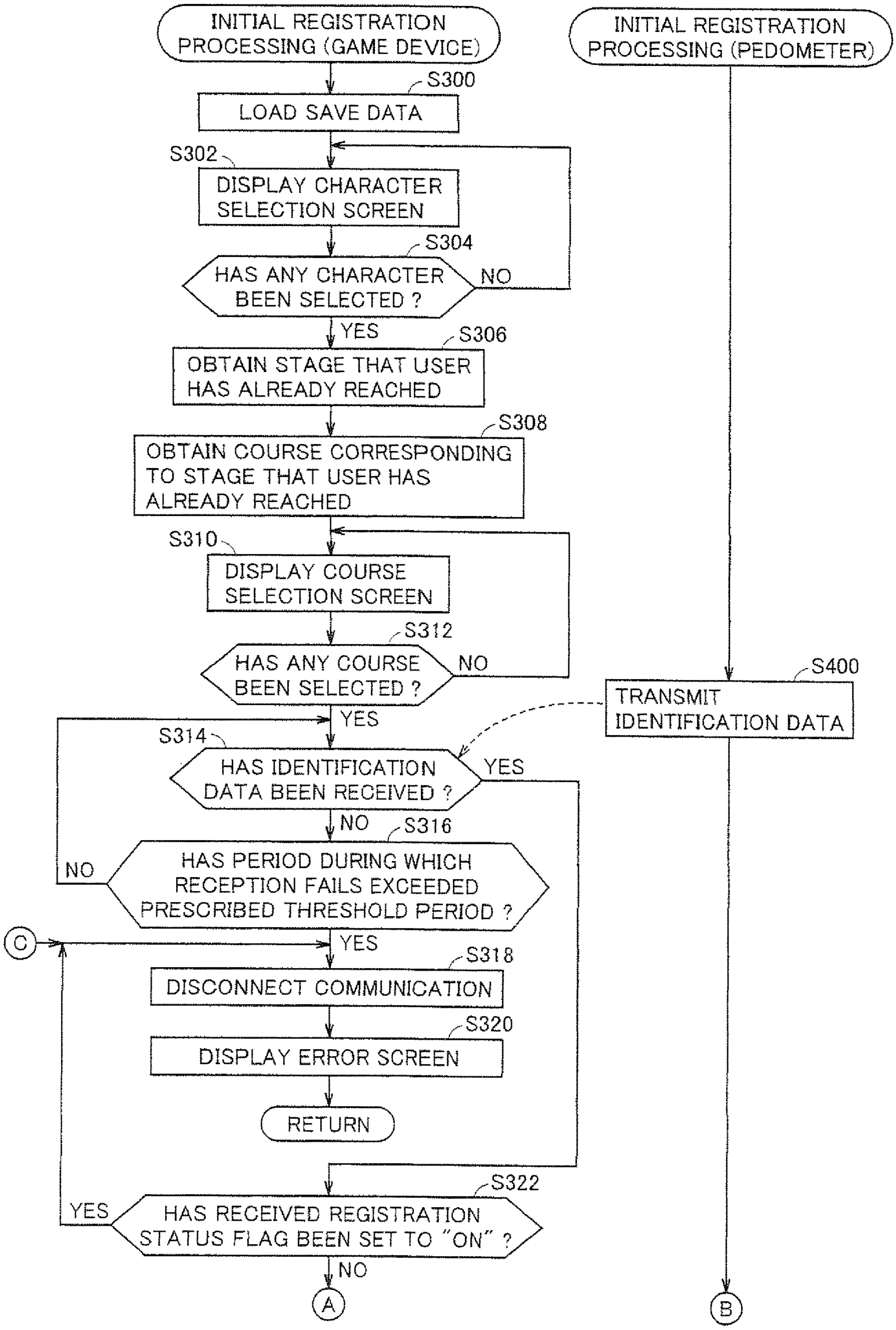
FIGS. 13 to 16 are flowcharts showing a procedure of initial registration processing in the information processing system according to the embodiment of the present invention.
Figure 14:
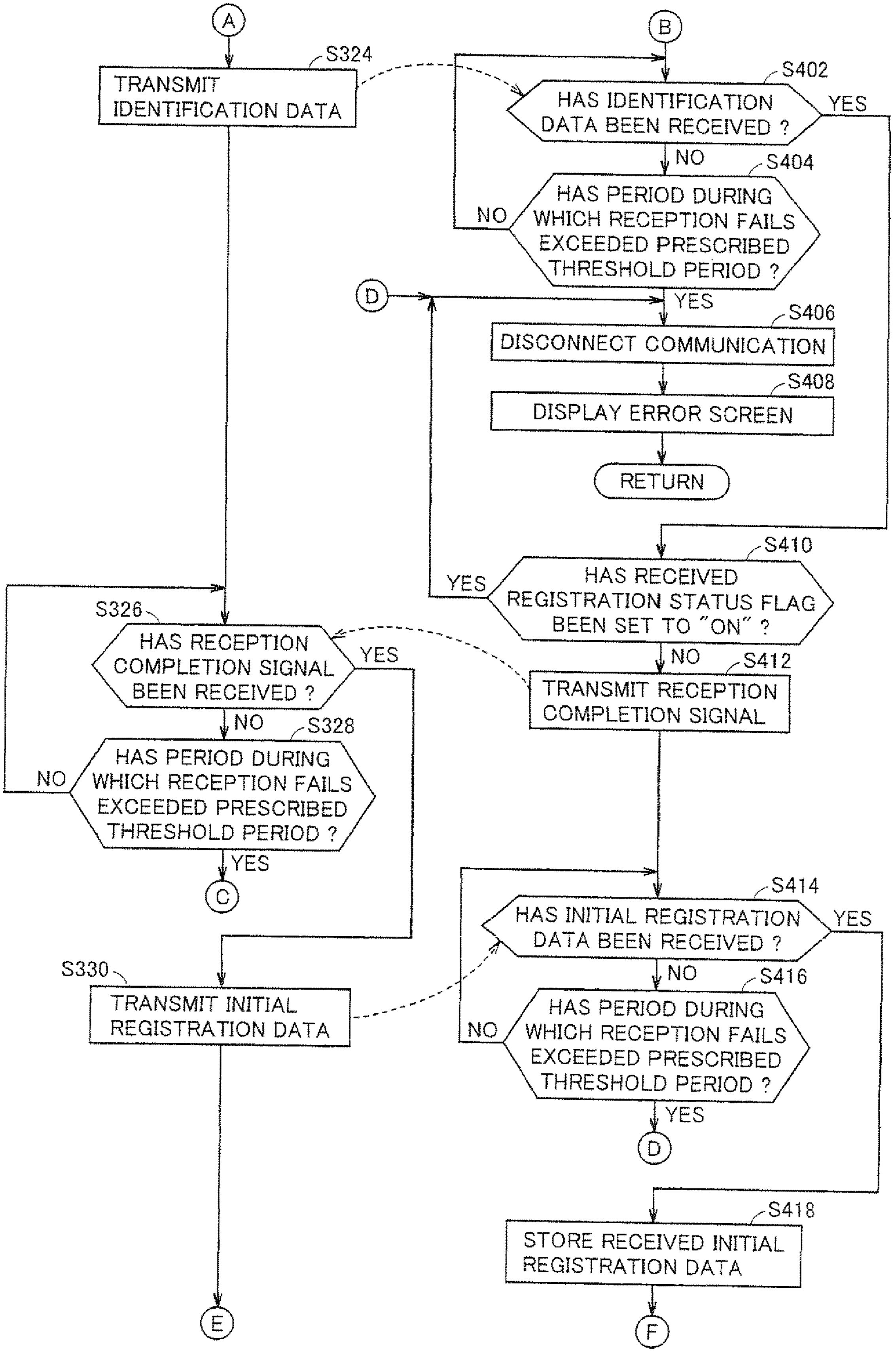
Figure 15:
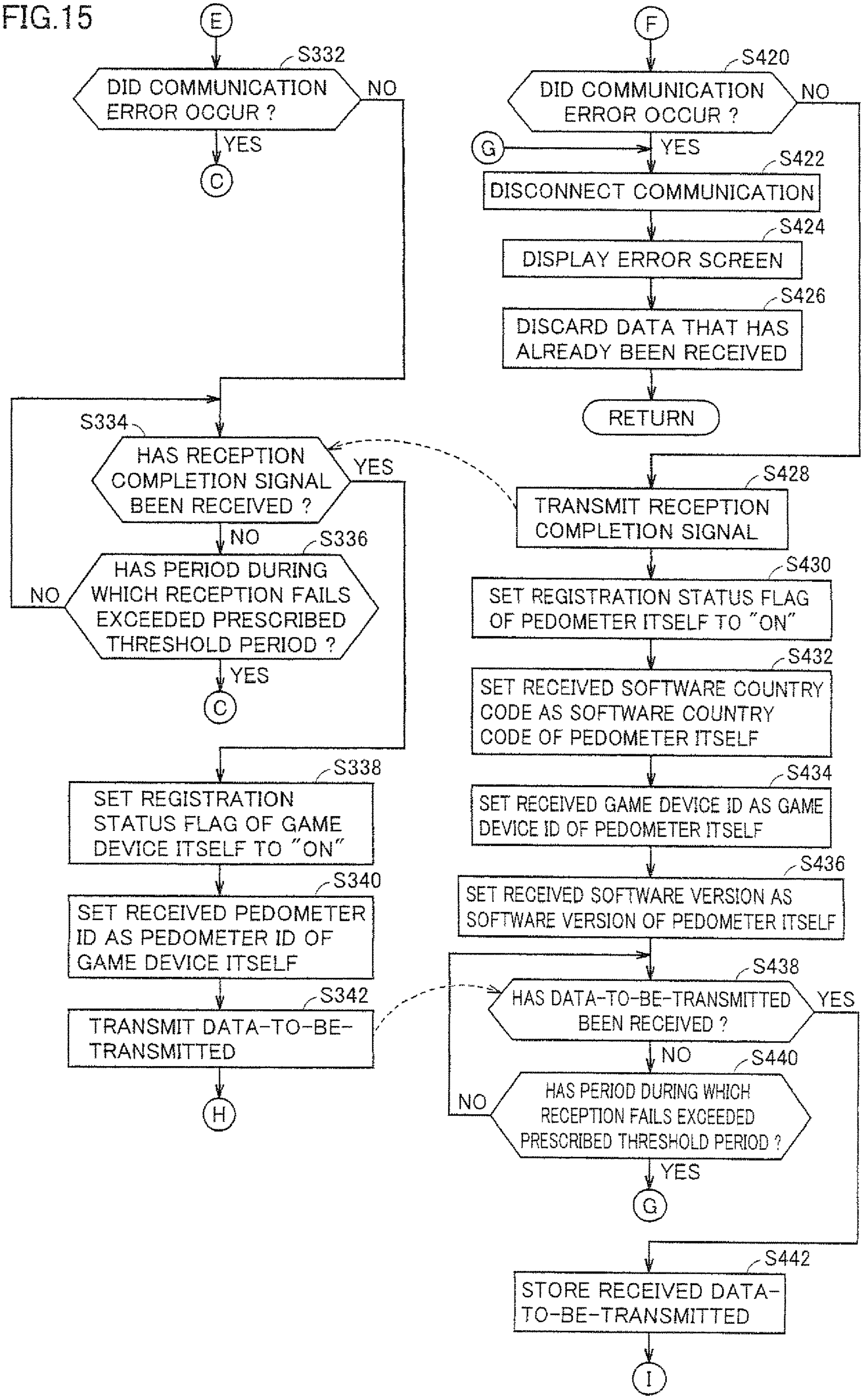
Figure 16:
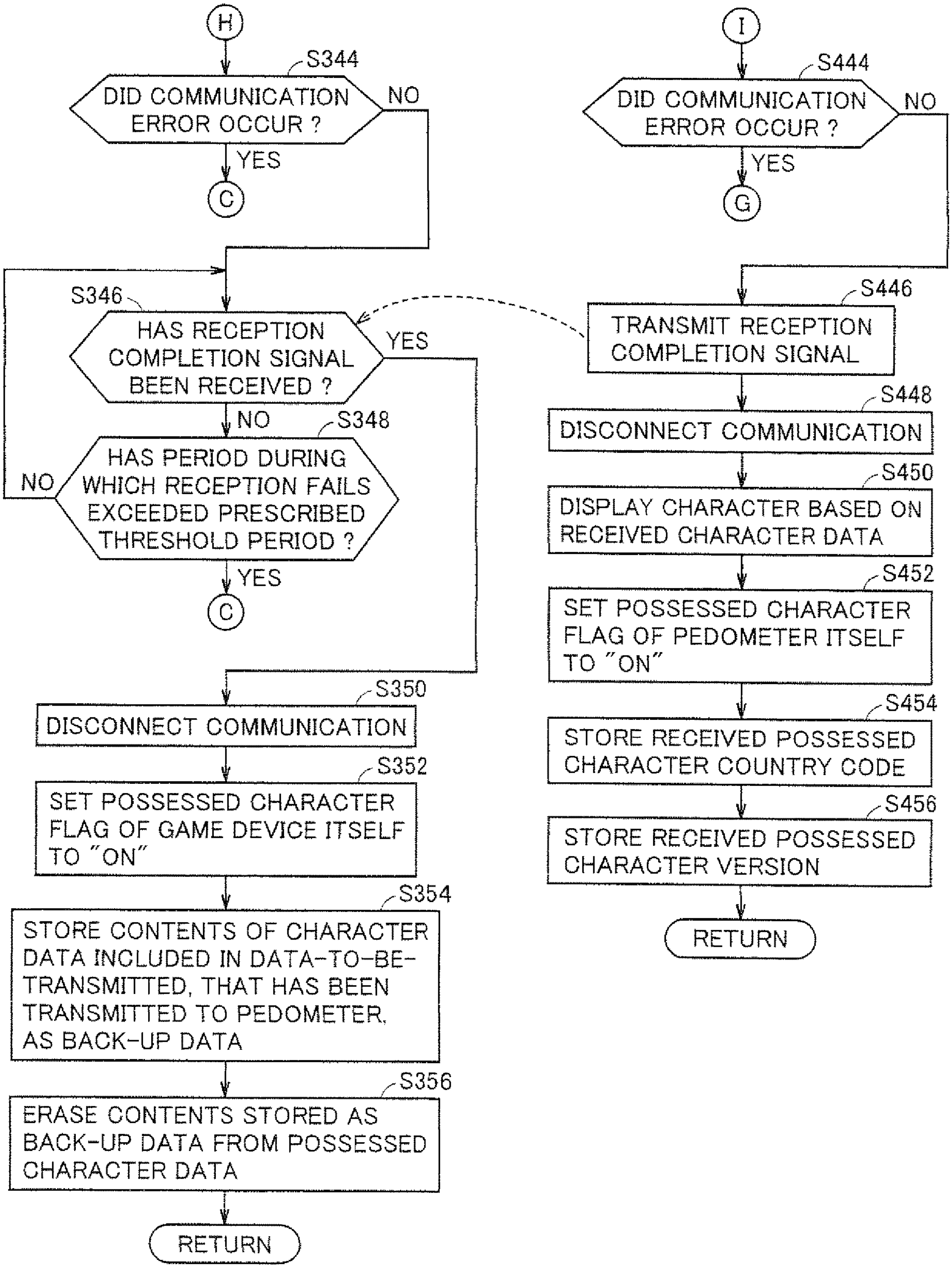
Figure 17:
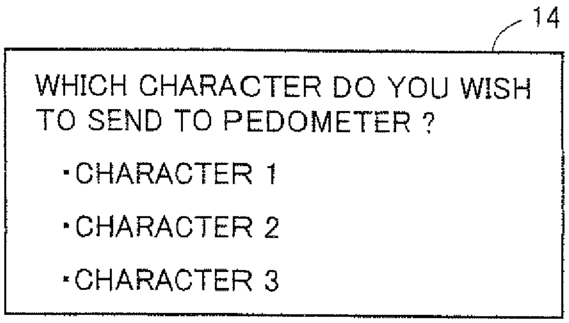
FIG. 17 is a diagram showing an exemplary character selection screen displayed in step S302 in FIG. 13.
Figure 18:
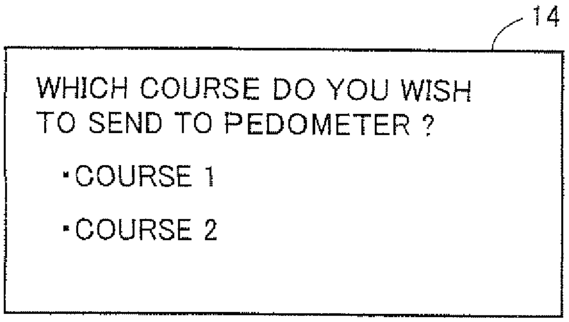
FIG. 18 is a diagram showing an exemplary course selection screen displayed in step S310 in FIG. 13.
Figure 19:
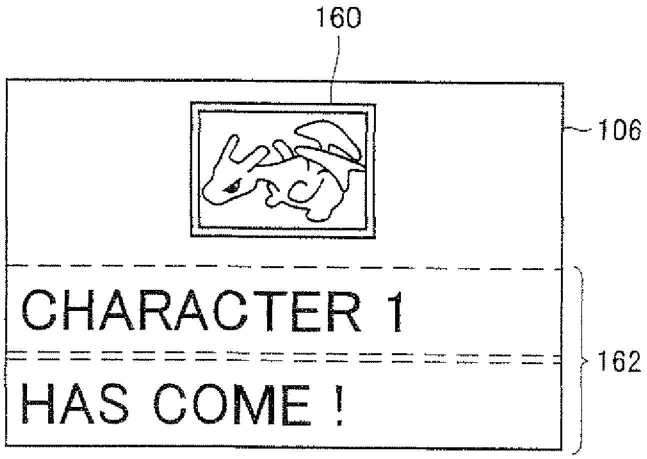
FIG. 19 is a diagram showing an exemplary character screen displayed in step S450 in FIG. 16.

In addition, FIG. 17 is a diagram showing an exemplary character selection screen displayed in step S302 in FIG. 13. FIG. 18 is a diagram showing an exemplary course selection screen displayed in step S310 in FIG. 13. FIG. 19 is a diagram showing an exemplary character screen displayed in step S450 in FIG. 16.

(Game Device)

Referring to FIGS. 13 to 16, initially, CPU 34 of game device 10 reads save data 207 and loads the data to RAM 42 (step S300). In successive step S302, CPU 34 causes LCD 12 and/or LCD 14 to display a character selection screen based on the character already acquired by the user, by referring to possessed character data 207*c* included in save data 207. Namely, CPU 34 has the selection screen displayed, for accepting user's selection of the character to be transmitted to pedometer 100 from among the already acquired characters. For example, the selection screen as shown in FIG. 17 is displayed. In successive step S304, CPU 34 determines whether any character has been selected or not. When any character has been selected, the process proceeds to step S306. When no character has been selected, the processing in step S302 is repeated.

In the character selection screen shown in FIG. 17, names of the already acquired characters are displayed in a selectable manner based on contents described in possessed character data 207*c*, together with a message that "which character do you wish to send to the pedometer?" The user selects an intended character by performing a touch operation on the selection screen with stick 26 etc. As the user selects any character, CPU 34 sets the data corresponding to the character selected from possessed character data 207*c* of save data 207 as character data 210*a* of data-to-be-transmitted 210. Thus, data of the character to be transmitted to pedometer 100 is selected from among a plurality of pieces of data stored in advance.

Referring back to FIG. 13, in step S306, CPU 34 obtains the stage that the user has already reached (progressed), based on reached stage identification information 207*a* included in save data 207. In successive step S308, CPU 34 reads stage/course correspondence table 204 (FIG. 8) and loads the table to RAM 42, and obtains a course corresponding to the stage that the user has already reached, that was obtained in step S306, by referring to stage/course correspondence table 204. Namely, CPU 34 selects a course corresponding to reached stage identification information 207*a* of save data 207, that is stored in back-up memory 68.

In further successive step S310, CPU 34 causes LCD 12 and/or LCD 14 to display a course selection screen, based on the course obtained in step S308. For example, the selection screen as shown in FIG. 18 is displayed. Namely, CPU 34 determines course candidates that can be played in the step count game executed on pedometer 100 depending on the reached stage, and has the user select a desired course from among these course candidates.

In step S312, CPU 34 determines whether any course has been selected or not. When any course has been selected, the process proceeds to step S314. When no course has been selected, the processing in step S310 and subsequent step is repeated.

In the course selection screen shown in FIG. 18, names of the courses obtained in step S306 are displayed in a selectable manner, together with a message that "which course do you wish to send to the pedometer?" The user selects an intended course by performing a touch operation on the selection screen with stick 26 etc. As the user selects any course, CPU 34 sets the course data corresponding to the selected course as course data 210*b* of data-to-be-transmitted 210. Thus, data of the course to be transmitted to pedometer 100 is selected from among a plurality of pieces of data stored in advance. Namely, enemy character data (for n character(s)) 210*c* and appearing item data (for m item(s)) 210*d* (FIG. 8) to be transmitted from game device 10 to pedometer 100 are selected based on the information on sensing from pedometer 100.

Referring back to FIG. 13, in step S314, CPU 34 enters a reception stand-by state and determines whether identification data 228 (see FIG. 8) has been received from pedometer 100 or not. When identification data 228 has not been received from pedometer 100 (NO in step S314), CPU 34 determines whether a period during which reception of identification data 228 fails has exceeded a prescribed threshold period or not (step S316). When the period during which reception of identification data 228 fails has exceeded the prescribed threshold period (YES in step S316), the process proceeds to step S318. When the period during which reception of identification data 228 fails has not exceeded the prescribed threshold period (NO in step S316), the processing in step S314 is repeated.

In contrast, when identification data 228 has been received from pedometer 100 (YES in step S314), the process proceeds to step S322.

In step S318, CPU 34 disconnects communication. In successive step S320, CPU 34 causes LCD 12 and/or LCD 14 to display an error screen. Namely, CPU 34 performs error processing in connection with step S318 and step S320 when data communication with communication target pedometer 100 is not normally carried out or when the processing is interrupted in pedometer 100.

On the other hand, in step S322, CPU 34 determines whether registration status flag 228*c* (see FIG. 8) included in received identification data 228 has been set to "ON" or not. When registration status flag 228*c* has been set to "ON" (YES in step S322), the process proceeds to step S318. When registration status flag 228*c* has not been set to "ON" (NO in step S322), the process proceeds to step S324. Namely, CPU 34 determines whether or not the initial registration processing has already been completed in communication target pedometer 100. When the initial registration processing has been completed, the processing in step S324 and subsequent steps is not performed.

In step S324, CPU 34 reads identification data 208 (see FIG. 8) and transmits read identification data 208 to communication target pedometer 100. In successive step S326, CPU 34 enters the reception stand-by state and determines whether or not a reception completion signal has been received from communication target pedometer 100. When the reception completion signal has not been received from pedometer 100 (NO in step S326), CPU 34 determines whether a period during which reception of the reception completion signal fails has exceeded a prescribed threshold period or not (step S328). When the period during which reception of the reception completion signal fails has exceeded the prescribed threshold period (YES in step S328), the process proceeds to step S318. When the period during which reception of the reception completion signal fails has not exceeded the prescribed threshold period (NO in step S328), the processing in step S326 is repeated. In contrast, when the reception completion signal has been received from pedometer 100 (YES in step S326), the process proceeds to step S330.

In step S330, CPU 34 reads initial registration data 209 (see FIG. 8) and transmits read initial registration data 209 to communication target pedometer 100. In successive step S332, CPU 34 determines whether communication error occurred or not. When communication error occurred (YES in step S332), the process proceeds to step S318. When communication error did not occur (NO in step S332), the process proceeds to step S334.

In step S334, CPU 34 enters the reception stand-by state and determines whether or not the reception completion signal has been received from communication target pedometer 100. When the reception completion signal has not been received from pedometer 100 (NO in step S334), CPU 34 determines whether a period during which reception of the reception completion signal fails has exceeded a prescribed threshold period or not (step S336). When the period during which reception of the reception completion signal fails has exceeded the prescribed threshold period (YES in step S336), the process proceeds to step S318. When the period during which reception of the reception completion signal fails has not exceeded the prescribed threshold period (NO in step S336), the processing in step S334 is repeated. In contrast, when the reception completion signal has been received from pedometer 100 (YES in step S334), the process proceeds to step S338.

In step S338, CPU 34 sets registration status flag 208*c* of identification data 208 of game device 10 itself to "ON". In successive step S340, CPU 34 sets, as pedometer ID 208*a* of identification data 208 of game device 10 itself, pedometer ID 228*a* included in identification data 228 received in step S314 from communication target pedometer 100. In further successive step S342, CPU 34 reads data-to-be-transmitted 210 (see FIG. 8) and transmits the data to communication target pedometer 100. In successive step S344, CPU 34 determines whether communication error occurred or not. When communication error occurred (YES in step S344), the process proceeds to step S318. When communication error did not occur (NO in step S344), the process proceeds to step S346.

In step S346, CPU 34 enters the reception stand-by state and determines whether or not the reception completion signal has been received from communication target pedometer 100. When the reception completion signal has not been received from pedometer 100 (NO in step S346), CPU 34 determines whether a period during which reception of the reception completion signal fails has exceeded a prescribed threshold period or not (step S348). When the period during which reception of the reception completion signal fails has exceeded the prescribed threshold period (YES in step S348), the process proceeds to step S318. When the period during which reception of the reception completion signal fails has not exceeded the prescribed threshold period (NO in step S348), the processing in step S346 is repeated. In contrast, when the reception completion signal has been received from pedometer 100 (YES in step S346), the process proceeds to step S350.

In step S350, CPU 34 disconnects communication. In successive step S352, CPU 34 sets possessed character flag 208*h* of identification data 208 of game device 10 itself to "ON". In successive step S354, CPU 34 has contents of character data 210*a* included in data-to-be-transmitted 210 transmitted to pedometer 100 in step S342 stored as back-up data 213 (see FIG. 8) of game device 10 itself. In further successive step S356, CPU 34 erases the contents stored as back-up data 213 from possessed character data 207*c* of save data 207 of game device 10 itself. Namely, CPU 34 updates the contents of save data 207 such that play using the character that was transferred from game device 10 to pedometer 100 is not performed in the get and growth game play, and CPU 34 has the character data stored as back-up data 213 such that the character can be restored in case that character data transferred to transfer-target pedometer 100 is not returned to game device 10. Then, the process returns to the main routine.

In step S354 and step S356 described above, processing for moving the character data itself from save data 207 to back-up data 213 is illustrated, however, a flag brought in correspondence with each character may be prepared in advance and a state of the character may be managed based on a value of the flag.

(Pedometer)

The initial registration processing in the pedometer will now be described.

Referring again to FIGS. 13 to 16, CPU 110 of pedometer 100 reads identification data 208 (see FIG. 8) and transmits read identification data 208 to communication target game device 10 (step S400). As shown in the pedometer main routine shown in FIG. 11, CPU 110 of pedometer 100 according to the present embodiment automatically transmits the identification data without requesting a subsequent user's operation when communication start switch 104*a* is pressed (YES in step S214), however, it may request a further user's operation during a period from pressing of communication start switch 104*a* to start of transmission of the identification data. In addition, transmission of the identification data may be re-tried multiple times.

In successive step S402, CPU 110 enters the reception stand-by state and determines whether or not identification data 208 (see FIG. 8) has been received from communication target game device 10. When identification data 208 has not been received from game device 10 (NO in step S402), CPU 110 determines whether a period during which reception of identification data 208 fails has exceeded a prescribed threshold period or not (step S404). When the period during which reception of identification data 208 fails has exceeded the prescribed threshold period (YES in step S404), the process proceeds to step S406. When the period during which reception of identification data 208 fails has not exceeded the prescribed threshold period (NO in step S404), the processing in step S402 is repeated. In contrast, when identification data 208 has been received from game device 10 (YES in step S402), the process proceeds to step S410.

In step S406, CPU 110 disconnects communication. In successive step S408, CPU 110 reads image data for communication error out of the image data stored as universal image 222 (see FIG. 8) and loads the data to RAM 114, and causes LCD 106 to display the error screen based on the loaded image data. Then, the process returns to the main routine.

In step S410, CPU 110 determines whether registration status flag 208*c* (see FIG. 8) included in received identification data 208 has been set to "ON" or not. When registration status flag 208*c* has been set to "ON" (YES in step S410), the process proceeds to step S406. When registration status flag 208*c* has not been set to "ON" (NO in step S410), the process proceeds to step S412. Namely, CPU 110 determines whether or not the initial registration processing has already been completed in communication target game device 10. When the initial registration processing has been completed, the processing in step S412 and subsequent steps is not performed.

In step S412, CPU 110 transmits the reception completion signal to communication target game device 10. In successive step S414, CPU 110 enters the reception stand-by state and determines whether or not initial registration data 209 has been received from communication target game device 10. When initial registration data 209 has not been received (NO in step S414), CPU 110 determines whether a period during which reception of initial registration data 209 fails has exceeded a prescribed threshold period or not (step S416). When the period during which reception of initial registration data 209 fails has exceeded the prescribed threshold period (YES in step 416), the process proceeds to step S406. When the period during which reception of initial registration data 209 fails has not exceeded the prescribed threshold period (NO in step S416), the processing in step S414 is repeated. In contrast, when initial registration data 209 has been received from game device 10 (YES in step S414), the process proceeds to step S418.

In step S418, CPU 110 causes back-up memory 115 (see FIG. 7) to store received initial registration data 209 as initial registration data 229 (see FIG. 8). In successive step S420, CPU 110 determines whether communication error occurred or not. When communication error occurred (YES in step S420), the process proceeds to step S422. When communication error did not occur (NO in step S420), the process proceeds to step S428.

In step S422, CPU 110 disconnects communication. In successive step S424, CPU 110 reads image data for communication error out of the image data stored as universal image 222 (see FIG. 8) and loads the data to RAM 114, and causes LCD 106 to display the error screen based on the loaded image data. In further successive step S426, CPU 110 discards the data that has already been received. Then, the process returns to the main routine.

In step S428, CPU 110 transmits the reception completion signal to communication target game device 10. In successive step S430, CPU 110 sets registration status flag 228*c* of identification data 228 of pedometer 100 itself to "ON". In successive step S432, CPU 110 sets, as software country code 228*d* of identification data 228 of pedometer 100 itself, software country code 208*d* included in identification data 208 received in step S402 from communication target game device 10. In further successive step S434, CPU 110 sets, as game console ID 228*b* of identification data 228 of pedometer 100 itself game console ID 208*b* included in identification data 208 received in step S402 from communication target game device 10. In further successive step S436, CPU 110 sets, as software version 228*e* of identification data 228 of pedometer 100 itself, software version 208*e* included in identification data 208 received in step S402 from communication target game device 10.

In step S438, CPU 110 enters the reception stand-by state and determines whether or not data-to-be-transmitted 210 has been received from communication target game device 10. When data-to-be-transmitted 210 has not been received (NO in step S438), CPU 110 determines whether a period during which reception of data-to-be-transmitted 210 fails has exceeded a prescribed threshold period or not (step S440). When the period during which reception of data-to-be-transmitted 210 fails has exceeded the prescribed threshold period (YES in step S440), the process proceeds to step S422. After the process proceeds to step S422, the processing in steps S422 to S426 is performed, however, when the process proceeds from step S438 to step S426, only data-to-be-transmitted 210 should be discarded, because transmission of initial registration data 209 from game device 10 to pedometer 100 has already been completed. On the other hand, when the period during which reception of data-tobe-transmitted 210 fails has not exceeded the prescribed threshold period (NO in step S440), the processing in step S438 is repeated.

In contrast, when data-to-be-transmitted 210 has been received from game device 10 (YES in step S438), the process proceeds to step S442.

In step S442, CPU 110 causes back-up memory 115 (see FIG. 7) to store received data-to-be-transmitted 210 as reception data 230 (see FIG. 8) of pedometer 100 itself. In successive step S444, CPU 110 determines whether communication error occurred or not. When communication error occurred (YES in step S444), the process proceeds to step S422. After the process proceeds to step S422, the processing in steps S422 to S426 is performed, however, when the process proceeds from step S444 to step S426, only data-to-be-transmitted 210 should be discarded, because transmission of initial registration data 209 from game device 10 to pedometer 100 has already been completed. When communication error did not occur (NO in step S444), the process proceeds to step S446.

In step S446, CPU 110 transmits the reception completion signal to communication target game device 10. In successive step S448, CPU 110 disconnects communication. In successive step S450, CPU 110 causes LCD 106 to display a character based on character data 230*a* included in reception data 230 stored in step S442. In step S450, the screen as shown in FIG. 19 is displayed. In the display screen shown in FIG. 19, a character image 160 based on the image data of the character received from game device 10 and a message 162 that "character 1 has come!" are displayed. In the example shown in FIG. 19, the name of the character received from game device 10 is assumed as "character 1". At this time point, as the country code or the like in communication target game device 10 has been obtained, a message is displayed based on a character code in accordance with the country code.

Referring back to FIG. 16, in step S452, CPU 110 sets possessed character flag 228*h* of identification data 208 of pedometer 100 itself to "ON". In successive step S454, CPU 110 has possessed character country code 208*f* included in identification data 208 received from game device 10 stored as possessed character country code 228*f* of identification data 228 of pedometer 100 itself. In further successive step S456, CPU 110 has possessed character version 208*g* included in identification data 208 received from game device 10 stored as possessed character version 228*g* of identification data 228 of pedometer 100 itself. Then, the process returns to the main routine.

<Processing for Transmitting Data From Game Device to Pedometer>

Figure 20:
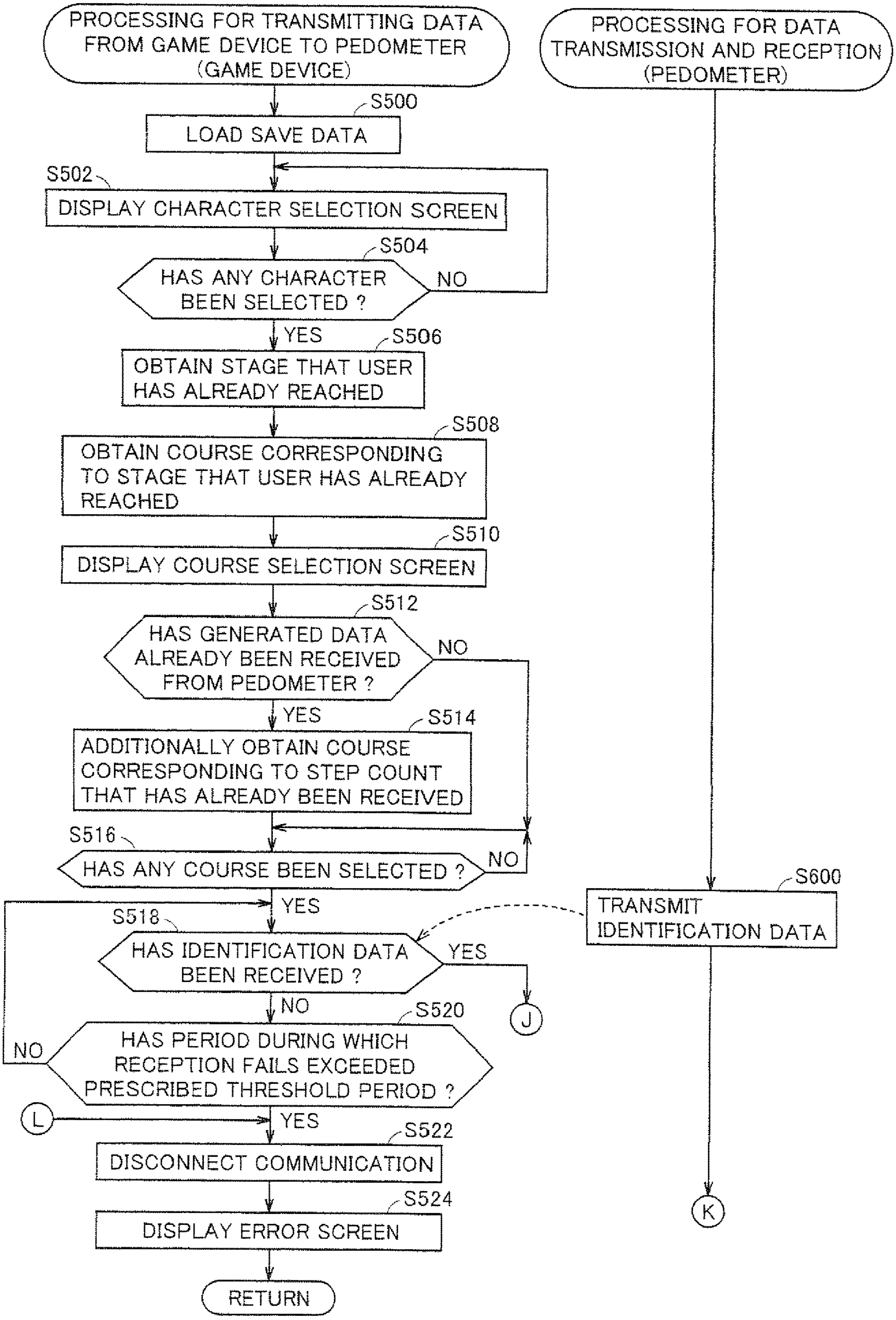
FIGS. 20 to 22 are flowcharts showing a procedure of processing for transmitting data from the game device to the pedometer in the information processing system according to the embodiment of the present invention.
Figure 21:
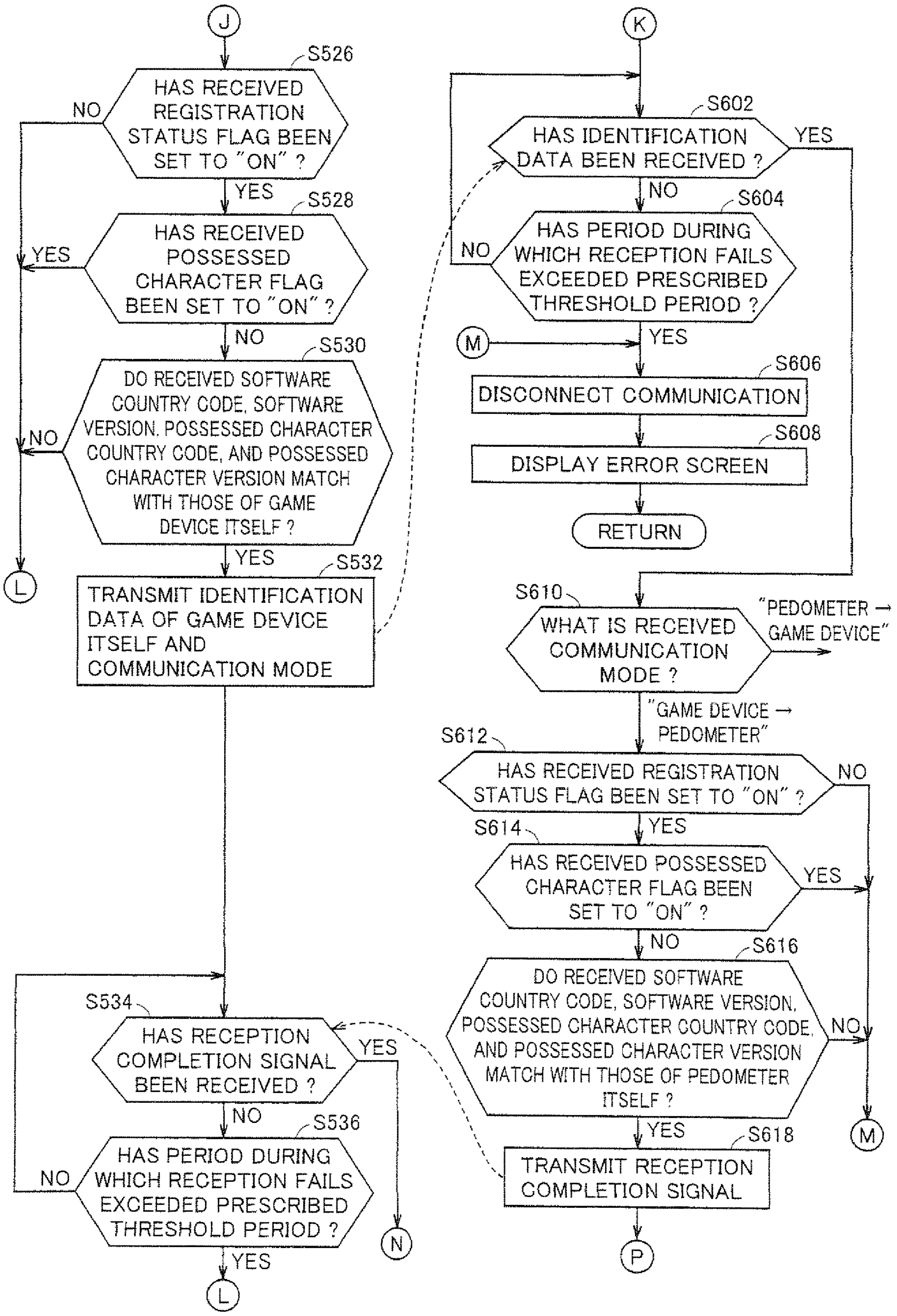
Figure 22:
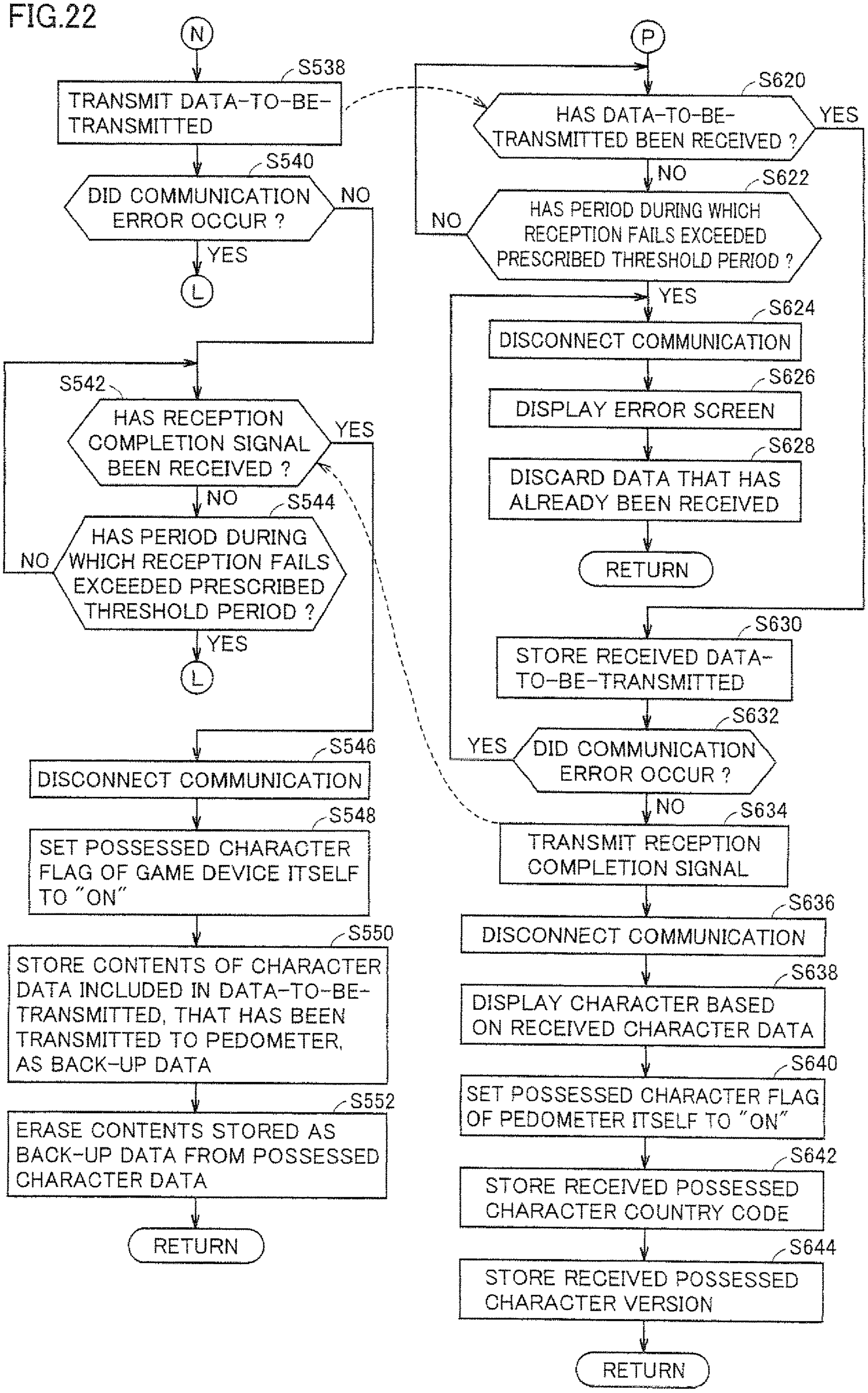
Figure 23:
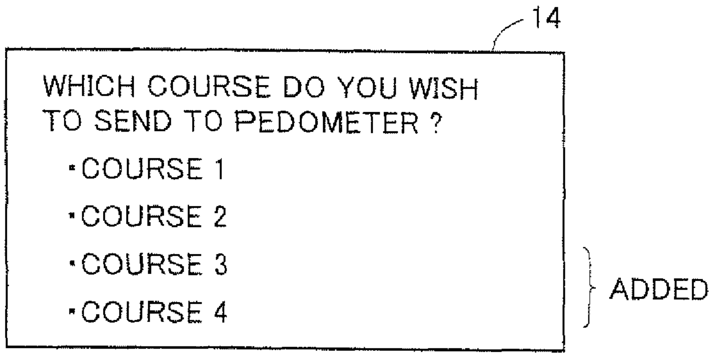
FIG. 23 is a diagram showing an exemplary course selection screen displayed in step S514 in FIG. 20.
Figure 24:
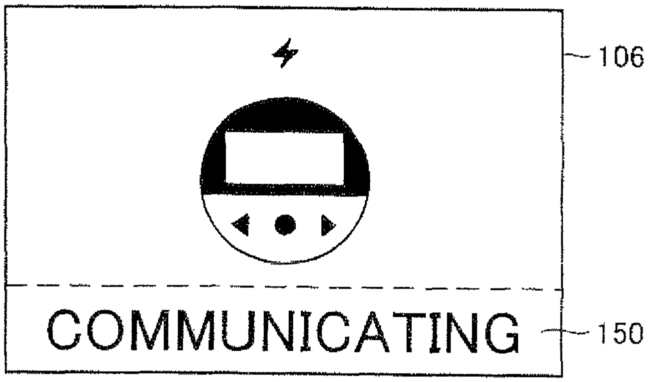
FIG. 24 is a diagram showing an exemplary communication processing screen displayed in step S600 in FIG. 20

A detailed processing procedure in processing for transmitting data from the game device to the pedometer in the information processing system according to the present embodiment (step S108 in FIG. 9 and step S218 in FIG. 1) will now be described. FIGS. 20 to 22 are flowcharts showing a procedure of processing for transmitting data from game device 10 to pedometer 100 in the information processing system according to the embodiment of the present invention. FIG. 23 is a diagram showing an exemplary course selection screen displayed in step S514 in FIG. 20. FIG. 24 is a diagram showing an exemplary communication processing screen displayed in step S600 in FIG. 20.

(Game Device)

Referring to FIGS. 20 to 22, initially, CPU 34 of game device 10 reads save data 207 and loads the data to RAM 42 (step S500). In successive step S502, CPU 34 causes LCD 12 and/or LCD 14 to display a character selection screen based on the character already acquired by the user, by referring to possessed character data 207*c* included in save data 207. Namely, CPU 34 has the selection screen displayed, for accepting user's selection of the character to be transmitted to pedometer 100 from among the already acquired characters. In step S502, the selection screen the same as in FIG. 17 above is displayed. In successive step S504, CPU 34 determines whether any character has been selected or not. When any character has been selected, the process proceeds to step S506. When no character has been selected, the processing in step S8502 is repeated. When the user selects any character, CPU 34 sets the data corresponding to the character selected from possessed character data 207*c* of save data 207 as character data 210*a* of data-to-be-transmitted 210. Thus, data of the character to be transmitted to pedometer 100 is selected from among a plurality of pieces of data stored in advance.

In step S506, CPU 34 obtains the stage that the user has already reached (progressed), based on reached stage identification information 207*a* included in save data 207 of game device 10 itself. In successive step S508, CPU 34 reads stage/course correspondence table 204 (see FIG. 8) of game device 10 itself and loads the table to RAM 42, and obtains a course corresponding to the stage that the user has already reached, that was obtained in step S506, by referring to stage/course correspondence table 204. In further successive step S510, CPU 34 causes LCD 12 and/or LCD 14 to display a course selection screen based on the course obtained in step S508. In step S510, the selection screen the same as in FIG. 18 above is displayed. Thus, CPU 34 determines course candidates that can be played in the step count game executed on pedometer 100 depending on the reached stage, and has the user select a desired course from among these course candidates.

Namely, in steps S506 to 510, CPU 34 of game device 10 evaluates reached stage identification information 207*a* included in save data 207 stored in back-up memory 68 (see FIG. 3) as a part of a result of processing in the get and growth game. Then, CPU 34 selects a course to be transmitted to pedometer 100, based on a result of evaluation of reached stage identification information 207*a*.

In successive step S512, CPU 34 determines whether generated data 232 has already been received from pedometer 100 or not. When generated data 232 has already been received (YES in step S512), the process proceeds to step S514. When generated data 232 has not yet been received (NO in step S512), the process proceeds to step S516.

In step S514, CPU 34 reads step count/course correspondence table 206 (see FIG. 8) of game device 10 itself and loads the table to RAM 42, and additionally obtains the course corresponding to step count 232*b* included in received generated data 232 by referring to step count/course correspondence table 206, Namely, CPU 34 evaluates step count 232*b* of generated data 232 received from pedometer 100, and selects data to be transmitted to pedometer 100, based on the result of evaluation. In addition to or instead of step count 232*b* included in generated data 232, that is, the number of times of occurrence of motion sensed by motion sensor 112, information on presence/absence of sensing by motion sensor 112 may be employed.

In other words, CPU 34 of game device 10 determines a course transmittable to pedometer 100 from among a plurality of courses stored in ROM 64 of cartridge 28, in accordance with the result information received from pedometer 100. Then, CPU 34 determines specific data in accordance with the user's operation as data to be transmitted, from among the data determined as transmittable to pedometer 100.

Moreover, CPU 34 has a name or the like of the additionally obtained course additionally displayed on the course selection screen. Here, a selection screen as shown in FIG. 23 including the additionally obtained course in the selection screen as shown in FIG. 18 is displayed. Then, the process proceeds to step S516, In step S516, CPU 34 determines whether any course has been selected or not. When any course has been selected, the process proceeds to step S518. When no course has been selected, the processing in step S516 is repeated.

In the character selection screen shown in FIG. 23, in addition to "course 1" and "course 2" shown in FIG. 18, additionally obtained "course 3" and "course 4" are displayed in a selectable manner. Namely, the step count or the like sensed as a result of walking while the user wears pedometer 100 in advance is returned from pedometer 100 to game device 10, so that a new course can be selected in addition to the course determined depending on the stage in the get and growth game in game device 10. It is noted that a course displayed in a selectable manner is selected from among a plurality of courses integrally coded in game program 201 of game device 10 itself. When the user selects any course, CPU 34 sets course data corresponding to the selected course as course data 210*b* of data-to-be-transmitted 210.

Namely, in steps S512 to 516, CPU 34 of game device 10 extracts course candidates as the data to be transmitted to pedometer 100 from a plurality of pieces of data, based on the information on sensing received from pedometer 100. Then, CPU 34 causes LCD 12 and/or LCD 14 to display information (names) indicating the extracted course candidates. In addition, CPU 34 selects data to be transmitted to pedometer 100 from among the course candidates, in accordance with the user's operation accepted by an input device such as touch panel 24.

Referring back to FIG. 20, in step S518, CPU 34 enters the reception stand-by state and determines whether identification data 228 (see FIG. 8) has been received from pedometer 100 or not. When identification data 228 has not been received from pedometer 100 (NO in step S518), CPU 34 determines whether a period during which reception of identification data 228 fails has exceeded a prescribed threshold period or not (step S520). When the period during which reception of identification data 228 fails has exceeded the prescribed threshold period (YES in step S520), the process proceeds to step S522. When the period during which reception of identification data 228 fails has not exceeded the prescribed threshold period (NO in step S520), the processing in step S518 is repeated.

In contrast, when identification data 228 has been received from pedometer 100 (YES in step S518), the process proceeds to step S526.

In step S522, CPU 34 disconnects communication. In successive step S524, CPU 34 causes LCD 12 and/or LCD 14 to display an error screen. Namely, CPU 34 performs error processing in connection with step S522 and step S524 when data communication with communication target pedometer 100 is not normally carried out or when the processing is interrupted in pedometer 100.

On the other hand, in step S526, CPU 34 determines whether registration status flag 228*c* (see FIG. 8) included in received identification data 228 has been set to "ON" or not When registration status flag 228*c* has been set to "ON" (YES in step S526), the process proceeds to step S528. When registration status flag 228*c* has not been set to "ON" (NO in step S526), the process proceeds to step S522. Namely, CPU 34 does not allow the process to proceed unless the initial registration processing is completed in communication target pedometer 100.

In step S528, CPU 34 determines whether possessed character flag 228*h* (FIG. 8) included in received identification data 228 has been set to "ON" or not. When possessed character flag 228*h* has not been set to "ON" (NO in step S528), the process proceeds to step S530. When possessed character flag 228*h* has been set to "ON" (YES in step S528), the process proceeds to step S522. Namely, CPU 34 does not allow the process to proceed when any character has already been transferred to communication target pedometer 100.

In step S530, CPU 34 determines whether software country code 228*d*, software version 228*e*, possessed character country code 228*f*, and possessed character version 228*g* included in received identification data 228 match with software country code 208*d*, software version 208*e*, possessed character country code 208*f*, and possessed character version 208*g* included in identification data 208 of game device 10 itself or not, respectively. When matching in all items is achieved (YES in step S530), the process proceeds to step S532. When even a single item does not match (NO in step S530), the process proceeds to step S522, Namely, CPU 34 does not allow the process to proceed unless matching of the country code and the software version is achieved between game device 10 and pedometer 100.

In step S532, CPU 34 transmits identification data 208 (see FIG. 8) of game device 10 itself and a communication mode (in this case, a data transmission mode from the game device to the pedometer) to communication target pedometer 100. In successive step S534, CPU 34 enters the reception stand-by state and determines whether or not the reception completion signal has been received from communication target pedometer 100. When the reception completion signal has not been received from pedometer 100 (NO in step S534), CPU 34 determines whether a period during which reception of the reception completion signal fails has exceeded a prescribed threshold period or not (step S536). When the period during which reception of the reception completion signal fails has exceeded the prescribed threshold period (YES in step S536), the process proceeds to step S522. When the period during which reception of the reception completion signal fails has not exceeded the prescribed threshold period (NO in step S536), the processing in step S534 is repeated. In contrast, when the reception completion signal has been received from pedometer 100 (YES in step S534), the process proceeds to step S538.

In step S538, CPU 34 reads data-to-be-transmitted 210 (see FIG. 8) and transmits the data to communication target pedometer 100. In successive step S540, CPU 34 determines whether communication error occurred or not. When communication error occurred (YES in step S540), the process proceeds to step S522. When communication error did not occur (NO in step S540), the process proceeds to step S542.

In step S542, CPU 34 enters the reception stand-by state and determines whether or not the reception completion signal has been received from communication target pedometer 100. When the reception completion signal has not been received from pedometer 100 (NO in step S542), CPU 34 determines whether a period during which reception of the reception completion signal fails has exceeded a prescribed threshold period or not (step S544). When the period during which reception of the reception completion signal falls has exceeded the prescribed threshold period (Y-ES in step S544), the process proceeds to step S522. When the period during which reception of the reception completion signal fails has not exceeded the prescribed threshold period (NO in step S544), the processing in step S542 is repeated. In contrast, when the reception completion signal has been received from pedometer 100 (YES in step S542), the process proceeds to step S546.

In step S546, CPU 34 disconnects communication. In successive step S548, CPU 34 sets possessed character flag 208*h* of identification data 208 of game device 10 itself to "ON". In successive step S550, CPU 34 has contents of character data 210*a* included in data-to-be-transmitted 210 transmitted to pedometer 100 in step S538 stored as back-up data 213 (see FIG. 8) of game device 10 itself. In further successive step S552, CPU 34 erases the contents stored as back-up data 213 from possessed character data 207*c* of save data 207 of game device 10 itself. Namely, CPU 34 updates the contents of save data 207 such that play using the character that was transferred from game device 10 to pedometer 100 is not performed in the get and growth game play, and CPU 34 has the character data stored as back-up data 213 such that the character can be restored in case that character data transferred to transfer target pedometer 100 is not returned. Then, the process returns to the main routine.

(Pedometer)

The processing for transmitting data from the game device to the pedometer in the pedometer will now be described.

Initially, CPU 110 of pedometer 100 reads identification data 228 (see FIG. 8) and transmits read identification data 228 to communication target game device 10 (step S600). In successive step S602, CPU 110 enters the reception stand-by state and determines whether or not identification data 208 (see FIG. 8) has been received from communication target game device 10. Here in order to notify the user who operated pedometer 100 that communication is in progress, a communication processing screen as shown in FIG. 24 is displayed on LCD 106 of pedometer 100. In the communication processing screen shown in FIG. 24, a state that pedometer 100 is communicating data is schematically expressed and such a message as "communicating" is displayed.

Referring back to FIG. 21, when identification data 208 has not been received from game device 10 (NO in step S602), CPU 110 determines whether a period during which reception of identification data 208 fails has exceeded a prescribed threshold period or not (step S604). When the period during which reception of identification data 208 fails has exceeded the prescribed threshold period (YES in step S604), the process proceeds to step S606. When the period during which reception of identification data 208 fails has not exceeded the prescribed threshold period (NO in step S604), the processing in step S602 is repeated. In contrast, when identification data 208 has been received from game device 10 (YES in step S602), the process proceeds to step S610.

In step S606, CPU 110 disconnects communication. In successive step S608, CPU 110 reads image data for communication error out of the image data stored as universal image 222 (see FIG. 8) and loads the data to RAM 114, and causes LCD 106 to display the error screen based on the loaded image data. Alternatively, as the initial registration processing has been completed by this time point, instead of the image data a for communication error included in universal image 222, image data for communication error included in various types of image data•icons 229*b* in initial registration data 229 received from game device 10 at the time of the initial registration processing may be read and an error image may be displayed.

In step S610, CPU 110 determines a communication mode received together with identification data 208. When the communication mode is the "data transmission mode from the game device to the pedometer" ("game device→pedometer" in step S610), the process proceeds to step S612. When the communication mode is the "data transmission mode from the pedometer to the game device" (pedometer→game device" in step S610), the process proceeds to step S652 shown in FIG. 26.

In step S612, CPU 110 determines whether registration status flag 208*c* (see FIG. 8) included in received identification data 208 has been set to "ON" or not. When registration status flag 208*c* has been set to "ON" (YES in step S612), the process proceeds to step S614. When registration status flag 208*c* has not been set to "ON" (NO in step S612), the process proceeds to step S606. Namely, CPU 110 does not allow the process to proceed unless the initial registration processing is completed in communication target game device 10.

In step S614, CPU 110 determines whether possessed character flag 208*h* (FIG. 8) included in received identification data 208 has been set to "ON" or not. When possessed character flag 208*h* has not been set to "ON" (NO in step S614), the process proceeds to step S616. When possessed character flag 208*h* has been set to "ON" (YES in step S614), the process proceeds to step S606. Namely, CPU 110 does not allow the process to proceed when any character has already been transferred to communication target pedometer 100 or other pedometer 100.

In step S616, CPU 110 determines whether software country code 208*d*, software version 208*e* possessed character country code 208*f*, and possessed character version 208*g* included in received identification data 208 match with software country code 228*d*, software version 228*e*, possessed character country code 228*f* and possessed character version 228*g* included in identification data 228 of pedometer 100 itself or not, respectively. When matching in all items is achieved (YES in step S616), the process proceeds to step S618. When even a single item does not match (NO in step S616), the process proceeds to step S606. Namely, CPU 110 does not allow the process to proceed unless matching of the country code and the software version is achieved between pedometer 100 and game device 10.

In step S618, CPU 110 transmits the reception completion signal to communication target game device 10. In successive step S620, CPU 110 enters the reception stand-by state and determines whether or not data-to-be-transmitted 210 has been received from communication target game device 10. When data-to-be-transmitted 210 has not been received (NO in step S620), CPU 110 determines whether a period during which reception of data-to-be-transmitted 210 fails has exceeded a prescribed threshold period or not (step S622). When the period during which reception of data-to-be-transmitted 210 fails has exceeded the prescribed threshold period (YES in step S622), the process proceeds to step S624. When the period during which reception of data-to-be-transmitted 210 fails has not exceeded the prescribed threshold period (NO in step S622), the processing in step S620 is repeated. In contrast, when data-to-be-transmitted 210 has been received from game device 10 (YES in step S620), the process proceeds to step S630.

In step S624, CPU 110 disconnects communication. In successive step S626, CPU 110 reads image data for communication error out of the image data stored as universal image 222 (see FIG. 8) and loads the data to RAM 114, and causes LCD 106 to display the error screen based on the loaded image data. Alternatively, as the initial registration processing has been completed by this time point, instead of the image data for communication error included in universal image 222, image data for communication error included in various types of image data•icons 229*b* in initial registration data 229 received from game device 10 at the time of the initial registration processing may be read and an error image may be displayed.

In further successive step S628, CPU 110 discards the data that has already been received. Then, the process returns to the main routine.

In step S630, CPU 110 causes back-up memory 115 (see FIG. 7) to store received data-to-be-transmitted 210 as reception data 230 (see FIG. 8) of pedometer 100 itself. In successive step S632, CPU 110 determines whether communication error occurred or not. When communication error occurred (YES in step S632), the process proceeds to step S624. When communication error did not occur (NO in step S632), the process proceeds to step S634.

In step S634, CPU 110 transmits the reception completion signal to communication target game device 10. In successive step S636, CPU 110 disconnects communication. In successive step S638, CPU 110 causes LCD 106 to display a character based on character data 230*a* included in reception data 230 stored in step S630.

In step S640, CPU 110 sets possessed character flag 228*h* of identification data 228 of pedometer 100 itself to "ON". In successive step S642, CPU 110 has possessed character country code 208*f* included in data-to-be-transmitted 210 received from game device 10 stored as possessed character country code 228*f* of identification data 228 of pedometer 100 itself. In further successive step S644, CPU 110 has possessed character version 208*g* included in identification data 208 received from game device 10 stored as possessed character version 228*g* of identification data 228 of pedometer 100 itself. Then, the process returns to the main routine.

<Processing for Transmitting Data From Pedometer to Game Device>

Figure 25:
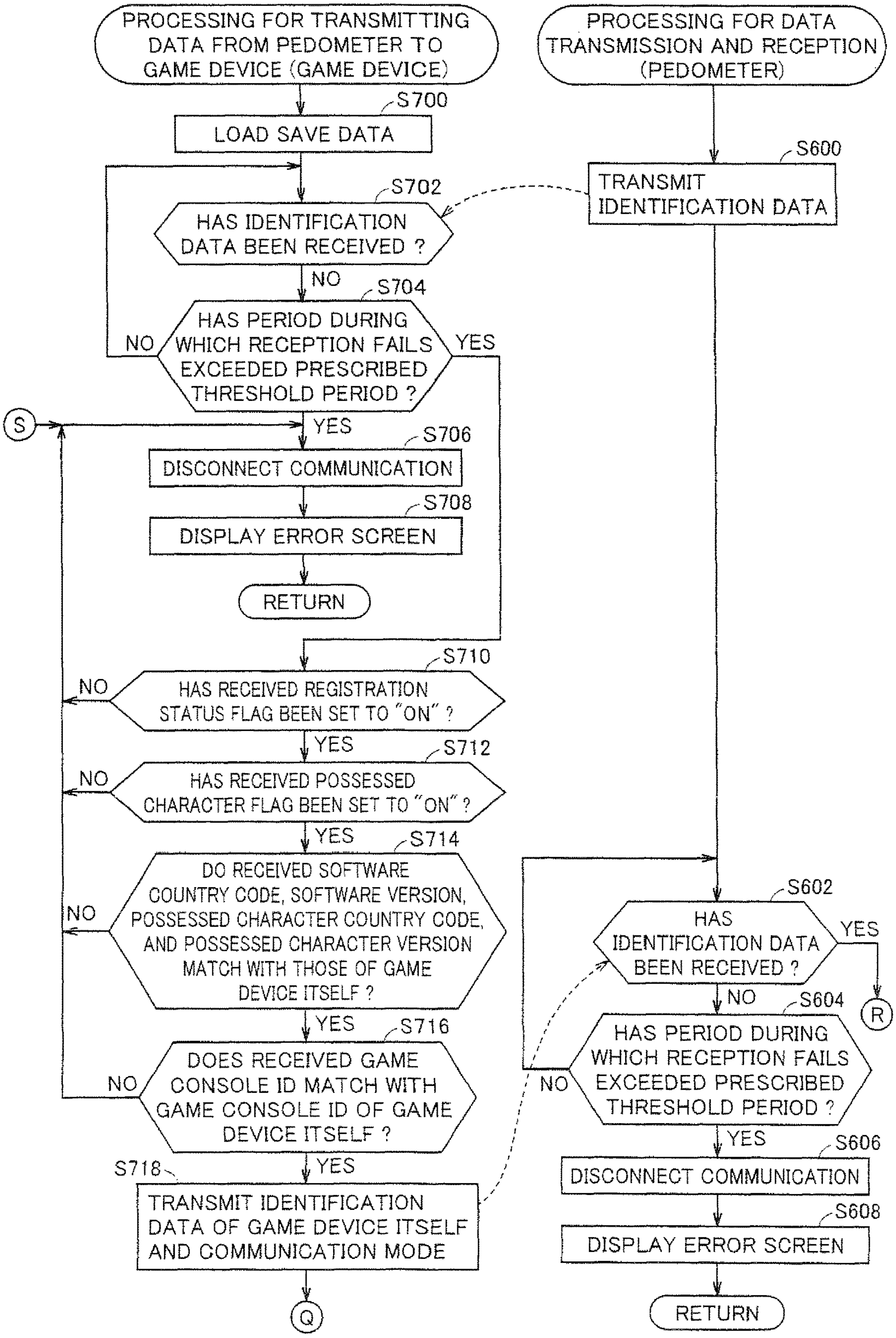
FIGS. 25 to 27 are flowcharts showing a procedure of processing for transmitting data from the pedometer to the game device in the information processing system according to the embodiment of the present invention.
Figure 26:
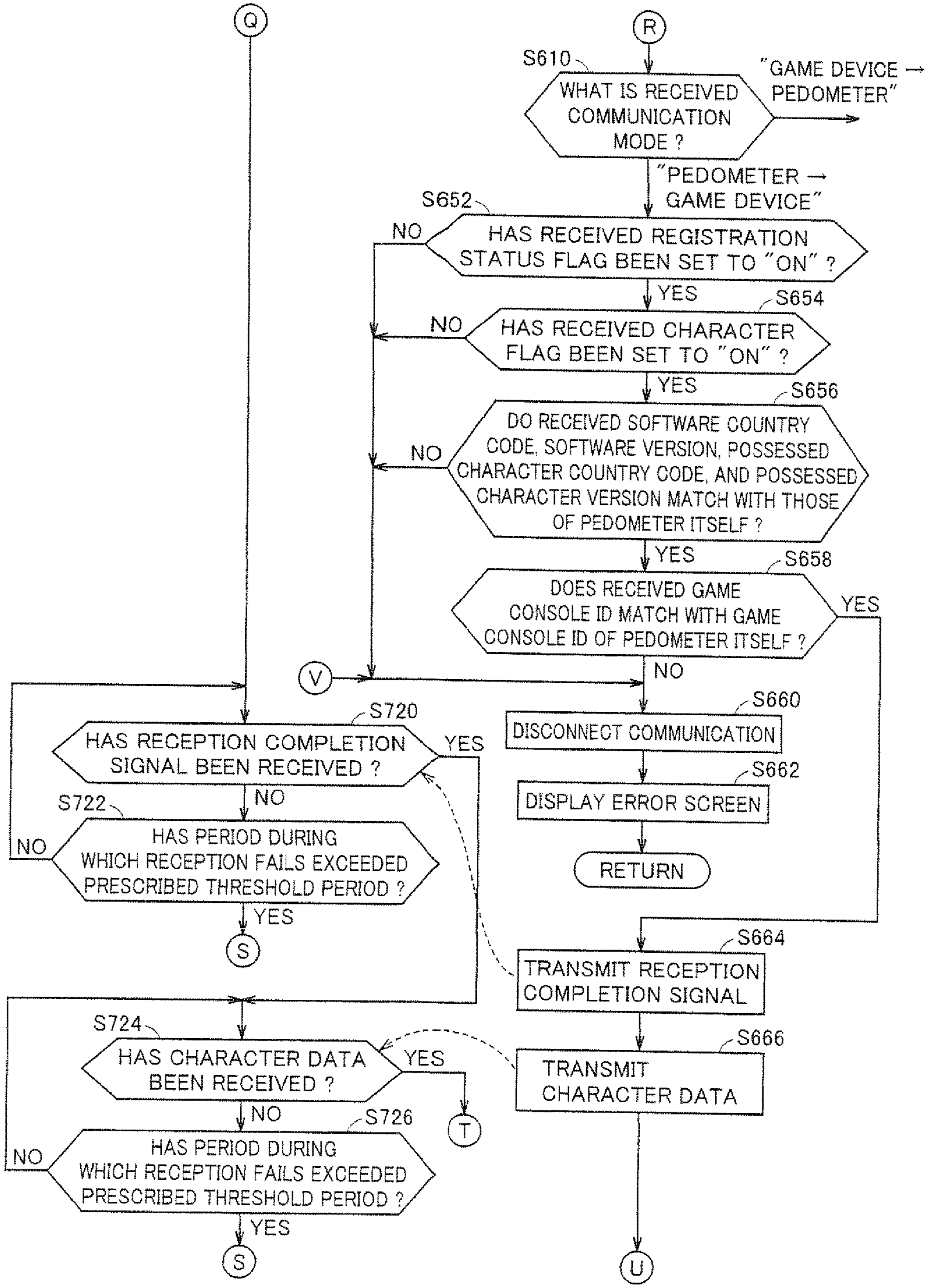
Figure 27:
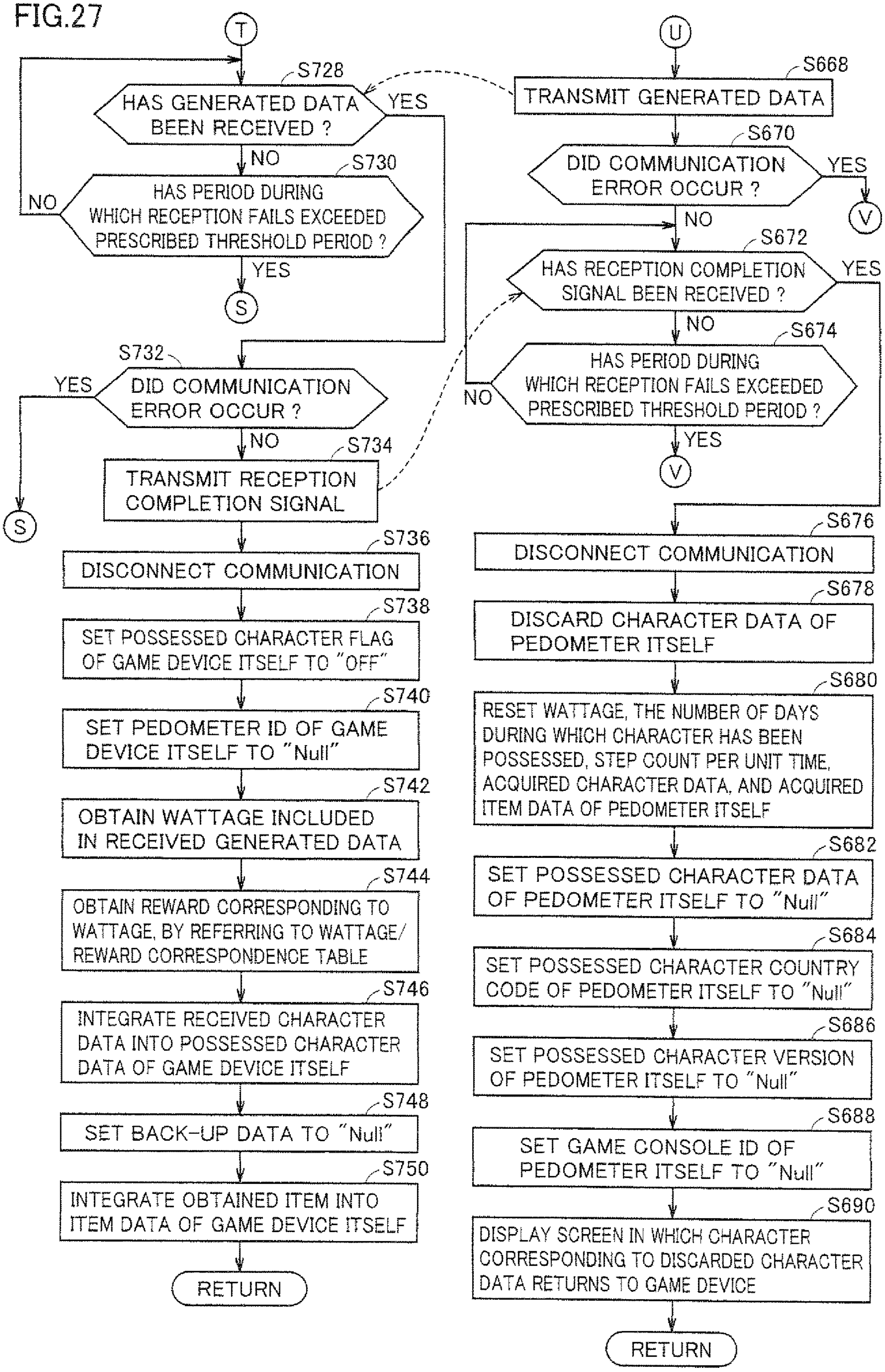
Figure 28:
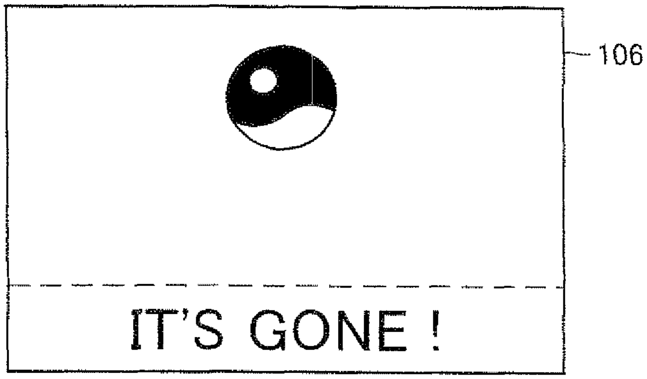
FIG. 28 is a diagram showing exemplary screen display provided in step S690 in FIG. 27.

A detailed processing procedure in processing for transmitting data from the pedometer to the game device in the information processing system according to the present embodiment (step S116 in FIG. 9 and step S218 in FIG. 11) will now be described. FIGS. 25 to 27 are flowcharts showing a procedure of processing for transmitting data from pedometer 100 to the game device in the information processing system according to the embodiment of the present invention. FIG. 28 is a diagram showing exemplary screen display provided in step S690 in FIG. 27.

(Game Device)

Referring to FIGS. 25 to 27) initially, CPU 34 of game device 10 reads save data 207 and loads the data to RAM 42 (step S700). In successive step S702, CPU 34 enters the reception stand-by state and determines whether identification data 228 (see FIG. 8) has been received from pedometer 100 or not. When identification data 228 has not been received from pedometer 100 (NO in step S702), CPU 34 determines whether a period during which reception of identification data 228 fails has exceeded a prescribed threshold period or not (step S704). When the period during which reception of identification data 228 fails has exceeded the prescribed threshold period (YES in step S704)) the process proceeds to step S706. When the period during which reception of identification data 228 fails has not exceeded the prescribed threshold period (NO in step S704), the processing in step S702 is repeated.

In contrast, when identification data 228 has been received from pedometer 100 (YES in step S702), the process proceeds to step S710.

In step S706, CPU 34 disconnects communication. In successive step S708, CPU 34 causes LCD 12 and/or LCD 14 to display an error screen. Then, the process returns to the main routine.

On the other hand, in step S710, CPU 34 determines whether registration status flag 228*c* (FIG. 8) included in received identification data 228 has been set to "ON" or not. When registration status flag 228*c* has been set to "ON" (YES in step S710), the process proceeds to step S712. When registration status flag 228*c* has not been set to "ON" (NO in step S710), the process proceeds to step S706. Namely, CPU 34 does not allow the process to proceed unless the initial registration processing is completed in communication target pedometer 100.

In step S712, CPU 34 determines whether possessed character flag 228*h* (FIG. 8) included in received identification data 228 has been set to "ON" or not. When possessed character flag 228*h* has been set to "ON" (YES in step S712)) the process proceeds to step S714. When possessed character flag 228*h* has not been set to "ON" (NO in step S712)) the process proceeds to step S706. Namely, CPU 34 does not allow the process to proceed unless any character has been transmitted to communication target pedometer 100.

In step S714, CPU 34 determines whether software country code 228*d*, software version 228*e*, possessed character country code 228*f*, and possessed character version 228*g* included in received identification data 228 match with software country code 208*d*, software version 208*e*, possessed character country code 208*f*, and possessed character version 208*g* included in identification data 208 or not, respectively. When matching in all items is achieved (YES in step S714), the process proceeds to step S716. When even a single item does not match (NO in step S714), the process proceeds to step S706. Namely, CPU 34 does not allow the process to proceed unless matching of the country code and the software version is achieved between game device 10 and pedometer 100.

In step S716, CPU 34 determines whether game console ID 228*b* included in received identification data 228 matches with game console ID 208*b* included in identification data 208 of game device 10 itself or not. When received game console ID 228*h* matches with game console ID 208*b* (YES in step S716), the process proceeds to step S718. When received game console ID 228*b* does not match with game console ID 208*h* (NO in step S716), the process proceeds to step S706. Namely, CPU 34 allows the process to proceed only when a target is the same game console to which a character has been transmitted in advance. In step S716, pedometer ID 228*a* included in received identification data 228 may be compared with pedometer ID 208*a* included in identification data 208 of game device 10 itself.

In step S718, CPU 34 transmits identification data 208 (see FIG. 8) of game device 10 itself and a communication mode (in this case, a data transmission mode from the pedometer to the game device) to communication target pedometer 100. In successive step S720, CPU 34 enters the reception stand-by state and determines whether or not the reception completion signal has been received from communication target pedometer 100. When the reception completion signal has not been received from pedometer 100 (NO in step S720), CPU 34 determines whether a period during which reception of the reception completion signal fails has exceeded a prescribed threshold period or not (step S722). When the period during which reception of the reception completion signal fails has exceeded the prescribed threshold period (YES in step S722), the process proceeds to step S706. When the period during which reception of the reception completion signal fails has not exceeded the prescribed threshold period (NO in step S722), the processing in step S720 is repeated. In contrast, when the reception completion signal has been received from pedometer 100 (YES in step S720), the process proceeds to step S724.

In step S724, CPU 34 determines whether or not character data 230*a* has been received from communication target pedometer 100. When character data 230*a* has not been received from pedometer 100 (NO in step S724), CPU 34 determines whether a period during which reception of character data 230*a* fails has exceeded a prescribed threshold period or not (step S726). When the period during which reception of character data 230*a* fails has exceeded the prescribed threshold period (YES in step S726), the process proceeds to step S706. When the period during which reception of character data 230*a* fails has not exceeded the prescribed threshold period (NO in step S726), the processing in step S724 is repeated. In contrast, when character data 230*a* has been received from pedometer 100 (YES in step S724), the process proceeds to step S728.

In step S728, CPU 34 determines whether generated data 232 (see FIG. 8) has been received from communication target pedometer 100 or not. When generated data 232 has not been received from pedometer 100 (NO in step S728), CPU 34 determines whether a period during which reception of generated data 232 fails has exceeded a prescribed threshold period or not (step S730). When the period during which reception of generated data 232 fails has exceeded the prescribed threshold period (YES in step S730), the process proceeds to step S706. When the period during which reception of generated data 232 fails has not exceeded the prescribed threshold period (NO in step S730), the processing in step S728 is repeated. In contrast, when generated data 232 has been received from pedometer 100 (YES in step S728), the process proceeds to step S732.

In step S732, CPU 34 determines whether communication error occurred or not. When communication error occurred (YES in step S732), the process proceeds to step S706. When communication error did not occur (NO in step S732), the process proceeds to step S734.

In step S734, CPU 34 transmits the reception completion signal to communication target pedometer 100. In successive step S736, CPU 34 disconnects communication.

In step S738, CPU 34 sets possessed character flag 208*h* of identification data 208 of game device 10 itself to "OFF". Namely, CPU 34 determines that the character previously transmitted to pedometer 100 returned to game device 10, since it has received character data 230*a* from pedometer 100 in step S724.

In successive step S740, CPU 34 sets the pedometer ID of identification data 208 of game device 10 itself to "Null". Namely, CPU 34 resets information for identifying communication target pedometer 100, because the character held by the game device itself has been transferred to no pedometer 100.

In step S742, CPU 32 obtains wattage 232*a* included in generated data 232 received from communication target pedometer 100. Namely, CPU 34 receives the result information generated in accordance with the result of sensing by the motion sensor, from communication target pedometer 100.

In step S744, CPU 34 reads wattage/reward correspondence table 205 (FIG. 8) and loads the table to RAM 42, and obtains the reward corresponding to the wattage obtained in step S742 by referring to wattage/reward corresponding table 205. Namely, CPU 34 performs information processing in accordance with the result information generated in accordance with the result of sensing by the motion sensor from communication target pedometer 100.

In successive step S746, CPU 314 integrates character data 230*a* and acquired character data 232*f* received from communication target pedometer 100 into possessed character data 207*c* of save data 207 of game device 10 itself. Namely, CPU 34 receives data stored in communication target pedometer 100 and performs information processing in accordance with the received data. In other words, CPU 110 of communication target pedometer 100 transmits character data 230*a* obtained by modifying character data 210*a* received from game device 10 and acquired character data (for n character(s)) 232*f* obtained by modifying enemy character data (for n character(s)) 230*c* received from game device 10 to corresponding game device 10. CPU 34 of transmission destination game device 10 performs processing for integration with possessed character data 207*c* of game device 10 itself, as exemplary information processing based on received character data 230*a* and acquired character data (for n character(s)) 232*f*.

In successive step S748, CPU 34 sets contents of back-up data 213 to "Null". Namely, CPU 34 determines that the character previously transmitted to pedometer 100 returned to game device 10 and discards the saved character data, since it has received character data 230*a* from pedometer 100 in step S724.

In successive step S750, CPU 34 integrates the item obtained in step S744 into possessed item data 207*b* of save data 207 of game device 10 itself. Namely, CPU 34 receives the data stored in communication target pedometer 100 and performs information processing in accordance with the received data. In other words, CPU 110 of communication target pedometer 100 transmits acquired item data (for m item(s)) 232*g* obtained by modifying appearing item data (for m item(s)) 230*d* received from game device 10 to corresponding game device 10. Then, CPU 34 of transmission destination game device 10 performs processing for integration with possessed item data 207*b* of game device 10 itself, as exemplary information processing based on received acquired item data (for m item(s)) 232*g*.

Thereafter, the process returns to the main routine.

(Pedometer)

The processing for transmitting data from the pedometer to the game device in pedometer 100 will now be described.

Initially, CPU 110 of pedometer 100 performs the processing in steps S600 to S610, as in FIGS. 20 and 21 above. In the processing for transmitting data from the pedometer to the game device, in step S610, the communication mode is determined as the "data transmission mode from the pedometer to the game device" ("pedometer→game device" in step S610). Then, the process proceeds to step S652.

In step S652, CPU 110 determines whether registration status flag 208*c* (see FIG. 8) included in received identification data 208 has been set to "ON" or not. When registration status flag 208*c* has been set to "ON" (YES in step S652), the process proceeds to step S654. When registration status flag 208*c* has not been set to "ON" (NO in step S652), the process proceeds to step S660. Namely, unless the initial registration processing is completed in communication target game device 10, CPU 110 does not allow the process to proceed.

In step S654, CPU 110 determines whether possessed character flag 208*h* (see FIG. 8) included in received identification data 208 has been set to "ON" or not. When possessed character flag 208*h* has not been set to "ON" (NO in step S654), the process proceeds to step S660. When possessed character flag 208*h* has been set to "ON" (YES in step S654), the process proceeds to step S656. Namely, CPU 110 does not allow the process to proceed unless any character has been transferred from communication target game device 10.

In step S656, CPU 110 determines whether software country code 208*d*, software version 208*e*, possessed character country code 208*f*, and possessed character version 208*g* included in received identification data 208 match with software country code 228*d*, software version 228*e*, possessed character country code 228*f*, and possessed character version 228*g* included in identification data 228 of pedometer 100 itself or not, respectively. When matching in all items is achieved (YES in step S656), the process proceeds to step S658. When even a single item does not match (NO in step S656), the process proceeds to step S660. Namely, CPU 110 does not allow the process to proceed unless matching of the country code and the software version is achieved between pedometer 100 and game device 10.

In step S658, whether game console ID 7085 included in received identification data 208 matches with game console ID 228*b* included in identification data 228 of pedometer 100 itself or not is determined. When received game console ID 208*b* matches with game console ID 228*b* (YES in step S658), the process proceeds to step S664. When received game console ID 208*b* does not match with game console ID 228*b* (NO in step S658), the process proceeds to step S660. Namely, CPU 110 allows the process to proceed only when communication target game device 10 is the same game device that previously received a character. In step S658, pedometer ID 208*a* included in received identification data 208 may be compared with pedometer ID 228*a* included in identification data 228 of pedometer 100 itself.

In step S660, CPU 110 disconnects communication. In successive step S662, CPU 110 reads image data for communication error out of the image data stored as universal image 222 (see FIG. 8) and loads the data to RAM 114, and causes LCD 106 to display the error screen based on the loaded image data. Then, the process returns to the main routine. Alternatively, as the initial registration processing has been completed by this time point, instead of the image data for communication error included in universal image 222, image data for communication error included in various types of image data•icons 229*b* in initial registration data 229 received from game device 10 at the time of the initial registration processing may be read and an error image may be displayed.

In step S664, CPU 110 transmits the reception completion signal to communication target game device 10. In successive step S666, CPU 110 transmits character data 230*a* of reception data 230 of pedometer 100 itself to communication target game device 10. In further successive step S668, CPU 110 transmits generated data 232 of pedometer 100 itself to communication target game device 10.

In step S670, CPU 110 determines whether communication error occurred or not. When communication error occurred (YES in step S670), the process proceeds to step S660. When communication error did not occur (NO in step S670), the process proceeds to step S672.

In step S672, CPU 110 enters the reception stand-by state and determines whether or not the reception completion signal has been received from communication target game device 10. When the reception completion signal has not been received (NO in step S672), CPU 110 determines whether a period during which reception of the reception completion signal fails has exceeded a prescribed threshold period or not (step S674). When the period during which reception of the reception completion signal fails has exceeded the prescribed threshold period (YES in step S674), the process proceeds to step S660. When the period during which reception of the reception completion signal fails has not exceeded the prescribed threshold period (NO in step S674), the processing in step S672 is repeated. In contrast, when the reception completion signal has been received from game device 10 (YES in step S672), the process proceeds to step S676. In step S676, CPU 110 disconnects communication.

In step S678, CPU 110 discards character data 230*a* included in reception data 230 of pedometer 100 itself. Namely, since CPU 110 returned in step S664 character data 230*a* that has been held to communication target game device 10, held character data 230*a* is reset.

In successive step S680, CPU 110 resets wattage 232*a*, the number of days during which the character has been possessed 232*d*, step count per unit time 232*e*, acquired character data (for n character(s)) 232*f*, and acquired item data (for m item(s)) 232*g* included in generated data 232 of pedometer 100 itself. Namely, since CPU 110 once transmitted in step S668, generated data 232 representing the result information in accordance with the result of sensing by motion sensor 112 to communication target game device 10, CPU 110 resets the transmitted result information.

In successive step S682, CPU 110 sets possessed character flag 228*h* of identification data 228 of pedometer 100 itself to "Null". In addition, in step S684, CPU 110 sets possessed character country code 228*f* of identification data 228 of pedometer 100 itself to "Null". Moreover, in step S686, CPU 110 sets possessed character version 228*g* of identification data 228 of pedometer 100 itself to "Null". Further, in step S688, CPU 110 sets game console ID 228*b* of identification data 228 of pedometer 100 itself to "Null". Namely, since CPU 110 returned the character that had been held to game device 10, CPU 110 resets information for identifying communication target game device 10 and information used for data communication with specific game device 10.

In successive step S690, CPU 110 provides such an effect that a corresponding character returns to game device 10 as screen display on LCD 106, based on character data 230*a* discarded in step S678. For example, such an effect that a ball-shaped capsule containing the character moves away from pedometer 100 is provided, as shown in FIG. 28. Then, the process returns to the main routine.

<Step Count Game>

Figure 29:
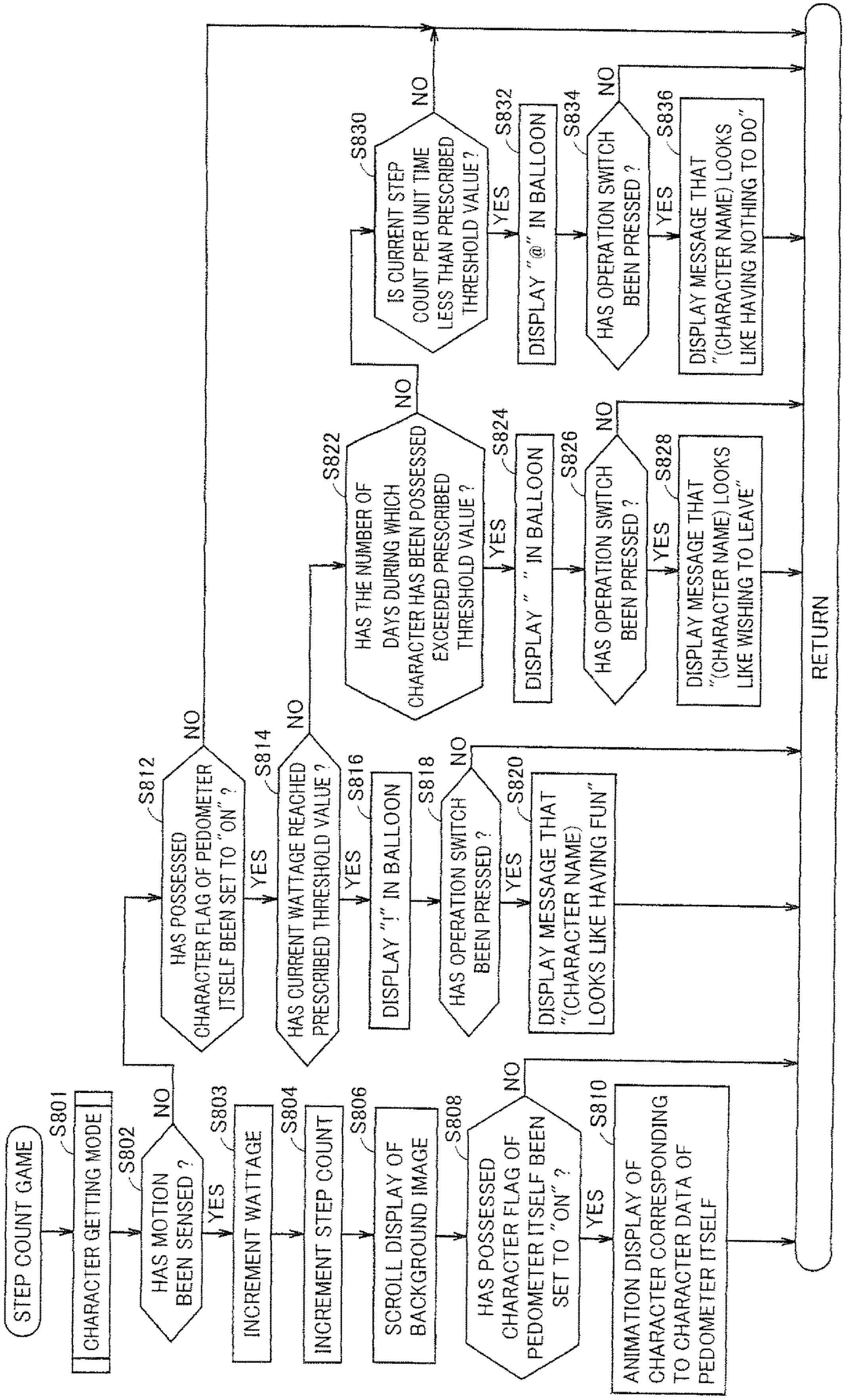
FIG. 29 is a flowchart showing a procedure of step count game processing in the pedometer according to the embodiment of the present invention.

A processing procedure in the step count game executed in pedometer 100 according to the present embodiment will now be described. FIG. 29 is a flowchart showing a processing procedure of the step count game in pedometer 100 according to the embodiment of the present invention. It is noted that each step shown in FIG. 29 is provided by execution of a program by CPU 110 of pedometer 100. FIGS. 30 to 33 are diagrams showing an exemplary game screen in the step count game according to the embodiment of the present invention.

In pedometer 100 according to the present embodiment, as shown in step S222 in FIG. 11 above, the step count game is started only when registration status flag 228*c* (see FIG. 8) of pedometer 100 itself is set to "ON". Namely, CPU 110 of pedometer 100 determines whether or not the data received from game device 10 (such as initial registration data 229) is stored in back-up memory 115 or the like of pedometer 100, and when it is determined that the data is not stored, the motion sensor is disabled and the step count game is not executed either.

Figure 30:
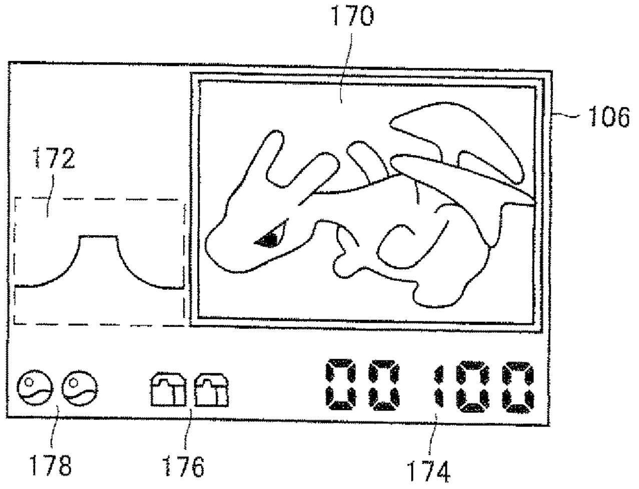
FIGS. 30 to 33 are diagrams showing an exemplary game screen in the step count game according to the embodiment of the present invention.

During execution of the step count game according to the present embodiment, typically, a game screen as shown in FIG. 30 is displayed on LCD 106, In the game screen shown in FIG. 30, a character image 170 based on character data 230*a* (see FIG. 8) received from game device 10 is displayed, and a background image 172 included in various types of image data•icons 229*b* (see FIG. 8) received from game device 10 is displayed. In addition, in this game screen, a step count value 174 indicating the number of times of motion sensed by motion sensor 112 (the number of steps of the user wearing pedometer 100) is displayed. Moreover, in this game screen, icons 176 and 178 indicating presence of an item and a character acquired alone with the progress of the step count game are displayed.

The processing procedure of the step count game in pedometer 100 according to the present embodiment will be described hereinafter with reference to FIG. 29.

Referring to FIG. 29, initially, CPU 110 performs processing in a character getting mode (step S801). The character getting mode refers to processing for "getting" one enemy character or a plurality of enemy characters out of enemy character data (for n character(s)) 230*c* received in advance from game device 10, in accordance with wattage 232*a* updated in step S803 or the like which will be described later. A further detailed processing procedure will be described later. In successive step S802, CPU 110 determines whether motion sensor 112 has sensed motion or not. When motion has been sensed (YES in step S802), the process proceeds to step S803. When motion has not been sensed (NO in step S802), the process proceeds to step S812.

In step S803, CPU 110 increments wattage 232*a* of generated data 232 by a value in accordance with the sensed step count. Namely, CPU 110 generates wattage 232*a* and successively updates wattage 232*a*, as an example of sensing information in accordance with the result of sensing by motion sensor 112. It is noted that wattage per one step can arbitrarily be set. Here, wattage 232*a* is incremented by a value obtained by multiplying the sensed step count by a coefficient for converting the step count to wattage.

In successive step S804, CPU 110 increments step count 232*b* of generated data 232 by the sensed step count. Namely, CPU 110 has the number of times of occurrence of motion sensed by motion sensor 112 stored as the result of sensing, and successively updates the result of sensing. The incremented value of step count 232*b* is reflected on step count value 174 in FIG. 30 at any time. In addition to or instead of the value of step count 232*h*, the value of wattage 232*a* may be reflected on step count value 174 in FIG. 30.

Figure 31:
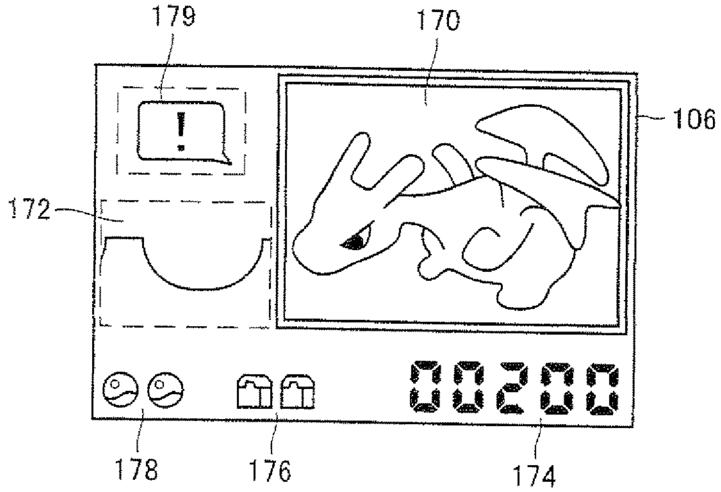

In successive step S806, CPU 110 causes LCD 106 to scroll-display background image 172 in accordance with the sensed step count. A game screen as shown in FIG. 31 is displayed as an exemplary processing result in step S806. Background image 172 in the game screen shown in FIG. 31 is horizontally scrolled, as compared with background image 172 in the game image shown in FIG. 30. Namely, CPU 110 generates a game course image in accordance with the course data and generates an image output in accordance with the result of sensing by motion sensor 112 on LCD 106. In other words, CPU 110 varies a manner of display of the background image based on various types of image data•icons 229*b*, in accordance with the result of sensing by motion sensor 112.

In addition to or instead of the number of times of occurrence of motion sensed by motion sensor 112, a manner of display of the background image based on various types of image data•icons 229*b* may be varied in accordance with information indicating presence/absence of sensing by motion sensor 112.

Figure 32:
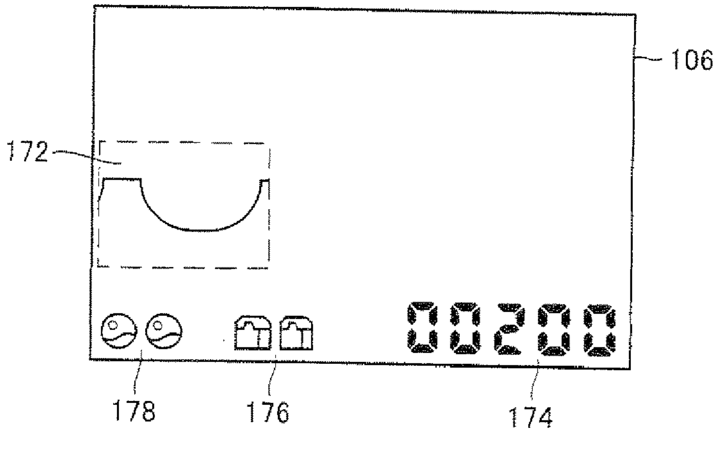

In successive step S808, CPU 110 determines whether possessed character flag 228*h* of identification data 228 of pedometer 100 itself has been set to "ON" or not. When possessed character flag 228*h* has been set to "ON" (YES in step S808), the process proceeds to step S810. When possessed character flag 228*h* has not been set to "ON" (NO in step S808), the process returns to the main routine. Here, as a character has not been transferred from game device 10 to pedometer 100, a game screen as shown in FIG. 32 is displayed on LCD 106. Namely, character image 170 is not displayed on the game screen shown in FIG. 32.

In step S810, CPU 110 causes LCD 106 to display a corresponding character as animation, based on character data 230*a* of reception data 230 of pedometer 100 itself. Here, the game screen as shown in FIG. 30 is displayed on LCD 106. A game course image and a character image are thus output. Then, the process returns to the main routine.

In contrast, in step S812, CPU 110 determines whether possessed character flag 228*h* of identification data 228 of pedometer 100 itself has been set to "ON" or not. When possessed character flag, 228*h* has been set to "ON" (YES in step S812), the process proceeds to step S814. When possessed character flag 228*h* has not been set to "ON" (NO in step S812), the process returns to the main routine. Namely, CPU 110 does not allow the process to proceed unless any character is transferred from communication target game device 10.

In step S814, CPU 110 determines whether current wattage has reached a prescribed threshold value or not. Namely, CPU 110 determines whether the value based on the number of times of occurrence of motion sensed by motion sensor 112 is equal to or greater than a prescribed threshold value or not. When the current wattage has reached the prescribed threshold value (YES in step S814), the process proceeds to step S816. When the current wattage has not reached the prescribed threshold value (NO in step S814), the process proceeds to step S822. The prescribed threshold value in step S814 is set, for example, to 200 watts.

In step S816, CPU 110 causes LCD 106 to display "!" in a balloon. Here, the game screen as shown in FIG. 31 is displayed on LCD 106. Namely, in the game screen shown in FIG. 31, a balloon image 179 showing "!" is further displayed.

In successive step S818, CPU 110 determines whether any operation switch 104 has been pressed or not. When any operation switch 104 has been pressed (YES in step S818), the process proceeds to step S820. When no operation switch 104 has been pressed (NO in step S818), the process returns to the main routine.

Figure 33:
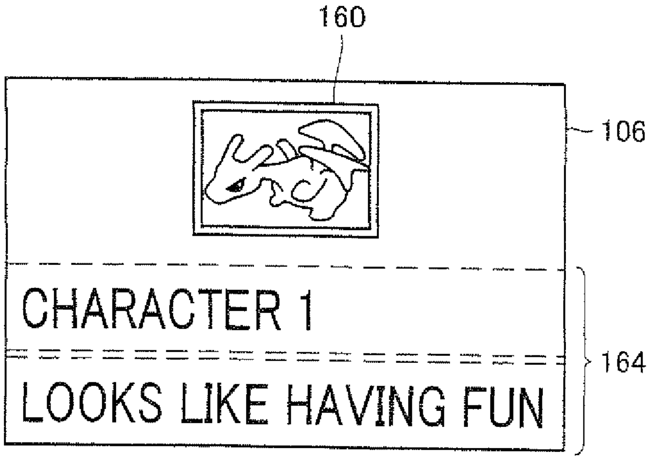

In step S820, CPU 110 causes LCD 106 to display a message that "(character name) looks like having fun" in a balloon. Here, a game screen as shown in FIG. 33 is displayed on LCD 106. Namely, in the game screen shown in FIG. 33, character image 160 based on character data 230*a* (see FIG. 8) is displayed, and a message image 164 showing "character 1 looks like having fun" is displayed. The game image shown in FIG. 33 may be displayed after the game image shown in FIG. 31 is erased, or it may be displayed in a manner superimposed on the game image shown in FIG. 31. Thereafter, the process returns to the main routine.

The processing for making determination based on the wattage has been illustrated in the description above. The wattage, however, is a numeric value obtained by multiplying the number of times of occurrence of motion (step count) by a prescribed coefficient, and therefore, the processing above is equivalent to determination based on the number of times of occurrence of motion (step count) itself.

In addition, a configuration in which a manner of display on LCD 106 is varied in accordance with the wattage/the number of times of occurrence of motion (step count) has been illustrated in the description above, however, in addition to or instead of the manner of display, a manner of output of sound effect or the like output from buzzer 118 may be varied in accordance with the wattage.

Moreover, whether wattage/the number of times of occurrence of motion (step count) is smaller than a prescribed threshold value or not may be determined, and if it is smaller than the prescribed threshold value, such a message as urging the user to do more exercise or the like may be displayed.

Thus, CPU 110 determines whether the wattage representing one result of sensing by motion sensor 112 satisfies a prescribed condition or not. When CPU 110 determines that the wattage satisfies the prescribed condition, it causes LCD 106 and/or buzzer 118 to provide prescribed image output and/or audio output.

In step S822, CPU 110 determines whether the number of days during which the character has been possessed **232*d* of current generated data 232 has exceeded a prescribed threshold value or not. When the number of days during which the character has been possessed 232*d* has exceeded the prescribed threshold value (YES in step S822), the process proceeds to step S824. When the number of days during which the character has been possessed 232*d* has not exceeded the prescribed threshold value (NO in step S822), the process proceeds to step S830. The prescribed threshold value in step S822 is set, for example, to four days. Alternatively, in step S822, whether the number of days that have elapsed 232*c*** has exceeded a prescribed threshold value or not may be determined.

In step S824, CPU 110 causes LCD 106 to display "..." a in a balloon. Here, the game screen as in FIG. 31 is displayed on LCD 106.

In successive step S826, CPU 110 determines whether any operation switch 104 has been pressed or not. When any operation switch 104 has been pressed (YES in step S826), the process proceeds to step S828. When no operation switch 104 has been pressed (NO in step S826), the process returns to the main routine.

In step S828, CPU 110 causes LCD 106 to display a message that "(character name) looks like wishing to leave" in a balloon. Here, the game screen as in FIG. 33 is displayed on LCD 106. Then, the process returns to the main routine.

Thus, CPU 110 counts lapse of time since reception of data from game device 10, and causes LCD 106 and/or buzzer 118 to provide prescribed image output and/or audio output based on the counted lapse of time.

In step S830, CPU 110 determines whether step count per unit time **232*e* of current generated data 232 is smaller than a prescribed threshold value or not. Namely, CPU 110 determines whether the number of times of occurrence of oscillation per unit time is smaller than a prescribed threshold value or not. When step count per unit time 232*e* is smaller than the prescribed threshold value (YES in step S830), the process proceeds to step S832. When step count per unit time 232*e* is not smaller than the prescribed threshold value (NO in step S830), the process returns to the main routine. The prescribed threshold value in step S830** is set, for example, to 50 steps.

Namely, CPU 110 obtains the number of times of occurrence of motion (step count) sensed by motion sensor 112 per unit time counted by clock IC 117, and performs processing shown in step S832 and subsequent steps for causing LCD 106 and/or buzzer 118 to provide prescribed image output and/or audio output, on condition that the number of times of occurrence of motion per unit time is smaller than the prescribed threshold value.

In step S832, CPU 110 causes LCD 106 to display "@" in a balloon. Here, the game screen as in FIG. 31 is displayed on LCD 106.

In successive step S834, CPU 110 determines whether any operation switch 104 has been pressed or not. When any operation switch 104 has been pressed (YES in step S834), the process proceeds to step S836. When no operation switch 104 has been pressed (NO in step S834), the process returns to the main routine.

In step S836, CPU 110 causes LCD 106 to display a message that "(character name) looks like having nothing to do" in a balloon. Here, the game screen as in FIG. 33 is displayed on LCD 106. Then, the process returns to the main routine.

A configuration in which a manner of display on LCD 106 is varied in accordance with the number of times of occurrence of motion (step count) detected per unit time has been illustrated in the description above, however, in addition to or instead of the manner of display, a manner of output of sound effect or the like output from buzzer 118 may be varied.

Moreover, whether the number of times of occurrence of motion (step count) detected per unit time is equal to or greater than a prescribed threshold value or not may be determined, and when it is equal to or greater than the prescribed threshold value, such a message as indicating that a coal or the like was reached may be displayed.

Thus, CPU 110 determines whether the number of times of occurrence of motion sensed by motion sensor 112 per unit time satisfies a prescribed condition or not, and when it is determined that the prescribed condition was satisfied, CPU 110 causes LCD 106 and/or buzzer 118 to provide prescribed image output and/or audio output.

<Character Getting Mode>

A processing procedure in the character getting mode described in connection with step S801 in FIG. 29 will now be described.

Figure 34:
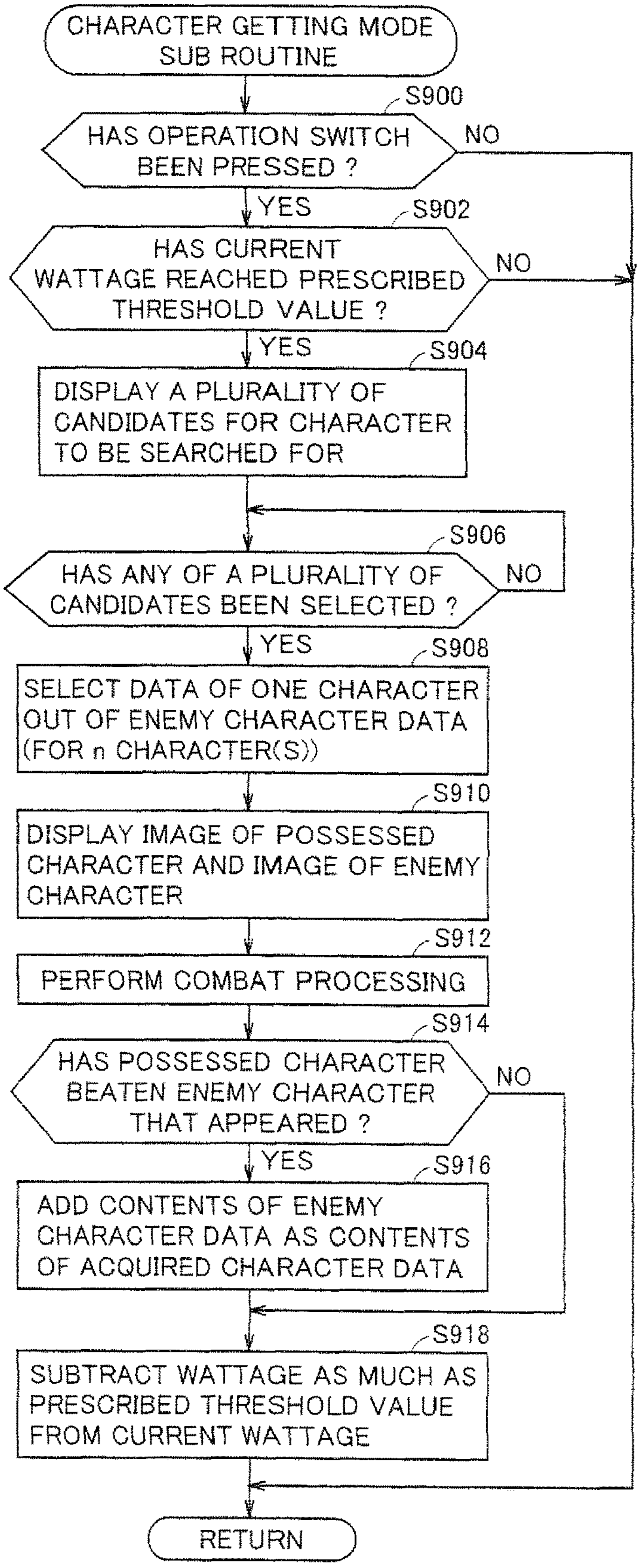
FIG. 34 is a flowchart showing a processing procedure in a character getting mode in the pedometer according to the embodiment of the present invention.

FIG. 34 is a flowchart showing a processing procedure in the character getting mode in pedometer 100 according to the embodiment of the present invention. Referring to FIG. 34, initially, CPU 110 determines whether operation switch 104 has been pressed or not (step S900). When no operation switch 104 has been pressed (NO in step S900), the process returns to the main routine of the step count game (FIG. 29). When operation switch 104 has been pressed (YES in step S900), the process proceeds to step S902.

In step S902, CPU 110 determines whether the current wattage has reached a prescribed threshold value or not. When the current wattage has reached the prescribed threshold value (YES in step S902), the process proceeds to step S904. When the current wattage has not reached the prescribed threshold value (NO in step S902), the process returns to the main routine of the step count game (FIG. 29). It is noted that, when the current wattage has not reached the prescribed threshold value, the user may be notified that the wattage is insufficient.

In step S904, CPU 110 causes LCD 106 to display a game screen including a plurality of candidates for a character to be searched for. For example, a plurality of "bushes" are displayed and such a message as "where is a character?" is displayed. In successive step S906, CPU 110 determines whether any operation switch 104 has been pressed or not. Namely, CPU 110 determines whether any of the plurality of candidates as the character to be searched for has been selected through the user's operation or not. When any candidate is selected through the user's operation, the process proceeds to step S908. When no candidate was selected through the user's operation (NO in step S906), the processing in step S906 is repeated.

In step S908, CPU 110 selects data of one enemy character out of enemy character data (for n character(s)) 230*c* (see FIG. 8) received in advance from game device 10. It is noted that the processing for selecting one enemy character out of enemy character data (for n character(s)) 230*c* is preferably performed based on a random number.

In successive step S910, CPU 110 causes LCD 106 to display an image of the possessed character based on character data 230*a* (see FIG. 8) received in advance from game device 10 and an image of the enemy character based on the enemy character data selected in step S908. It is noted that an example where none of enemy character data (for n character(s)) 230*c* was selected in the selection processing in step S908 may be included. Namely, no enemy character appears on the screen and only a message that "there was no character" may be displayed.

In successive step S912, CPU 110 performs combat processing between the image of the possessed character and the image of the enemy character. More specifically, whether the possessed character beats the enemy character that appeared or not is determined based on an attribute value included in character data 230*a* and an attribute value included in the selected enemy character data. In successive step S914, CPU 110 determines whether or not the possessed character has beaten the enemy character that appeared. When the possessed character has beaten the enemy character that appeared (YES in step S914), the process proceeds to step S916. When the possessed character was beaten by the enemy character that appeared (NO in step S914) the process proceeds to step S918.

In step S916, CPU 110 adds contents of the selected enemy character data as the contents of acquired character data (for n character(s)) 232*f*. Namely, when a battle is won, the enemy character which was the opponent is gotten. Then, the process proceeds to step S918. Namely, CPU 110 changes enemy character data (for n character(s)) 230*c* representing an example of acquirable character data to acquired character data 232 representing an example of already-acquired character data, based on the result of sensing by motion sensor 112. As updated acquired character data 232 is transmitted to game device 10, it is used for modifying possessed character data 207*c* (see FIG. 8) of save data 207 stored in game device 10 (see step S746 in FIG. 27).

In step S918, CPU 110 subtracts a value the same as the prescribed threshold value above from the current wattage and updates the wattage to new wattage. Namely, as the character getting mode was executed, the wattage necessary for execution thereof is subtracted from the current wattage. Then, the process returns to the main routine of the step count game (FIG. 29).

<Variation>

In the embodiment described above, initial registration data 209 (229) and data-to-be-transmitted 210 are shown as exemplary data to be transmitted from game device 10 to pedometer 100, however, in addition to or instead of such data, font data, character string data, and a program itself may be transmitted.

In addition, in step S512 or the like in FIG. 20 above, processing for determining a course or the like to be added based on generated data 232 received in advance from pedometer 100 is illustrated, however, current generated data may be obtained from pedometer 100 at this timing.

Moreover, in pedometer 100, when initial registration data 229 and/or reception data 230 has not yet been received, audio output such as sound effect may be used for error indication.

Further, a prescribed condition for performing various event operations in the processing procedure of the step count game shown in FIG. 29 is merely by way of example, and a condition for generating an event can be set by combining as appropriate the step count sensed by motion sensor 112, a cumulative value of the step count, the wattage, the step count per unit time, the number of days during which the character has been possessed, the number of days that have elapsed, and the like.

In addition, other examples of outputs in accordance with the result of sensing by motion sensor 112 include such a screen display as a character walking in accordance with the step count, change of a character that appears in accordance with the step count, growth of a character (change of appearance of the character, change of a parameter, or the Like), and the like.

In addition, a processing example in which message image 164 is displayed when operation switch 104 is pressed has been shown in the processing procedure of the step count game shown in FIG. 29, however, message image 164 may immediately be displayed when the result of sensing by motion sensor 112 satisfies a prescribed condition. Further, not only a balloon but pop-up or the like may be used to display a message or various characters.

Moreover, a processing example in which processing such as message display is skipped unless possessed character flag 228*h* of identification data 228 stored in pedometer 100 is set to "ON" has been illustrated in the processing procedure of the step count game shown in FIG. 29, however, some kind of event operation may be performed even though possessed character flag 228*h* is not set to "ON". Further, various event operations may be performed only based on the result of sensing by motion sensor 112, without making determination about a value of possessed character flag 228*h*.

In the embodiment described above, the processing for selecting the course to be transmitted from game device 10 to pedometer 100 in accordance with the reached stage has been illustrated, however, the course may be selected based on the current stage where the character is present. By adopting such processing, not only successively playing the game but also a fun to "return" can be provided to the user.

In the embodiment described above, the processing for the user to select a course to be transmitted from game device 10 to pedometer 100 from among candidates prepared in advance has been illustrated, however, transfer data including a course may automatically be determined based on a reached course or a current course. Namely, data to be transferred may automatically be determined under such a predetermined rule that this data should be transferred when a certain stage is reached. By adopting such processing, data regardless of selection by the user is transferred. Therefore, data to be transferred can be made secret and the user can be surprised.

In the embodiment described above, an example where data to be transmitted from game device 10 to pedometer 100 is mainly course data and image data has been illustrated, however, in addition or instead of the above, sound data, text image data, and such program data as dynamically generating a character may be employed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing system, comprising:

a first device; and a second device, said first device comprising:

a first communication device configured to transmit and receive data to and from said second device, and said second device configured to be carried by a user and comprising:

a second communication device configured to transmit and receive data to and from said first device; and a motion sensing device configured to sense motion as the user moves with said second device;

said second communication device configured to transmit sensing information in accordance with a result of sensing by said motion sensing device to said first device, the sensing information including at least a number of steps of the user, and said first device configured to:

receive the sensing information in accordance with the result of sensing by said motion sensing device from said second device;

determine, based on the received sensing information, selectable data candidates to be transmitted to said second device from among a plurality of pieces of data stored in advance;

generate a first display providing information for selecting one or more candidates of game character data, from the selectable data candidates, that can be transmitted to the second device;

generate a second display providing information for selecting one or more candidates of video game course data, from the selectable data candidates, that can be transmitted to the second device, the one or more candidates of video game course data are selectable depending upon a stage that the user has reached, and the stage that the user has reached is determined based on the number of steps of the user; and transmit the selected one or more candidates of game character data and video game course data to the second device, and said second device further configured to:

receive the selected one or more candidates of game character data and video game course data, wherein a display generated on the second device includes a background image that corresponds to a video game course, from the video game course data, and that horizontally scrolls in association with the result of sensing by said motion sensing device.

2. The information processing system according to claim 1, wherein said first device further comprises:

a display device, and an input device for accepting a user's operation, and said first device configured to:

select the one or more candidates of game character data and video game course data to be transmitted in accordance with the user's operation accepted by said input device.

3. The information processing system according to claim 1, wherein said first device further configured to perform first information processing, said second device further configured to perform second information processing based on the data received from said first device, said second information processing includes processing for changing said data received from said first device to data having different information, said second communication device is configured to transmit the data changed in said second information processing to said first device, and said first information processing includes processing based on the changed data received from said second device.

4. The information processing system according to claim 3, wherein the data transmitted from said first device to said second device includes image data, and said second information processing includes processing for varying a manner of display of said image data based on at least one of the number of times of occurrence of motion sensed by said motion sensing device and presence/absence of motion sensing by said motion sensing device.

5. The information processing system according to claim 3, wherein said second device further configured to count lapse of time since reception of the data from said first device, and said second information processing includes processing based on lapse of time counted.

6. The information processing system according to claim 3, wherein said result of sensing includes the number of times of occurrence of motion sensed by said motion sensing device per unit time, and said second information processing includes processing based on said number of times of occurrence per unit time.

7. The information processing system according to claim 1, wherein said first device further comprises:

a first storage device, said first device configured to:

perform first information processing;

store first processing result information indicating a result of processing in said first information processing in said first storage device;

evaluate said first processing result information stored in said first storage device; and select the one or more candidates of game character data and video game course data to be transmitted, based on a result of evaluation of said first processing result information in addition to said received sensing information.

8. The information processing system according to claim 7, wherein said second device further configured to perform second information processing based on the data received from said first device, said second information processing includes processing for changing said data received from said first device to data having different information, said second communication device configured to transmit the data changed in said second information processing to said first device, and said first information processing includes processing based on the changed data received from said second device.

9. The information processing system according to claim 7, wherein said first information processing includes game processing in which a game character object reaches a different stage in a stepwise fashion in accordance with a user's operation, said first device configured to store, when said game character object reaches a new stage, identification information indicating the reached stage in said first storage device, and configured to select data corresponding to said identification information stored in said first storage device.

10. The information processing system according to claim 7, wherein said first storage device is configured to further store a plurality of pieces of acquirable game character data and a plurality of pieces of possessed game character data, said first device further configured to select possessed game character data to be transmitted to said second device, from among said plurality of pieces of possessed game character data, in accordance with a user's operation, said first device configured to select acquirable game character data to be transmitted to said second device from among said plurality of pieces of acquirable game character data based on said sensing information, the data transmitted from said first device to said second device further comprises selected said acquirable game character data and selected said possessed game character data, said second information processing includes processing for changing said acquirable game character data to already-acquired game character data based on said result of sensing, the data transmitted from said second device to said first device includes said already-acquired game character data, and said first information processing includes change of said possessed game character data based on received said already-acquired game character data.

11. The information processing system according to claim 1, wherein said result of sensing includes at least one of the number of times of occurrence of motion sensed by said motion sensing device and presence/absence of motion sensing by said motion sensing device.

12. The information processing system according to claim 11, wherein said first device is configured to select the one or more candidates of game character data and video game course data to be transmitted based on at least one of the number of times of occurrence of motion sensed by said motion sensing device and presence/absence of motion sensing by said motion sensing device.

13. The information processing system according to claim 1, wherein the game character data comprises one or more game characters and the video game course data comprises one or more game courses.

14. The information processing system according to claim 1, wherein a number of selectable data candidates increases based on an increased number of times of occurrence of motion determined from the received sensing information.

15. The information processing system according to claim 1, wherein the second device further configured to transmit at least game character data back to the first device.

16. The information processing system according to claim 1, wherein the first device is further configured to enable selection of one or more additional candidates of game character data and video game course data, from the first and second displays, respectively, based on the sensing information received from the second device.

17. The information processing system according to claim 1, wherein the video game course corresponding to a stage that the user has not reached is not selectable.

18. The information processing system according to claim 1, wherein the display generated on the second device includes at least one game character from the game character data and the video game course from the video game course data.

19. The information processing system according to claim 18, wherein the display generated on the second device further includes a step count value, an icon indicating presence of an item, and an icon indicating presence of an acquired character.

20. A non-transitory storage medium comprising a program executed by a computer having one or more processors and interacting with a communication device, a storage device, and a motion sensing device configured to be carried by a user, said program including instructions causing said computer to:

receive data from an information processing device connected through said communication device;

store the data received from said information processing device in said storage device;

obtain a result of sensing by said motion sensing device as the user moves with said motion sensing device; and transmit said result of sensing to said information processing device, said information processing device configured to:

receive sensing information in accordance with the result of sensing by said motion sensing device, the sensing information including at least a number of steps of the user;

determine, based on the received sensing information, selectable data candidates to be transmitted from among a plurality of pieces of data stored in advance;

generate a first display providing information for selecting one or more candidates of game character data, from the selectable data candidates, that can be transmitted;

generate a second display providing information for selecting one or more candidates of video game course data, from the selectable data candidates, that can be transmitted, the one or more candidates of video game course data are selectable depending upon a stage that the user has reached, and the stage that the user has reached is determined based on the number of steps of the user; and transmit the selected one or more candidates of game character data and video game course data to said communication device, wherein a display generated on said communication device includes a background image that corresponds to a video game course, from the video game course data, and that horizontally scrolls in association with the result of sensing by said motion sensing device.

21. An information processing device configured to be carried by a user, comprising:

a reception device configured to receive data from another information processing device;

a storage device configured to store the data received from said another information processing device;

a motion sensing device configured to sense motion as the user moves with the information processing device; and a transmission device configured to transmit a result of sensing by said motion sensing device to said another information processing device, and said another information processing device configured to:

receive sensing information in accordance with the result of sensing by said motion sensing device, the sensing information including at least a number of steps of the user;

determine, based on the received sensing information, selectable data candidates to be transmitted from among a plurality of pieces of data stored in advance;

generate a first display providing information for selecting one or more candidates of game character data, from the selectable data candidates, that can be transmitted;

generate a second display providing information for selecting one or more candidates of video game course data, from the selectable data candidates, that can be transmitted, the one or more candidates of video game course data are selectable depending upon a stage that the user has reached, and the stage that the user has reached is determined based on the number of steps of the user; and transmit the selected one or more candidates of game character data and video game course data, and said information processing device further configured to:

receive the selected one or more candidates of game character data and video game course data, wherein a display generated on said information processing device includes a background image that corresponds to a video game course, from the video game course data, and that horizontally scrolls in association with the result of sensing by said motion sensing device.

22. A method implemented in a computer having one or more processors and configured to interact with a communication device, a storage device, and a motion sensing device configured to be carried by a user, the method comprising:

receiving data from an information processing device connected through said communication device;

storing the data received from said information processing device in said storage device;

obtaining a result of sensing by said motion sensing device as the user moves with the motion sensing device; and transmitting said result of sensing to said information processing device, said information processing device configured to:

receive sensing information in accordance with the result of sensing by said motion sensing device, the sensing information including at least a number of steps of the user;

determine, based on the received sensing information, selectable data candidates to be transmitted from among a plurality of pieces of data stored in advance;

generate a first display providing information for selecting one or more candidates of game character data, from the selectable data candidates, that can be transmitted;

generate a second display providing information for selecting one or more candidates of video game course data, from the selectable data candidates, that can be transmitted, the one or more candidates of video game course data are selectable depending upon a stage that the user has reached, and the stage that the user has reached is determined based on the number of steps of the user; and transmit the selected one or more candidates of game character data and video game course data to said communication device, wherein a display generated on said communication device includes a background image that corresponds to a video game course, from the video game course data, and that horizontally scrolls in association with the result of sensing by said motion sensing device.

* * * * *